Jan. 21, 1947.   G. W. PONTIUS, 3D   2,414,608
GUN TURRET
Filed May 5, 1941          21 Sheets-Sheet 1

INVENTOR
GEORGE W. PONTIUS III
BY
ATTORNEY

Jan. 21, 1947.  G. W. PONTIUS, 3D  2,414,608
GUN TURRET
Filed May 5, 1941  21 Sheets-Sheet 6
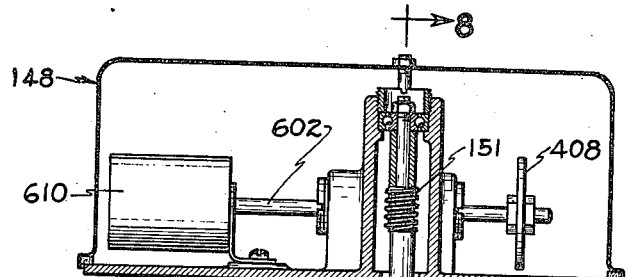
FIG. 7
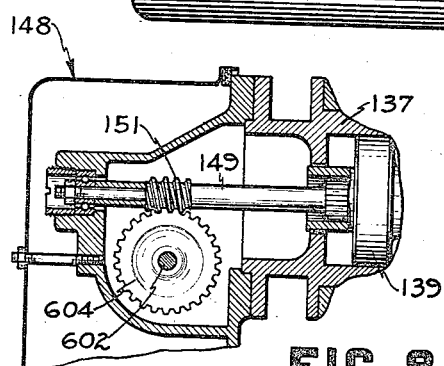
FIG. 8
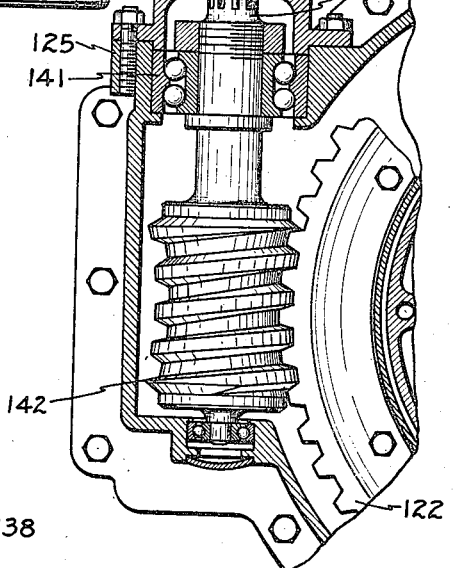
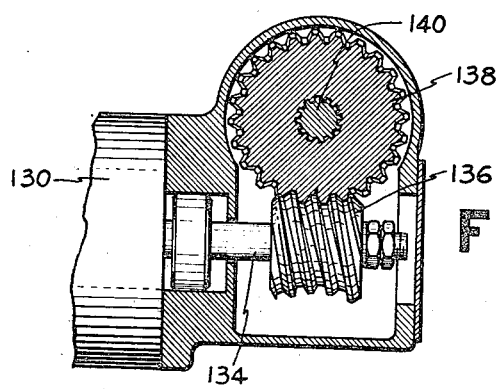
FIG. 9
INVENTOR
GEORGE W. PONTIUS III
BY
M. W. McConkey
ATTORNEY Jan. 21, 1947.  G. W. PONTIUS, 3D  2,414,608
GUN TURRET
Filed May 5, 1941  21 Sheets-Sheet 7
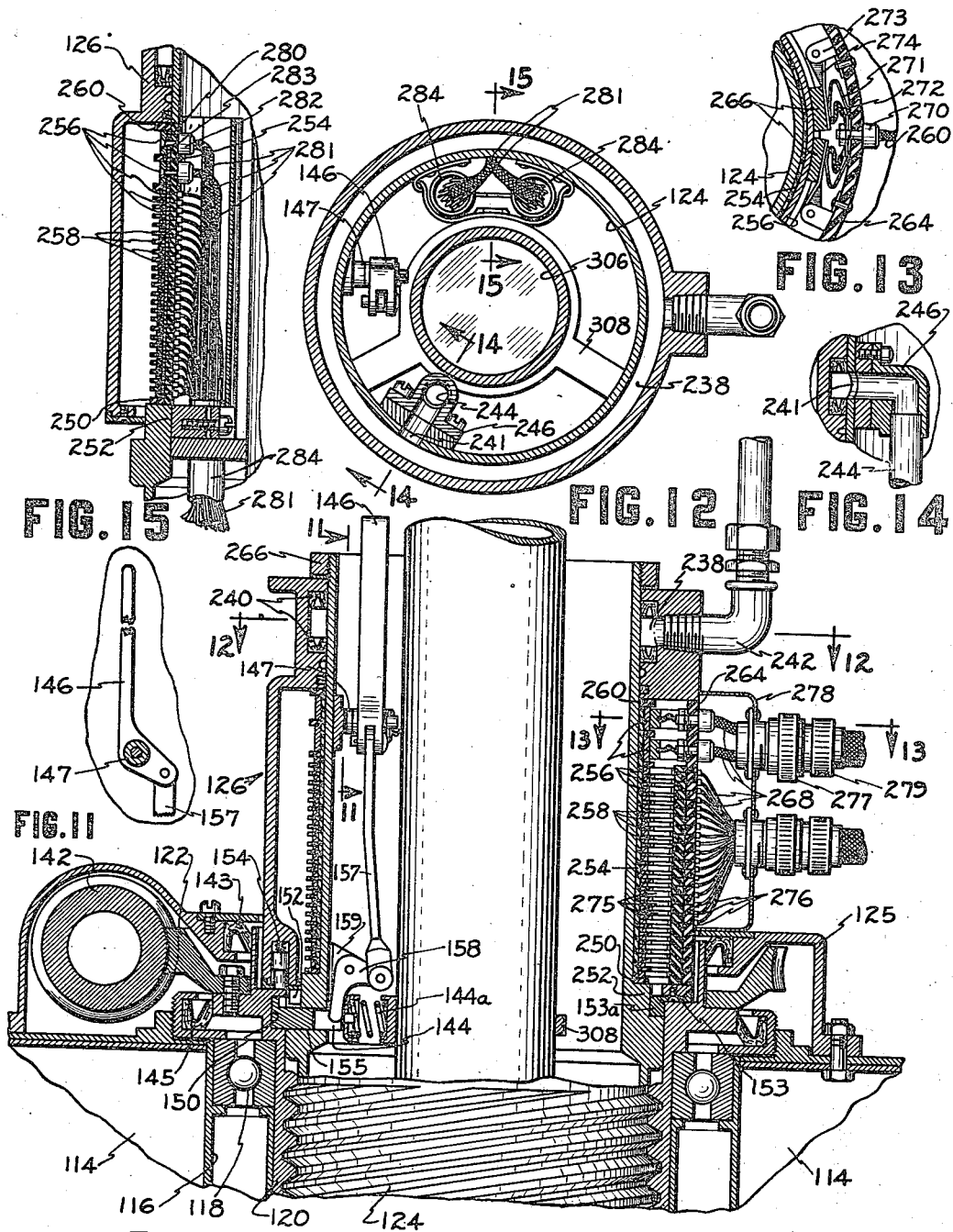
INVENTOR
GEORGE W. PONTIUS III
BY
M. W. McConkey
ATTORNEY

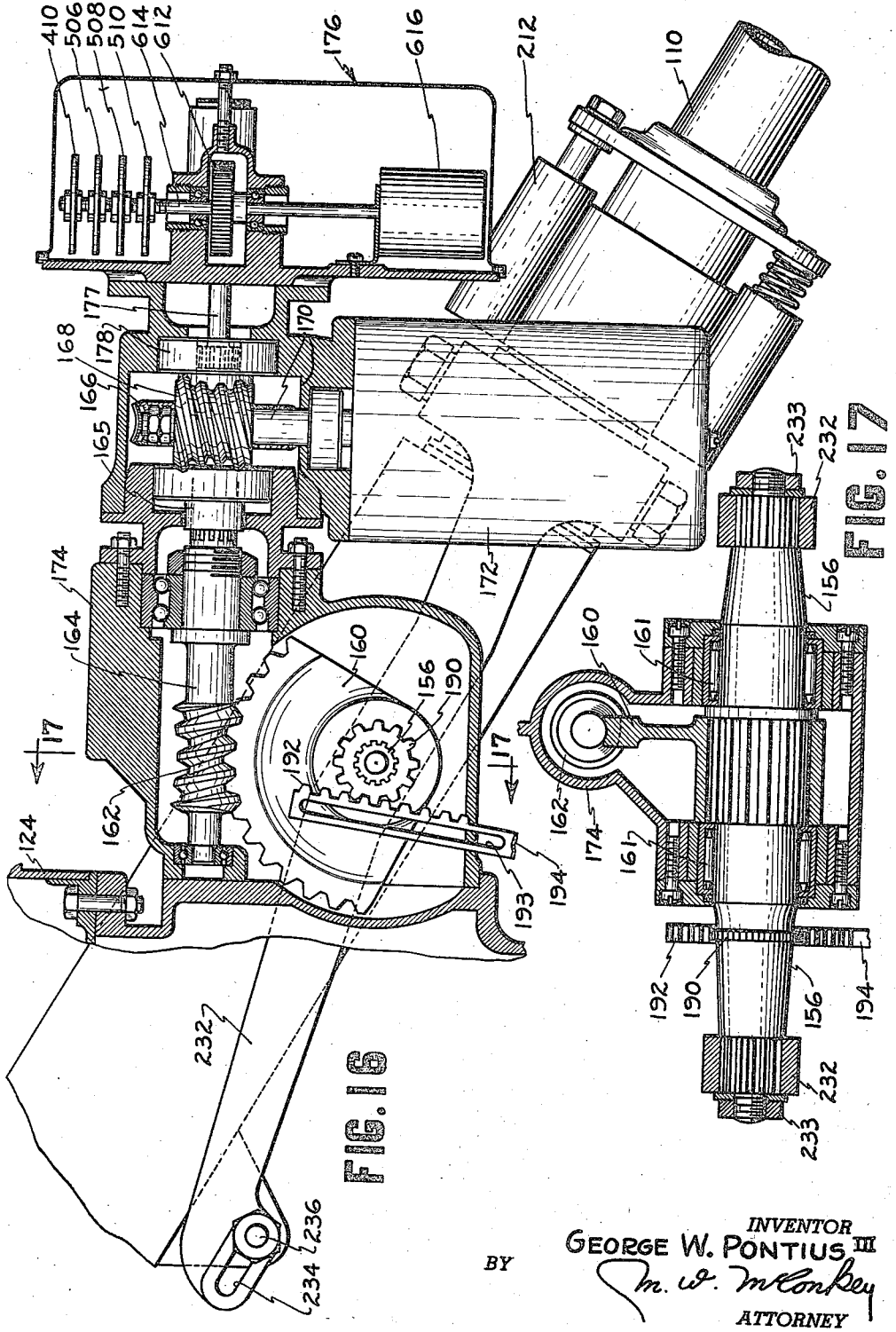

Jan. 21, 1947.  G. W. PONTIUS, 3D  2,414,608
GUN TURRET
Filed May 5, 1941  21 Sheets-Sheet 9
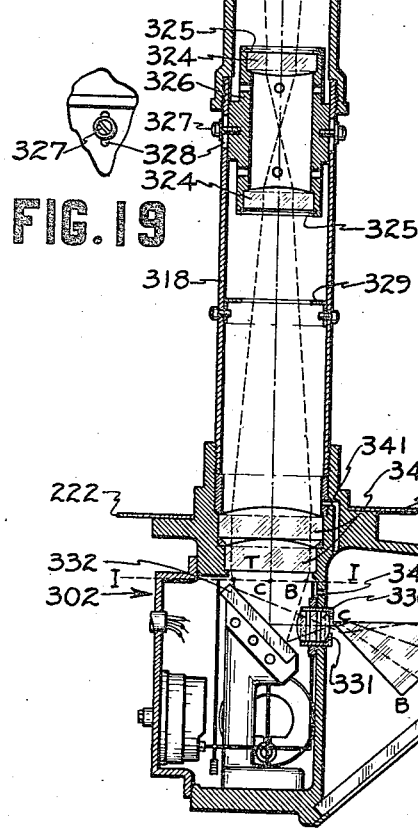
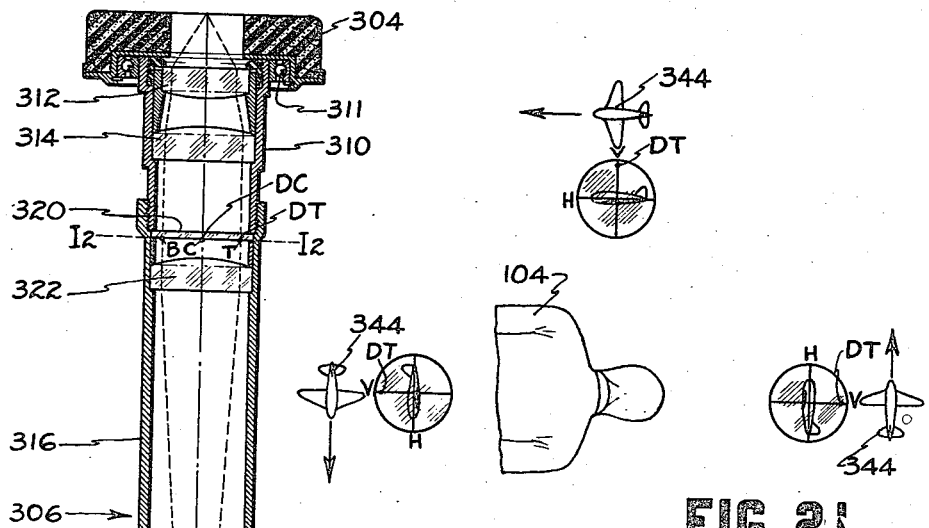
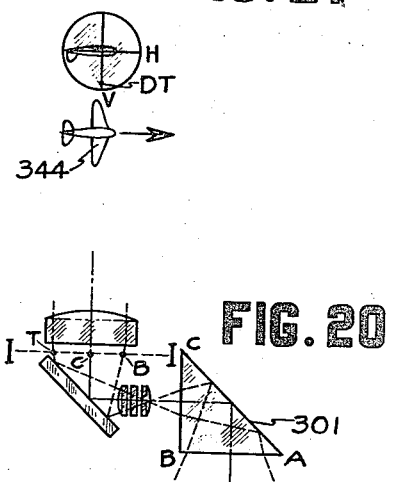
INVENTOR
GEORGE W. PONTIUS III
BY
M. W. McConkey
ATTORNEY Jan. 21, 1947.　　　　G. W. PONTIUS, 3D　　　　2,414,608
GUN TURRET
Filed May 5, 1941　　　　21 Sheets-Sheet 10
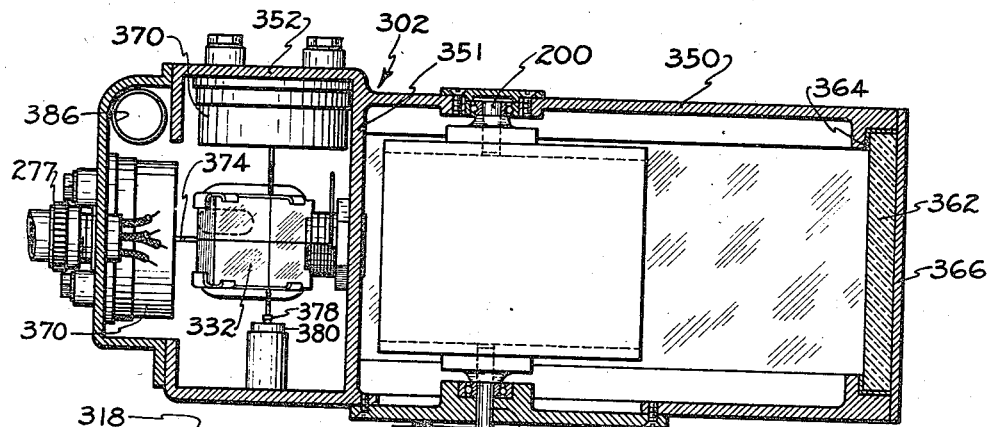
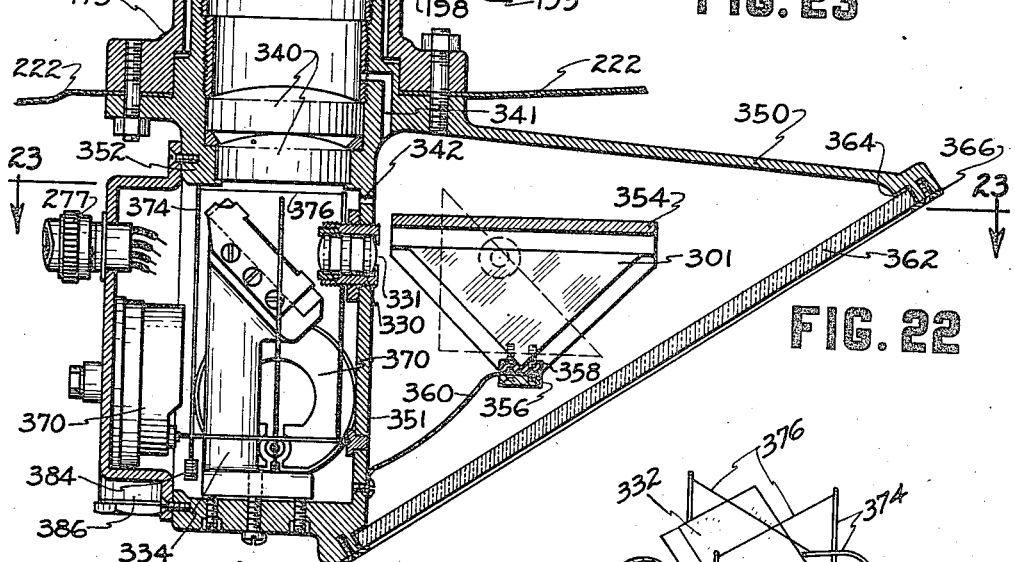
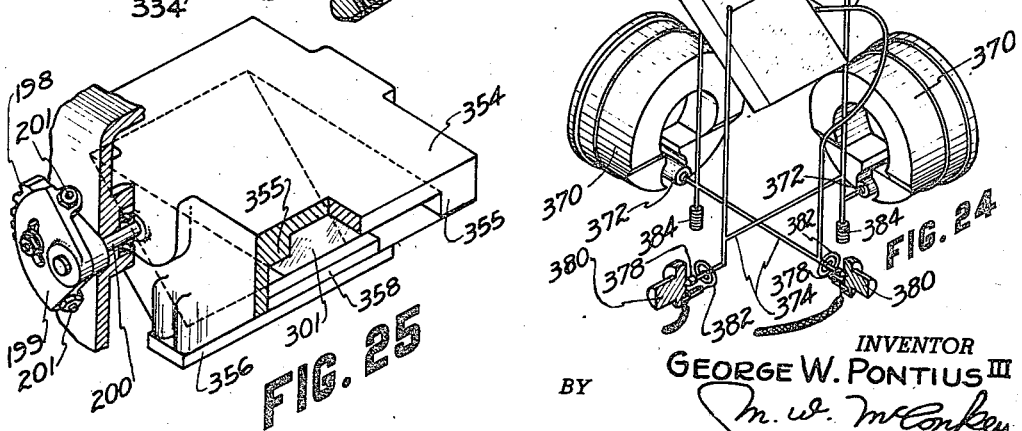
INVENTOR
GEORGE W. PONTIUS III
BY
m. w. McConkey
ATTORNEY

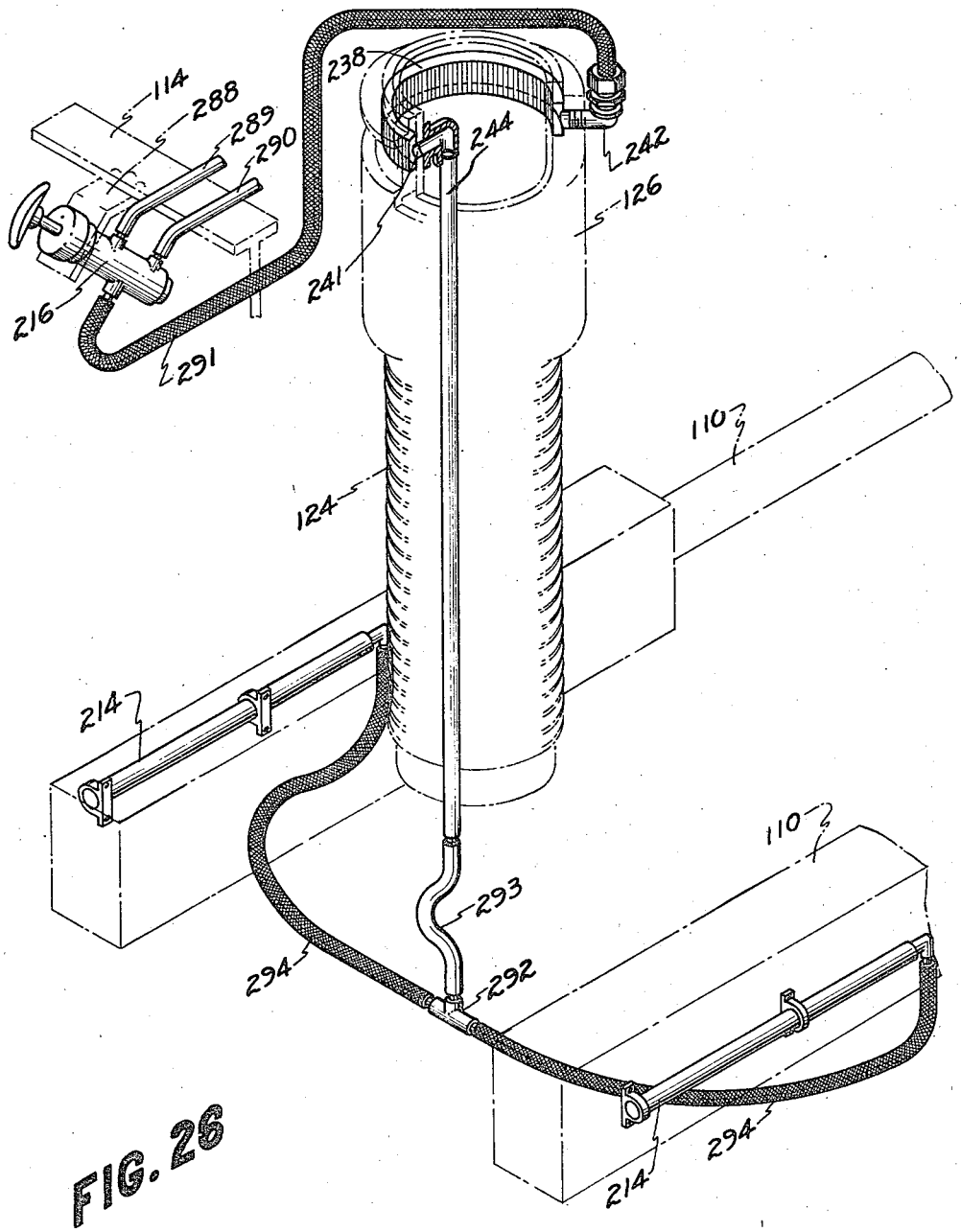

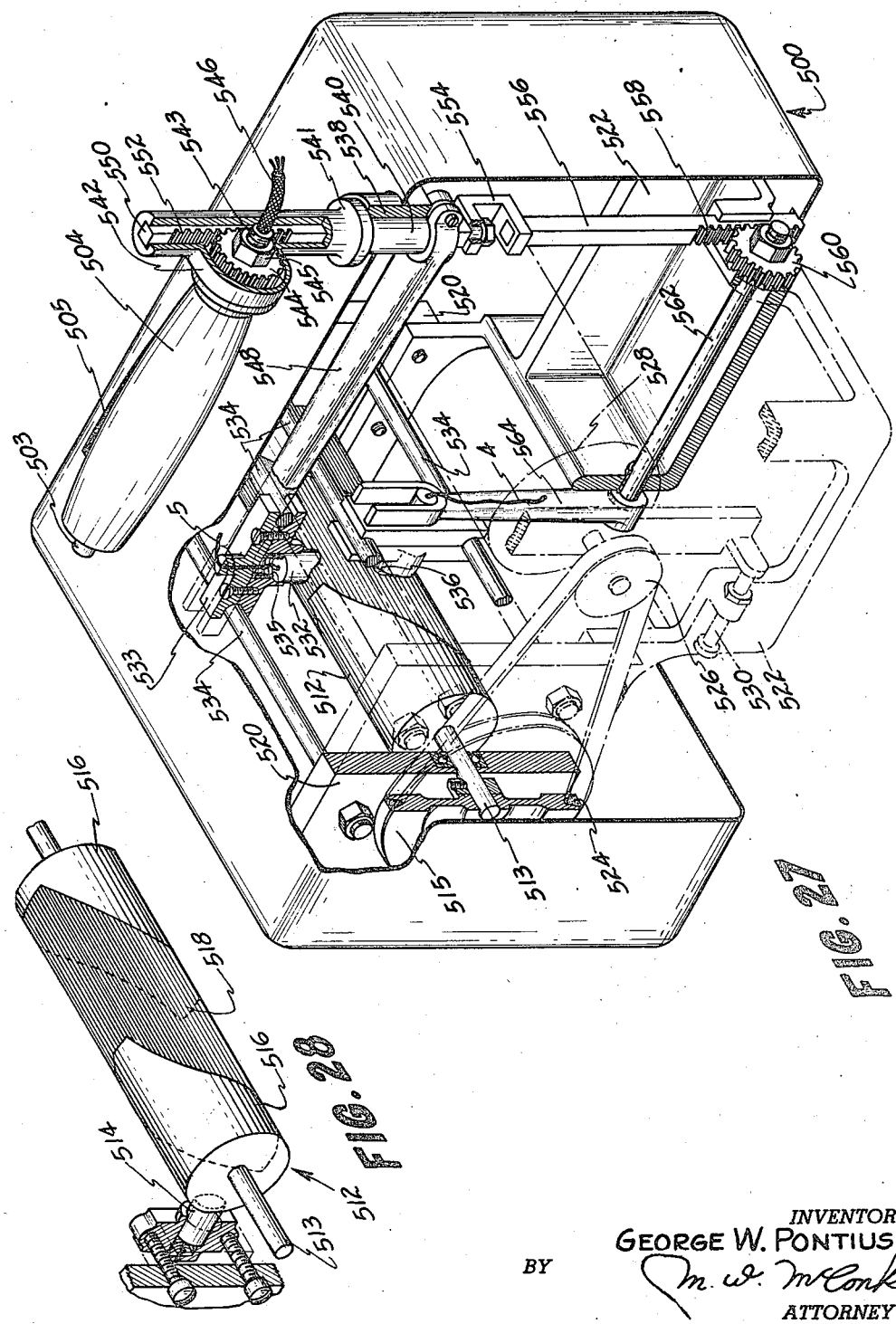

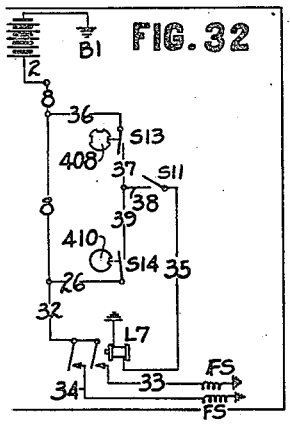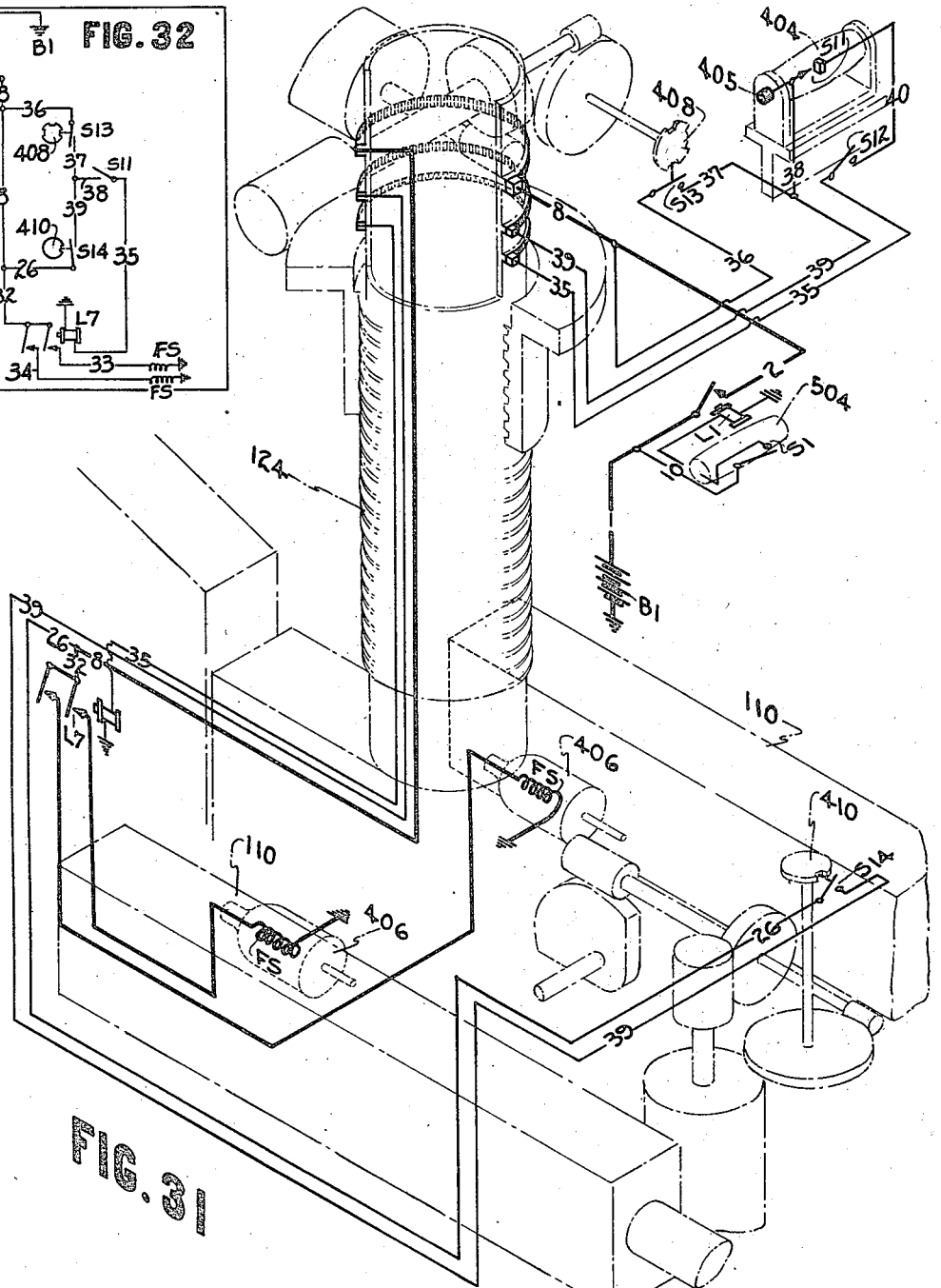

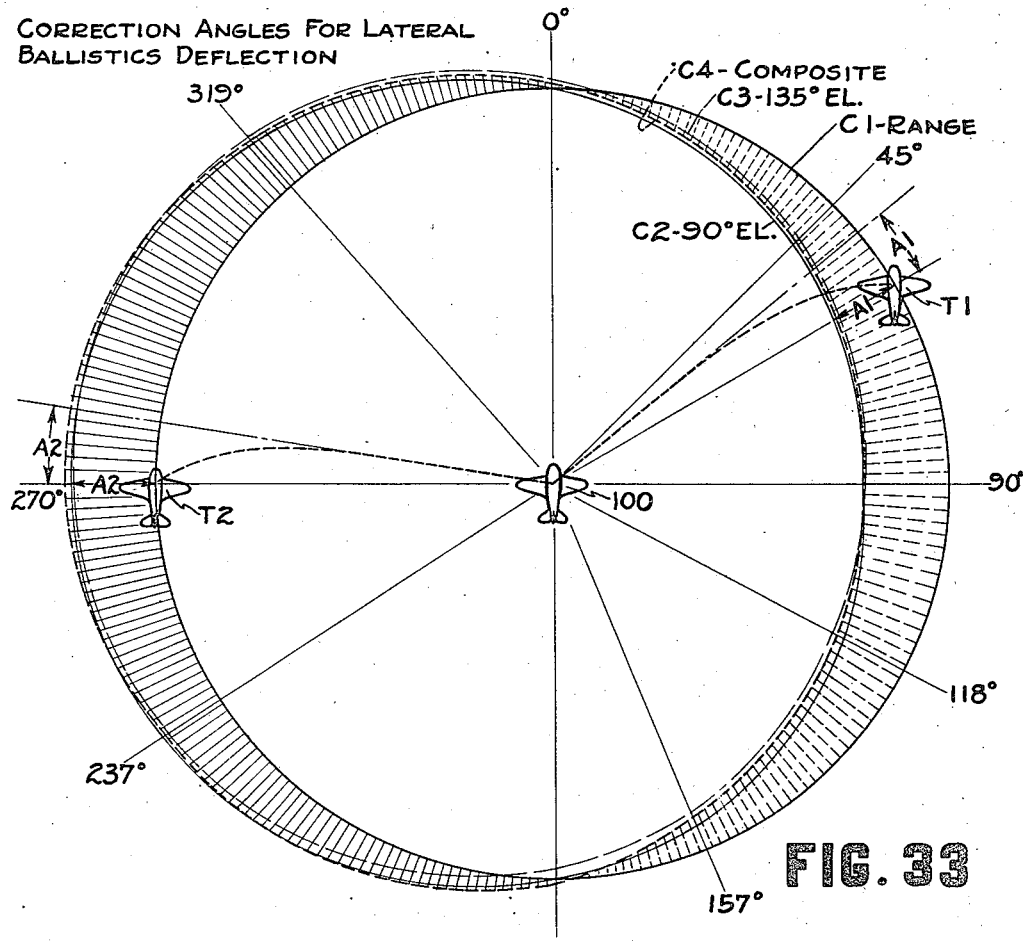
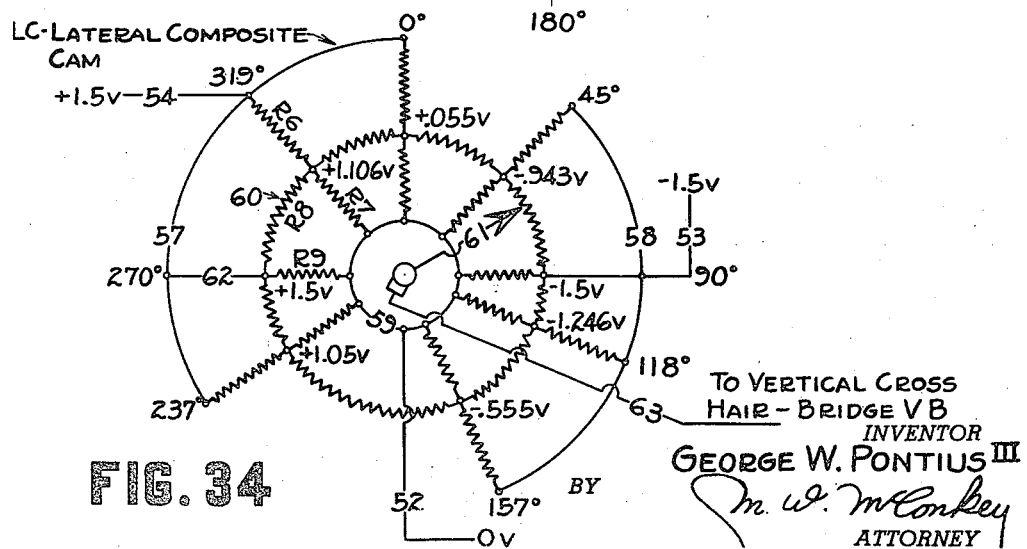

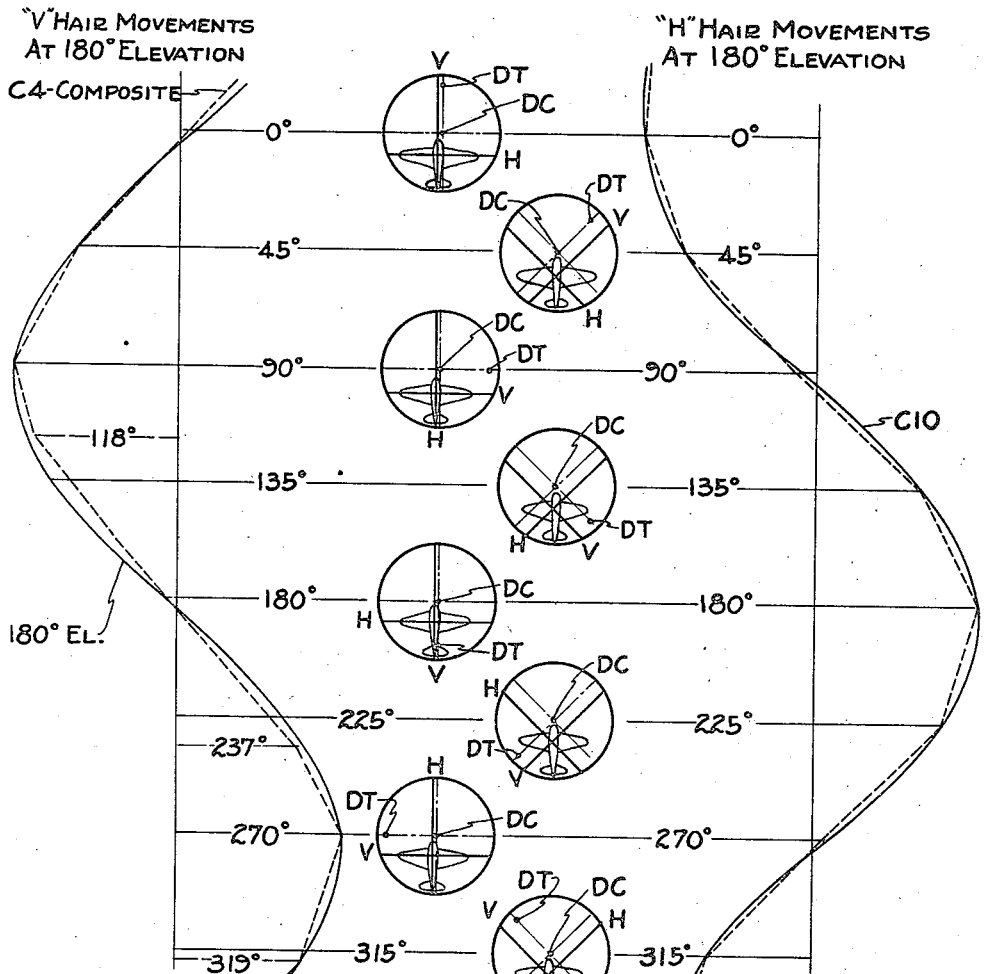
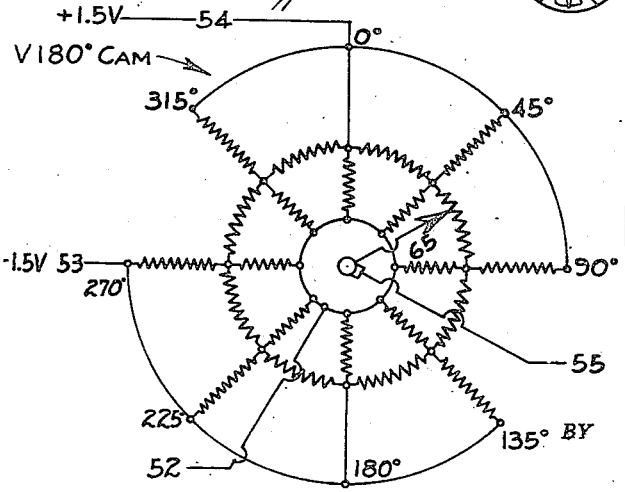
FIG. 35
FIG. 36

Jan. 21, 1947.  G. W. PONTIUS, 3D  2,414,608
GUN TURRET
Filed May 5, 1941  21 Sheets-Sheet 18
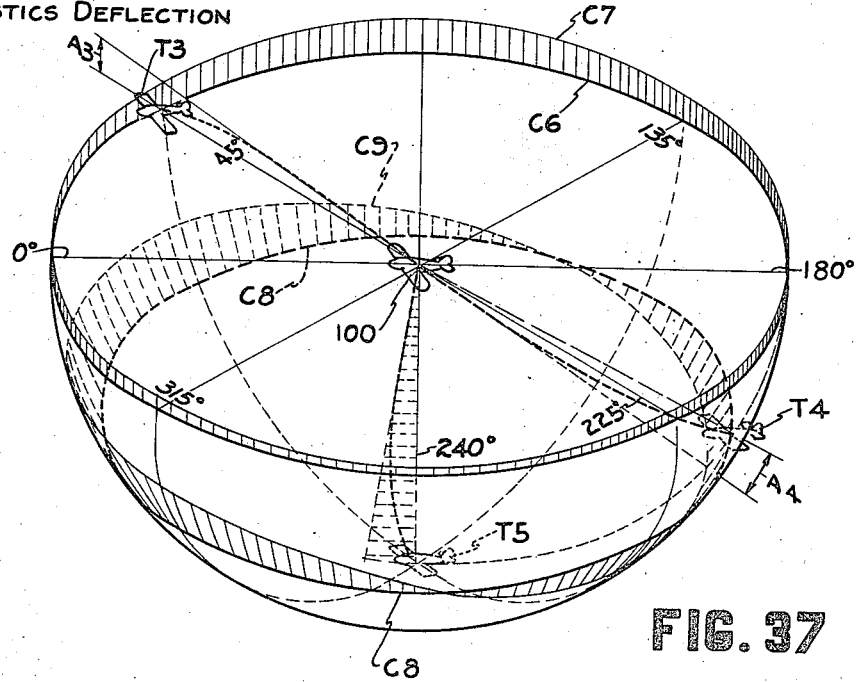
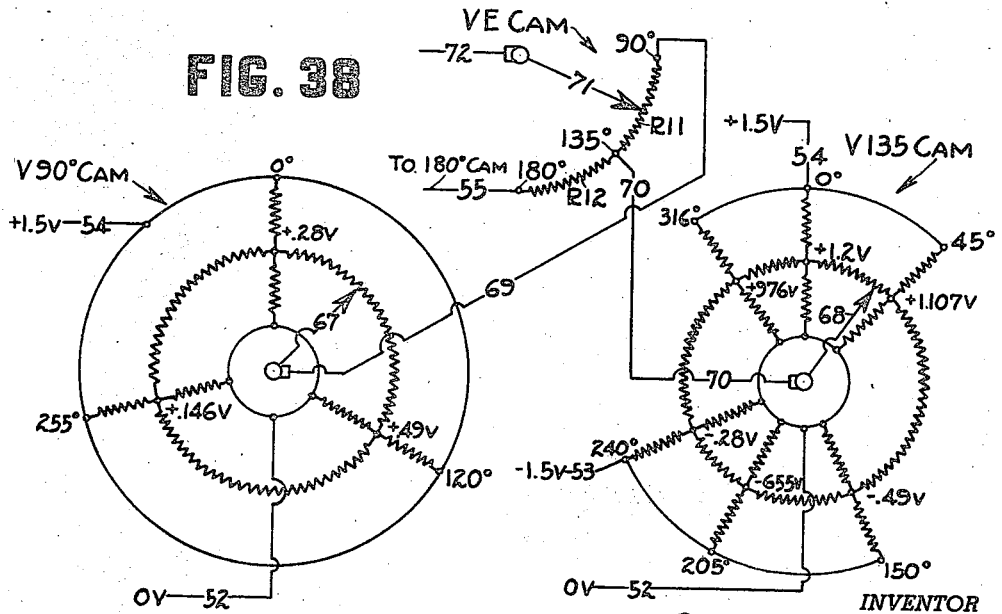
INVENTOR
GEORGE W. PONTIUS III
BY
ATTORNEY Jan. 21, 1947. G. W. PONTIUS, 3D 2,414,608
GUN TURRET
Filed May 5, 1941 21 Sheets-Sheet 19
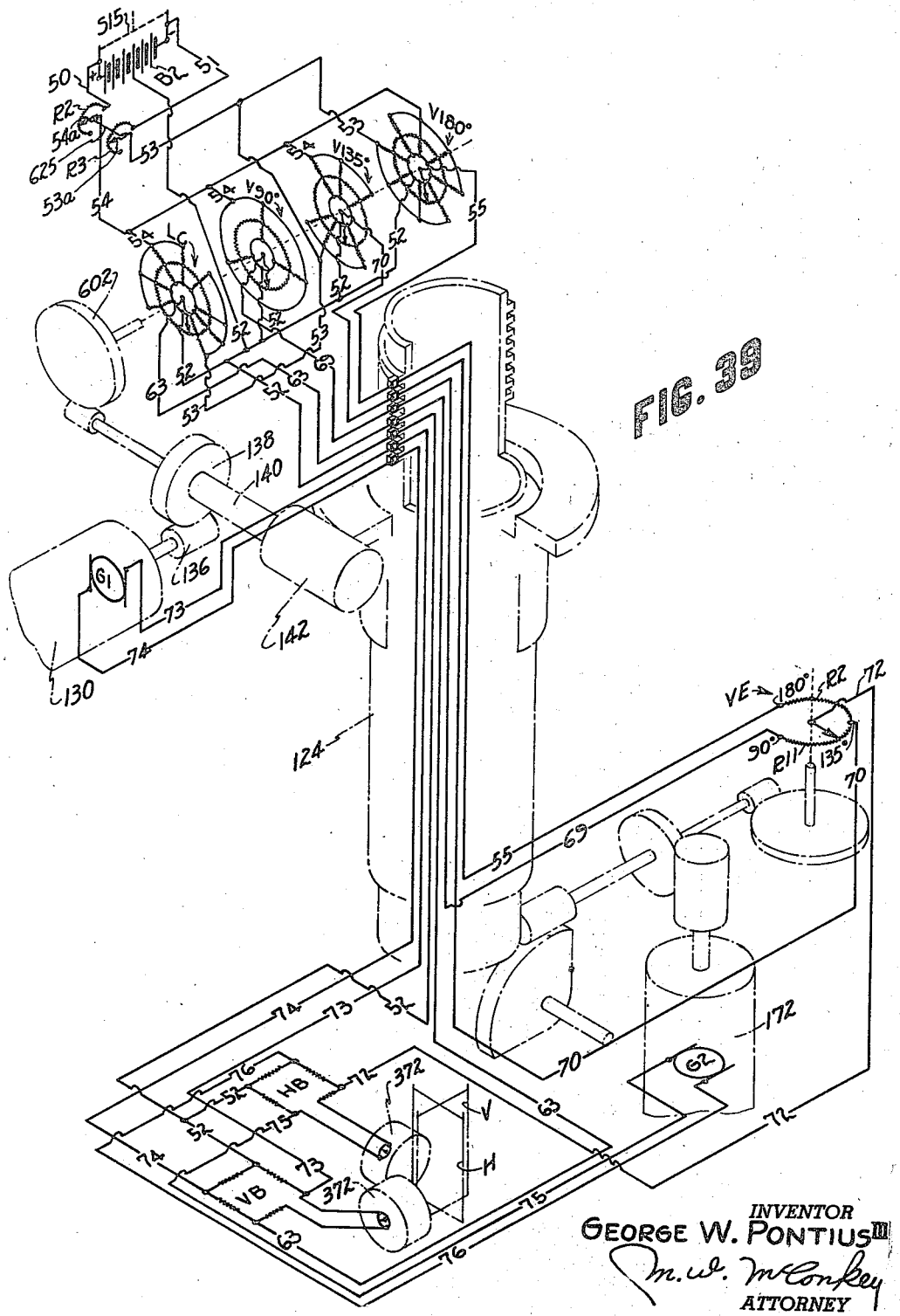
INVENTOR
GEORGE W. PONTIUS III
ATTORNEY

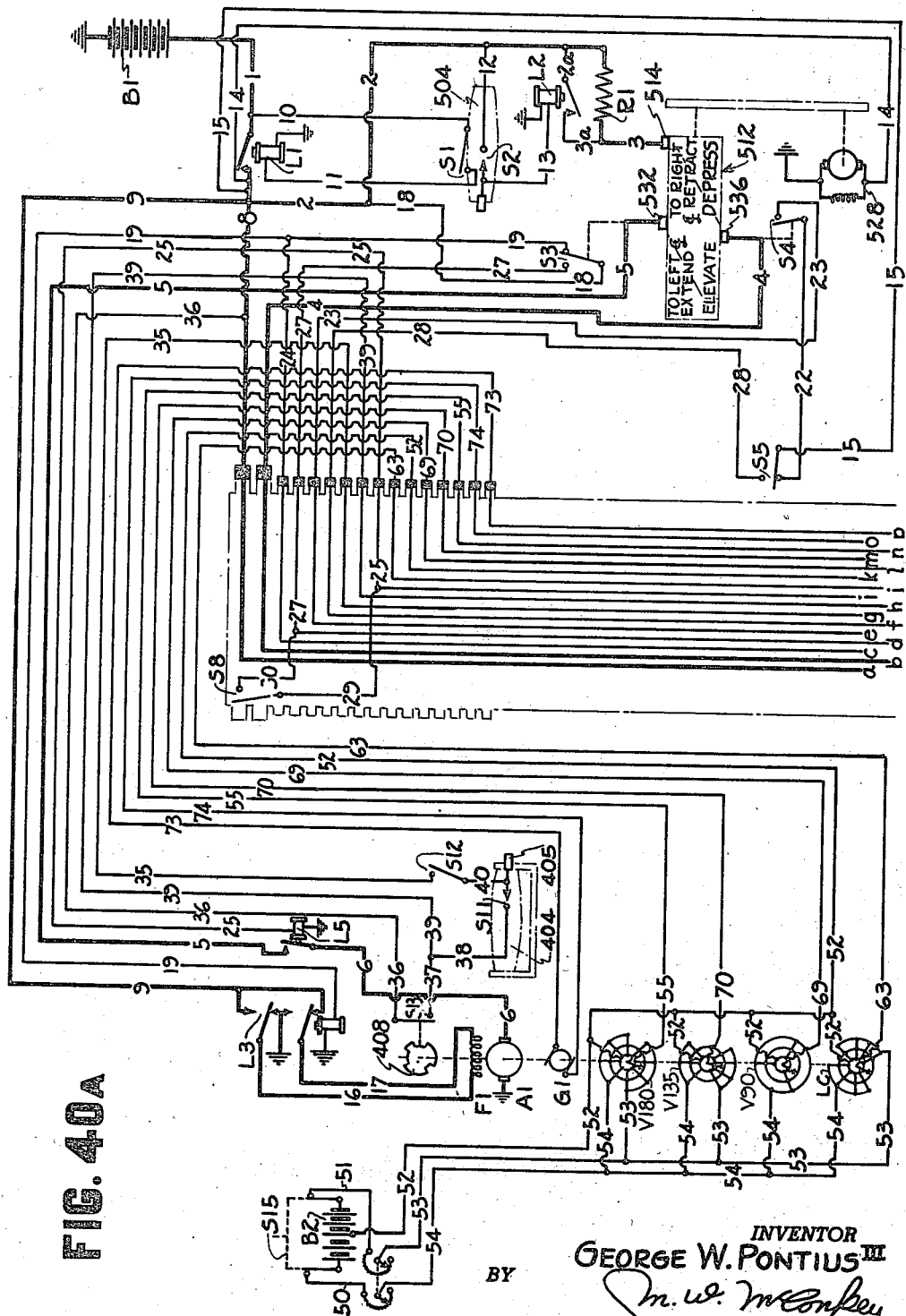

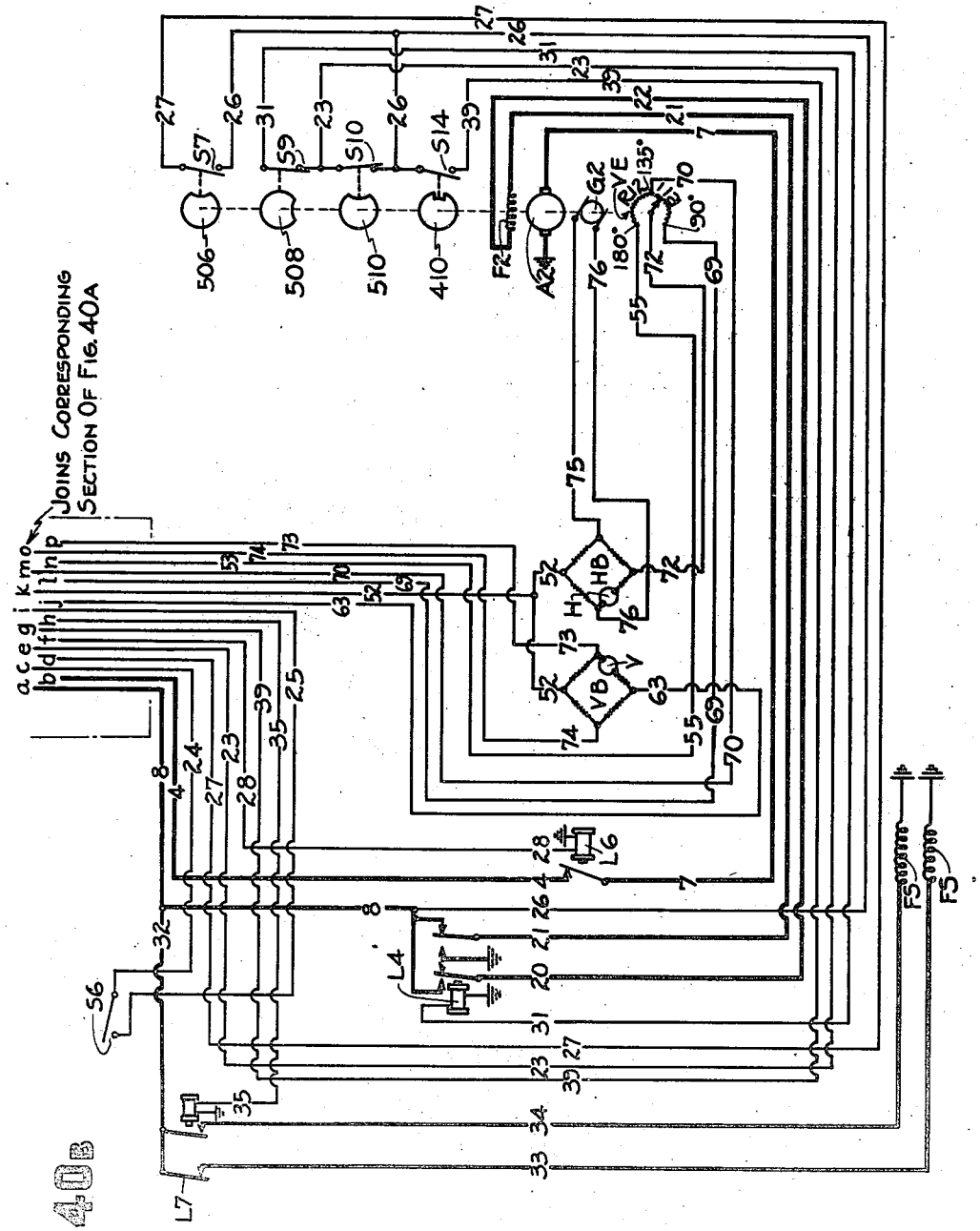

UNITED STATES PATENT OFFICE 2,414,608

GUN TURRET

George W. Pontius III, South Bend, Ind., assignor to Bendix Aviation Corporation, South Bend, Ind., a corporation of Delaware Application May 5, 1941, Serial No. 391,911

30 Claims. (Cl. 89—37.5)

This invention relates to gun turrets and more particularly to a power actuated turret for the bottom surfaces of airplanes.

The construction, features, mechanisms, and control which will be described in this application are applicable to any type of gun turret, whether it be for a ship, land fortification, tank or airplane. The turret will be described, however (for purposes of illustration only, and not as a limitation of the invention), as a turret designed for use on the bottom surfaces of airplanes.

The proper defense of military airplanes, particularly bombers, involves the separate defense of definite areas with relation to the airplane. One area of defense is that in front of the airplane. This area is easily protected by a forward gunner sitting or standing and facing forward. In some cases he can defend a complete hemispherical field: from straight up to forward and straight down, and from one side to straight forward and to the other side. Thus the forward defense of an airplane is easily accomplished and presents few problems.

The second area of defense is that above the airplane. This too is easily defended by a single gunner in a top turret because he can shoot in a hemispherical field; from forward to straight up and then rearward, to sideways straight up and to the other side. The defence of this area is interrupted only at the rear by the vertical fin of the airplane.

There are two principal ways of defending the tail area. One is adapted for use with the use of two vertical fins on the airplane, one on either side of the centerline of the airplane. The top gunner can then shoot between the vertical fins to cover the tail area. The area about the two vertical fins is left without defense but it is relatively unimportant as compared to the tail area.

The second principal way to defend the tail area, assuming there is a single vertical fin, is to use a tail gunner placed in the extreme tail portion of the airplane. In order to conform to the streamline shape of the tail, this gunner must lie prone and his cone of fire is necessarily small because any great movement of the gun from a "straight back" direction will remove it from a sighting position and the gunner will then be firing blind. A spherical or cylindrical turret in the tail which would give a large cone of fire is seldom used as it requires the use of a sitting gunner, necessitating a large tail terminus which interferes greatly with streamlining. Any interference with streamlining is highly objectionable since modern bomber design is tending toward the fastest airplane possible.

The remaining defense area of an airplane is the bottom, and the invention of this application deals with the defense of this area. The defense of the bottom is complicated by the physical limitations of the gunner. In defending the top side, a gunner can stand in a rotatable, power driven turret, and having guns at about shoulder level, can sight and shoot through a 90° arc to protect a full hemisphere. In defending the bottom side however, there is no way in which a gunner can have only his head projecting below the surface of the plane, and sight and shoot guns through a hemispherical field, unless he is placed in an impossible upside down position.

There are many ways short of a single hemispherical defense of defending the bottom of an airplane. One way thus far found of protecting a hemispherical field on the bottom is to have several gunners shooting through the bottom of the plane, each protecting a portion of the field. The usual means of accomplishing this is through "blisters" which allow movement of guns in a limited cone, while detracting but little from the streamline shape of the airplane.

Another approach to the defense of the bottom side of an airplane has been the use of a "bath tub" structure on the bottom of the airplane. The gunner lying prone in the bottom of the airplane shoots through the vertical end of the "bath tub" and can effectively cover a 70° cone, the top side of which is on a horizontal line. Such "bath tub" structures are usually designed to protect the field toward the rear, being supplemented by blisters or other constructions to protect the remaining part of the bottom side hemisphere. Such bottom defense is much like a complete "blister" defense, requiring several gunners.

Another attempt at bottom defense of an airplane has been the use of retractible, cylindrical turrets enclosing a squatting gunner. The turrets are power driven, rotatable 360° azimuth, and have an effective elevation arc of about 60°, 10° above horizontal and 50° below horizontal. Because of their shape, such turrets have been referred to as "ash can" turrets. During non-combat flying they are retracted within the ship, and are extended only for combat. Because the guns of these turrets can be elevated above horizontal, these turrets make a tail gunner unnecessary for protecting the rear. These turrets, however, impose a severe drag on the airplane, and even when small turrets are available (employing small gunners) the drag sometimes amounts to 50 miles per hour air speed at initial speeds of 300 miles per hour. Also a supplemental gun on the bottom of the ship must be provided to protect the "bottom" arc of the "ash can" turret which the turret itself cannot cover.

This application discloses a turret which alone may protect the bottom of an airplane. The invention is a turret driven by electrical power that has a hemispherical field of fire, and but little wind resistance or drag. The turret is retractible when not in use and is extended for combat only. The gunner remains inside the airplane in a fixed, comfortable position, sighting the guns through a periscope and controlling and firing the guns by manual control of power means. The turret mechanism also includes automatic sighting corrections for any position of the guns and for all conditions of combat.

The guns of my turret are synchronized for common movement and are mounted on the lower end of a hollow rotatable column, where they are elevated and depressed by power means also secured to the bottom end of the column. A periscopic field piece is synchronized with the elevating mechanism to include the field in the direction that the guns are pointing. The periscope as a whole is a decided improvement over other periscopes in that it takes in a wide field, a cone of 45°. The periscope passes through the hollow column supporting the guns. A shallow cylindrical housing protects the bottom part of the turret when extended, and as compared to the prior art, could be referred to as a "dishpan" construction. When the turret is retracted the bottom of the housing is flush with the outside surface of the airplane, resulting in a structure free from drag.

Although the guns of this invention may be elevated above horizontal to protect the tail area it is contemplated that this area will be covered by the upper gunner when the airplane has two vertical fins, or by a tail gunner when the airplane has a single tail fin.

The advantages of my improved turret are several. A single gun mount operated by a single gunner can protect the whole hemispherical bottom field of fire. The guns are rotated in azimuth by power means secured to the airship and acting on the central column. This construction, as compared to rotation by a ring gear surrounding the turret, is much more accurate inasmuch as flexing of the airplane structure does not affect the position control of the guns. The automatic corrections for sighting, the sensitive speed control for the power means, and automatic limit stops in elevation, all add to the effectiveness and accuracy of the turret. Automatic trigger cut-out mechanism for certain gun positions to prevent the airplane from being hit also increases the possibilities of speed in the use of the guns.

Objects

It is therefore an object of the invention to provide a bottom turret for an airplane having at least a full hemispherical field of fire.

It is an object of the invention to provide a bottom turret having a hemispherical field of fire wherein the gunner maintains a fixed comfortable position with respect to the airplane in which the turret is mounted.

It is an object to provide a turret having no drag or air resistance while not in use, and which has but little drag when in use.

It is an object to provide periscopic means for the sighting of guns, which periscope has at least a 45° field.

It is an object of the invention to provide a power operated turret for the bottom of an airplane.

It is an object to provide a turret mounted on a central column, the control of which is unaffected by stresses in the airship in which the turret is mounted.

It is an object to provide mechanism whereby a single power unit can selectively retract the turret or rotate it in azimuth.

It is also an object to provide sensitive manual controls for the power units to regulate their speeds closely.

It is also an object to provide the power controls with a selective two-step source of power to increase the range of sensitivity of the controls.

It is an object to provide means on the control handle for cutting off all power if the gunner should relax his grip, and thus provide a "deadman" control.

It is an object to provide automatic stops to limit the elevation and depression of the guns.

It is an object to provide automatic stops to limit the retraction and extension of the turret.

It is an object to provide power means for firing a gun which means are manually controlled by the gunner.

It is an object to provide cut-out means for the power firing means to make firing impossible when the gun is pointed at portions of the airplane itself.

It is also an object to provide periscope sighting means for the guns of the turret.

Another object is to provide automatic corrections in the sighting apparatus for lead and for ballistics of the guns in the turret.

It is an object to provide a gun turret having manually controlled power charging mechanism for the guns.

It is an object to provide a turret having guns equipped with recoil absorbing mechanisms to reduce stresses in the turret.

It is an object to provide a turret having ammunition containers which rotate in azimuth with the guns, and which have feeding means to supply the guns of the turret with ammunition at any point in the elevation arc.

These and other objects and advantages of the invention will appear in the following description and claims which may best be understood when considered in connection with the accompanying drawings, in which:

Description of drawings

Figure 5 is a sectional view in elevation of the

The arrangement of parts is shown in Figure 12 which is a transverse section of the column 124. The periscope tube 306 is centrally held in column 124 by a brace member 308 secured to column 124. Tube 306 rotates with column 124, and terminates at its upper end just under the hollow head cushion 304 shown in Figure 5.

Figure 4:
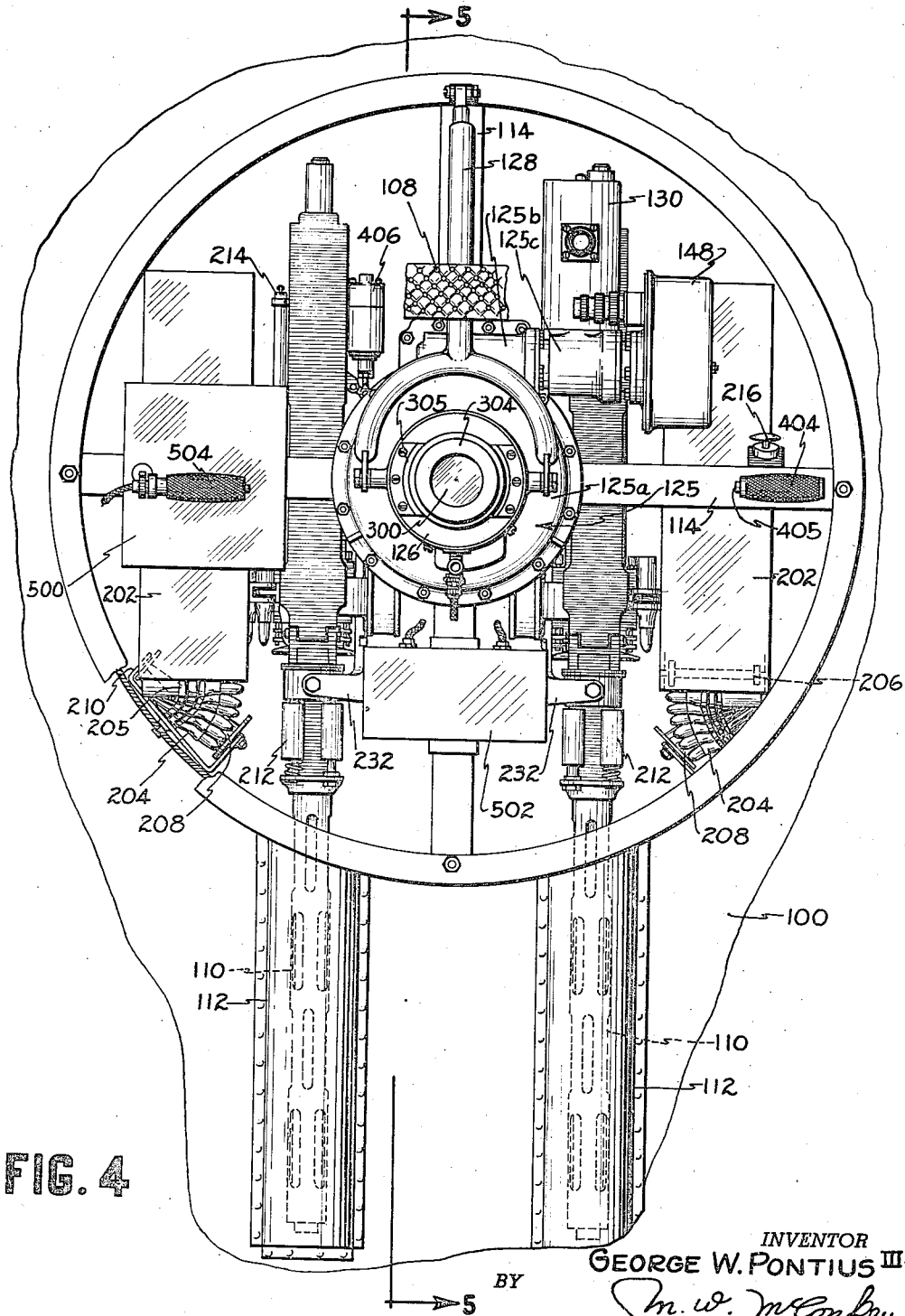
Figure 4 is a top view of the completely assembled turret as seen from the inside of an airplane in which it is mounted.

The hydraulic chargers referred to above in connection with Figure 4 must be supplied with hydraulic fluid for operation. Since the turret must be free to rotate in azimuth in either direction for any given number of revolutions, this fluid is most conveniently supplied through the central column 124. For this purpose head 126 (Figure 10) is provided with an annular gland 238 sealed by rings 240. An elbow fitting 242 passes fluid to the gland 238 from charger valve 216 (Figure 4). The hydraulic passageway inside column 124 (Figures 12 and 14) is a tube 244 held to column 124 by a fitting 246, and receiving fluid from gland 238 through a hole 241 in column 124, communicating at all times with annular gland 238. The rest of the hydraulic connections are solid connections since the guns rotate with the column in azimuth and the allowance for rotation in the limited elevation arc can be accomplished by having play in the hydraulic conduits from the bottom of the column 124 to the gun chargers 214.

The electrical conductors for the rotatable part of the turret must also pass through the central column 124. Power must be sent to the elevation motor, as well as to some of the relays. Also circuits for the trigger and controls must be completed through conductors in the column. These circuits pass through stationary brushes which wipe slip rings fastened to the column, which in turn are connected to conductors inside column 124. This structure will now be described, with reference to Figures 10, 12 and 15.

A ring 250 of insulator material is assembled on the column by being slipped over the upper end of column 124 and moved down to an annular ledge 252 on column 124. A sleeve 254 of insulator material is next fitted snugly around column 124 and rests on bottom insulator ring 250. Slip rings 256 are next fitted over sleeve 254 alternating with insulator rings 258 of slightly larger diameter. The slip rings 256 are preferably of silver plated copper. A top insulator ring 260 is placed on top of sleeve 254, and head 126 rides on and is supported on this sleeve and ring assembly. An annular nut 262 (Figure 10) screwed on the top end of column 124 prevents head 126 from being removed from the column. It will be noted that the two top slip rings 256 are larger than the others. They are thus adapted to carry larger currents. One large slip ring carries current to elevation motor 172 and the other carries current for the firing solenoids and the controls.

The brushes for passing current to, or taking current from, slip rings 256 are shown in Figures 10 and 13. A longitudinal section of head 126 is cut away and replaced by a fitted piece of insulator material 264. The brushes 266 for the top two slip rings are fastened to insulator 264 as shown in Figure 13. The conductors 268 are swaged or soldered into a head bolt 270 which passes through insulator 264 to hold spring clips 271 and conductor wires 272 which lead to brushes 266. Brushes 266 are also held in position by hinges, one part 273 being riveted to insulator 264 and the other 274 fastened to brush 266. By this structure the brushes are positioned against slip rings 256 and form a good contact with them. Brushes 266 are preferably formed of silver graphite.

The contacts with the smaller slip rings may be brushes of construction similar to brushes 266. As shown in Figure 10, however, they are merely V-shaped spring metal contacts 275 with the ends touching slip rings 256 and with the apex riveted to insulator 264 by conductor rivets 276 having conductors 268 fastened to their heads.

The outer ends of conductors 268 are gathered into sockets 277 (Figure 10) held in a box 278 fastened to head 126. A mating plug member 279 having a contact prong for each conductor is pushed into socket members 277. This use of sockets and plugs aids in the assembly of parts, and it will be noted that connections are made at every piece of apparatus in the turret by means of these sockets 277 and plugs 279.

The means for conducting current from slip rings 256 to the inside of column 124 are shown in Figure 15. A longitudinal section of column 124 is cut away and replaced by an insulator section 280. On the inside of the column 124 the ends of conductors 281 are individually swaged or soldered to nuts 282. A screw 283 is then passed through each slip ring 256, through sleeve 254 and through insulator 280 to thread into nuts 282. By this construction the inside wires 281 are connected to slip rings 256, and insulator 280 is held against sleeve 254.

The inside conductors are gathered into conduits 284 as shown in Figures 12 and 15. Conduits 284 lead wires 281 to the bottom of column 124, where they are led to the relay box 607 (see Figure 5) and to other parts.

The mechanical movements of the lower part of the turret are shown in detail in Figures 16 and 17. The housing 174 is bolted to the lower end of column 124, and houses the elevation gear train described with relation to Figure 3. The motor 172 is fastened to housing 174 and causes worm screw 168 to rotate as its motor shaft 170 rotates. Worm screw 168 in turn engages worm wheel 166 causing it to rotate. Worm wheel 166 has an integral splined sleeve 165, which, through its connection with drive shaft 164, causes that shaft to rotate. Worm screw 162, being integrally formed on drive shaft 164 drives worm wheel sector 160, splined on gun shaft 156. Gun shaft 156 (Figure 17) is held in needle bearings 161 in frame 174.

Gun yoke arms 232 splined to both ends of the gun shaft 156 and secured thereto by nuts 233 support the guns 110 for vertical movement. As best shown in Figure 16, the arm 232 comprises an integral yoke member disposed at its forward end adapted to embrace a recoil mechanism 212 and a longitudinal slot 234 at the rear end of the arm for the reception of a bolt 236 which is transversely secured to the gun. The slot 234 is slightly longer than the amount of movement occasioned by the recoil stroke of the gun proper as allowed by the recoil unit 212. From the foregoing, it will be clear that the guns are actually supported on gun shaft 156 by means of yoke arm 232 and not directly as might be thought from the diagrammatic showing of Figure 3.

The elevation compensator 176 is also shown in detail in Figure 16. A compensator drive shaft 177 having a splined head 178 fits in splined sleeve 165 of worm wheel 166 and has a worm screw (not shown) which drives a compensator worm wheel 612 secured to an elevation compensator shaft 614. The construction of the elevation compensator 176 is much like that of the azimuth compensator shown in Figures 7 and 8. However, four cams for opening and closing switches are attached to one end of shaft 614. One cam 410 relates to the trigger system, and the other three relate to the control and the retract systems, cam 506 being the retract position cam, cam 508 the lower limit cam, and cam 510 the upper limit cam. The lower end of shaft 614 drives a potentiometer unit 616 comprising a resistance unit associated with the sight compensation system.

Since the guns move in elevation only through an arc of 90°, the corresponding movement of compensator shaft 614 can be multiplied to increase sensitivity. Accordingly, the gear drive of compensator shaft 614 multiplies the movement of gun shaft 156 about three times, giving a sweep of about 270° corresponding to the 90° arc of elevation.

Periscope

The periscope system 300 of the turret is shown in Figures 18 through 25, and is shown diagrammatically in Figure 18. The periscope comprises in the main a periscope tube 306, and a sight box 302. A member 308 encircles the periscope tube 306 and is fastened to the column 124 in any suitable manner, such as welding. This arrangement holds the periscope tube securely in the column. The periscope tube 306 is formed in three pieces. At the top is an eye-piece tube 310 retaining eye-piece lenses 312 and 314. Eye-piece tube 310 rotates within cushion 304 on bearings 311, which insure that there will be no binding of the two parts.

The lower portion of periscope tube 306 comprises an upper spacer member 316 and a lower spacer member 318 in each of which there are positioned lenses having an "erector" function to invert the image to an upright or normal position for views directly to the rear of the airplane. The upper end of spacer member 316 retains a plate glass piece 320 on the bottom side of which is focused the image viewed by the eye-piece lenses 312 and 314. A lens 322 is also placed near the upper end of spacer tube 316 and helps to focus the image on the bottom of plate 320. The lower spacer tube 318 retains erector lenses 324 which are held by snap springs 325 in a perforated housing 326 secured to the upper end of tube 318. Housing 326 is held in lower spacer tube 318 by screws 327 fitting in longitudinal slots 328 in tube 318, as shown in detail in Figure 19. Slots 328 allow adjustment of the erector housing 326. Lower spacer tube 318 also retains a fixed diaphragm or stop 329 for eliminating ambient rays of light. The lower end of spacer tube 318 is screwed into sight box 302.

The sight box 302 is also shown diagrammatically in Figure 18. It includes the rotatable prism 301 having the shape of an isosceles right triangle. Light refracted into prism 301 is reflected into a compound objective lens 330. Objective lens 330 is made up of two plano-convex lenses with a spaced intermediate double-concave lens of material having a different index of refraction from the outer lenses, to form an achromatic lens group. A diaphragm or stop 331 is placed over the outer side of lens 330 to stop ambient light from entering that lens.

Light which passes through lens 330 from prism 301 is reflected by a mirror 332 placed at an angle of 45° to the axis of the objective lens 330 and to the axis of the periscope tube 306. The light so reflected forms an image in the plane I—I, just above the mirror 332. Two lenses 340 are placed in sight box 302 above this image plane and they help to bend light rays passing through them from the image to the erector lenses 324.

The paths of rays of light are shown diagrammatically in Figure 18. The ray T represents a ray on the upper side or top of the cone of the field of the periscope system, which cone has an angle of approximately 45°. Ray C represents a horizontal center ray in the field cone, and ray B represents a bottom ray in the field cone. The window surface AB of the prism 301 refracts all of these rays to the hypotenuse surface AC where they are reflected out of the prism at one end of the surface CB, and into the objective lens 330. The fixed diaphragm 331 is placed over the outer surface of the plano-convex lens nearest the prism, causing all rays of light that enter the lens 330 to cross in or near the outer lens. The objective lens 330 causes the rays of light to form an image, and because of the interposition of mirror 332, this image is formed in a plane parallel to the axis of objective lens 330.

Figure 2:
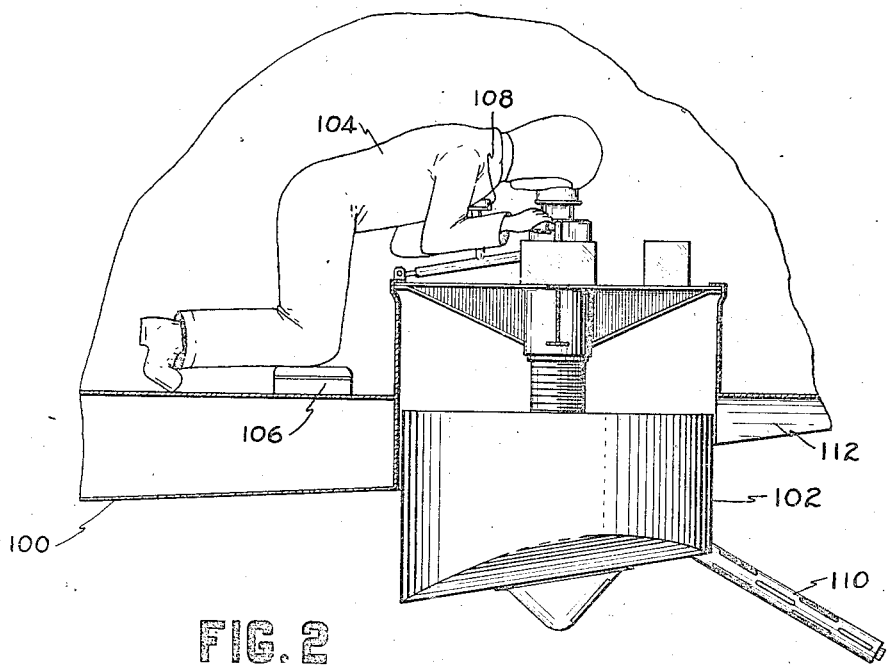
Figure 2 is an enlarged sectional view of the air ship of Figure 1 in the region of the turret, showing the turret in an extended or operative position and being at the instant controlled and fired by a gunner.

Assuming that the sight box 302 is pointed toward the rear of the airplane 100, the gunner will be crouched facing toward the rear also, as in Figure 2. If there were no lenses in periscope tube 306, the image on plane I—I would appear upside down to the gunner on plane I—I since the ray T will be at the left in Figure 18, and therefore to the bottom of the gunner's image, and the ray B will be at the right in Figure 18, or to the top of the gunner's image. In order to make this image appear right side up, or erected, erector lenses 324 are interposed between image I—I and the eye piece 310. Erector lenses 324, with the aid of lenses 340 and 322 form an erect image of the objects to the rear, in the plane I2—I2. The ray T is to the right or the top of the gunner's image in plane I2—I2, and ray B is to the left, or to the bottom of the gunner's image in this plane I2—I2. The eye-piece takes rays from the image I2—I2 and concentrates them for the gunner's eye at the top of the cushion 304 where the gunner's head will be resting. It will be noted that the convergence of the rays at the top of the eye-piece is at an angle approximately equal to that of the field rays T and B, resulting in practically no magnification of the image which gives a "natural" size image, allowing the gunner to estimate the range of a target.

Figure 20 shows the prism 301 in the other extreme position, taking in a vertical cone of field. As in Figure 18, the prism 301 will refract and reflect the light into the lens 330 which condenses it for forming an image on the plane I—I. Figure 20 shows the path of light for this straight down position, as compared to Figure 18 which shows it for the horizontal position. Any intermediate position of the prism 301 would give rays of light in paths intermediate those shown in Figures 18 and 20.

The periscope of this application with a field of about 45° gives a larger field than prior periscopes which are believed to have given fields of only about 20° or 25°. The larger field obtained by the present periscope is due first, to an objective lens that will take in a field of 45°, and second, to a prism that will transmit a 45° field to such a lens at all positions of rotation. The lens must have a low ratio of focal length over effective light transmitting area and should be of F2.8 or less in rating. Camera lenses have been found satisfactory for this purpose.

The prism 301 must be relatively large as compared to those in use in prior periscopes. A three inch prism, for example, is required in the presin compensator box 148 relates to sight compensation or correction, this box 148 is called a compensator box, or simply the azimuth compensator.

Parts of the turret attached to the bottom end of column 124 also are shown in Figure 4. Mounted at the outer side of each gun 110 are ammunition cans 202. Cartridges 204 formed into the belts by clips 205 are fed out of the cans 202 and into the guns 110 by wheels 206 and 208 which will be described later.

The guns 110 are shown in Figure 4 and associated with them are recoil absorbing mechanisms 212 in which the guns are mounted. These recoil mechanisms are fully described in application Serial No. 314,902 filed January 22, 1940 on behalf of White, now Patent No. 2,332,297. These recoil mechanisms 212 support the forward end of guns 110, and reduce stresses in the turret by absorbing the impact of acceleration of the projectiles fired from the guns 110.

The guns 110 may be of any type of small calibre guns or cannon, but are preferably automatic in action to increase the fire power of the turret. For this purpose some type of large calibre machine gun or automatic cannon such as a 20 mm. cannon is desirable. The guns shown are .50 calibre machine guns which can be fed with ammunition from either side.

As may be seen in Figure 4, attached to the inner side of one of the guns 110 is an electric solenoid 406 which is provided for firing said gun. A similar solenoid is provided for the other gun. The electrical circuits for firing these solenoids will be described later.

On the outer side of each gun as shown opposite to the solenoid 406 there is provided a hydraulic charging cylinder such as 214 provided for the purpose of charging the gun when it becomes jammed. This cylinder 214 is fully described in application Serial No. 371,742 filed December 26, 1940, on behalf of Pontius and Wilson. There is placed on spider 114 near trigger grip 404 a hand-operated charging valve 216. This valve 216 is fully described in application Serial No. 311,978 filed January 2, 1940 on behalf of White and Pontius, now Patent No. 2,332,419. By operating valve 216 the gunner can charge the guns 112 when either becomes jammed.

Figure 5:
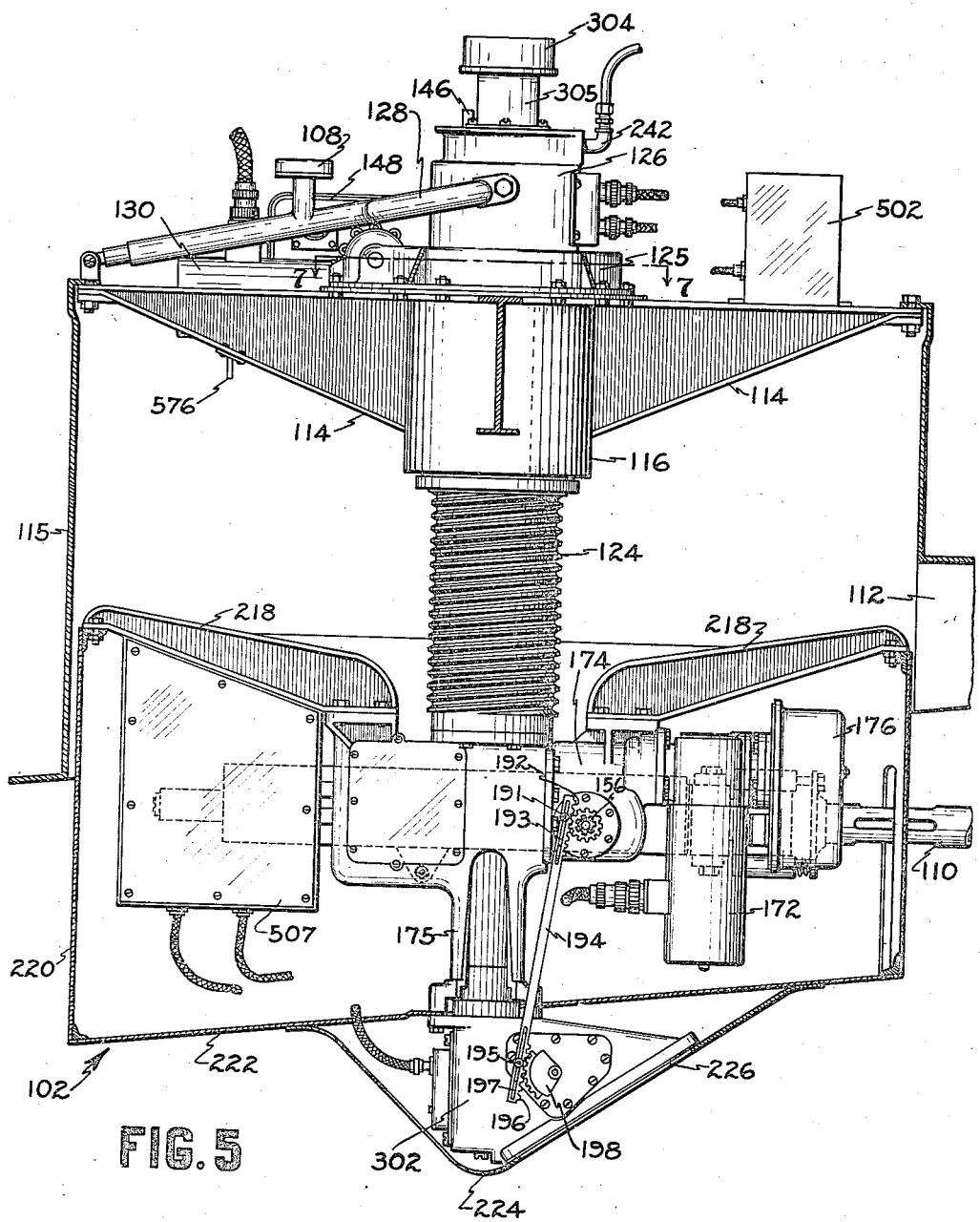

A sectional view of the turret is shown in Figure 5 which is a section along the line 5—5 of Figure 4. Mounted on the spider 114 is the housing 125 which encloses the azimuth gear train described in connection with Figure 3, and to which is attached the azimuth motor 136 and the azimuth compensator 148. The yoke 128 supports chest cushion 108 and keeps head 126 from rotating. Mounted to head 126 by the bracket 305 is the ring-shaped head rest cushion 304, through which the gunner looks to use the periscope. A retracting lever 146 just above head 126 and under cushion 304 is connected to connector key 144 shown in Figure 4, by mechanism which will be described later. By moving this lever the gunner makes the necessary mechanical connections for retracting the turret.

The lower parts of the turret are also shown in Figure 5. Bolted to the bottom of threaded column 124 is a housing 174 which houses the elevation gear train described with relation to Figure 3. Attached to the housing 174 are the elevation motor 172 and an elevation compensator box 176. Secured to the top of housing 176 are two arms 218 which extend oppositely in line with the guns, to support a cylindrical shell 220 surrounding the lower part of the turret to protect it from the wind while it is extended. Fastened to the arm 218 adjacent to the rear of the guns 110 is a lower relay box 507 which houses relays and switches connected with the operation of the lower part of the turret. A fairing 222 covers the bottom of the turret and is fastened to the bottom edges of shell 220. The central part of fairing 222 is secured to a downward projection 175 from casing 174. Projection 175 also supports a periscope head or sight box unit 302. Sight box 302 is protected from the wind by a hump-shaped fairing 224 having an opening 226 for admitting light to the sight box 302. Hump-shaped fairing 224 is fastened to bottom fairing 222.

Various other parts already identified are shown in Figure 5. These include the gun shaft 156 on which are mounted the guns 110, only one of which is shown in Figure 5. The gear 190 on gun shaft 156 contacts rack 192 on bar 194, and rack 196 on the lower end of bar 194 drives gear sector 198. An upper pin 191 passes through a longitudinal slot 193 in the upper end of bar 194 and is secured in casing 174 to guide the upper end of bar 194. A similar pin 195 passing through a lower longitudinal slot 197 in bar 194 and secured in the casing of sight box 302 guides the lower end of bar 194.

Figure 6:
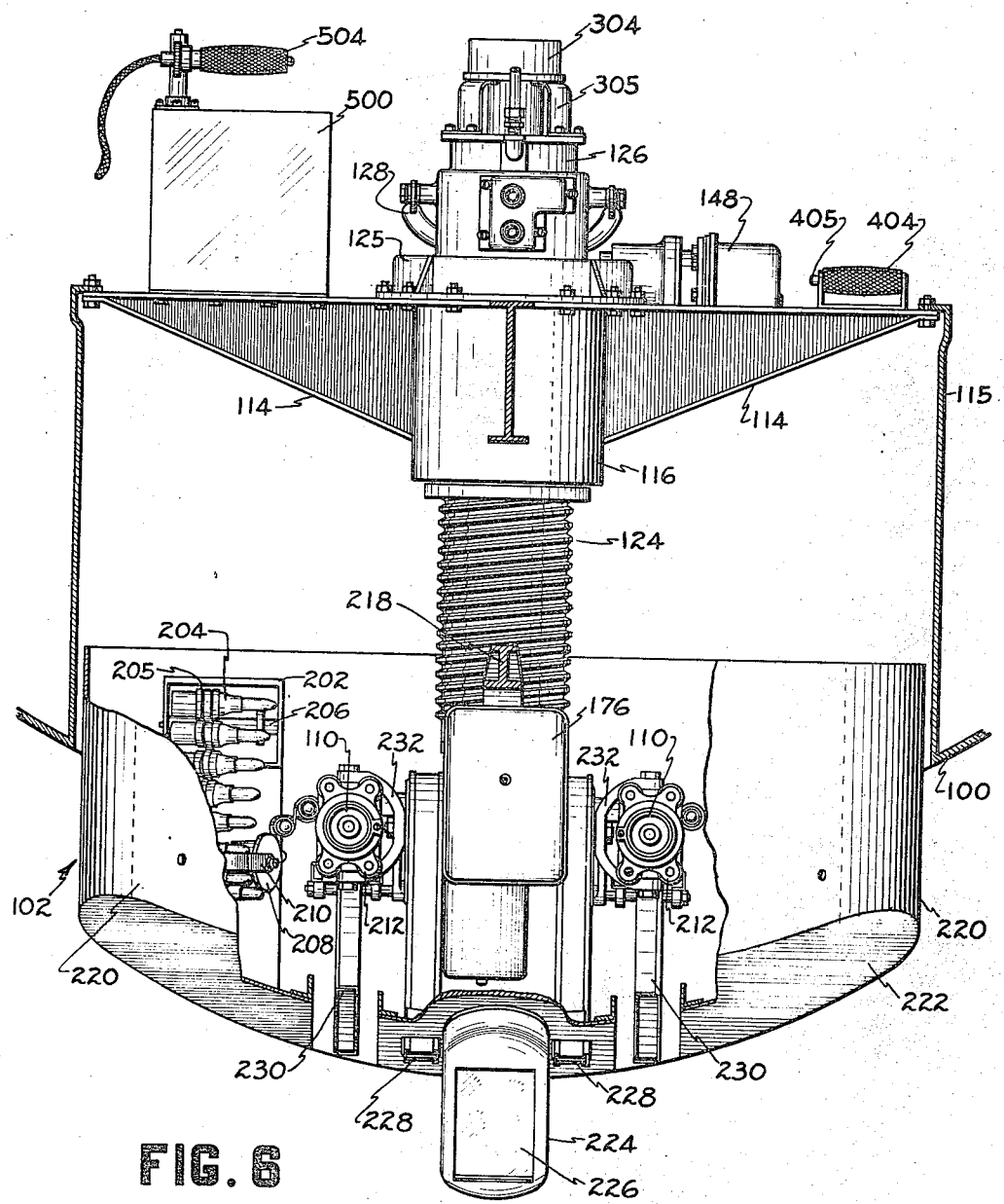

A view of the turret with part of the cylindrical shell 220 broken away and looking at the front of the guns 110, is shown in Figure 6. The ammunition feed mechanism is best shown in this view. Ammunition can 202 has a wheel 206 mounted near its rim, over which the belted ammunition 204 is pulled by the gun. The belt of ammunition is then fed around and under a lower wheel 208 which is mounted in a yoke 210 having a swivel mounting on cylindrical shell 220. Wheels 208 are preferably in the form of tapered rollers with the broad end toward the guns 110. As will be noted from an examination of Figure 4, the axis of each wheel 208 in a horizontal plane is approximately 15° to the axis of the associated gun 110. The axis of the wheel 208 in a vertical plane will vary from horizontal when the gun 110 is horizontal to about 45° from horizontal when the gun 110 is pointing straight down. The action of wheel 208 allows the belted ammunition to make the 90° turn from the ammunition can to the transverse feed path at the guns. The swivel action of yoke 210 allows wheel 208 to follow the elevation position of the gun and supply ammunition to it at any point on the elevation arc.

The guns 110 contain feed mechanism (not shown) that pulls the belted ammunition 204 into the guns. This mechanism is reversible to change the direction of feed of the guns so as to feed either from one side or the other thus allowing both guns 110 to feed from the outside with regard to the turret. The gun feed mechanism pulls the belt into the gun, pulls a cartridge out of the belt, and pushes the cartridge into the firing chamber. Pulling a cartridge out of the belt releases one of the metal links or clips 205 from the belt, allowing it to come free. These links 205 are pushed out the inner side of the guns by succeeding links, and fall down clip chutes 228 one of which is shown in Figure 6 on each side of the motor 172 and both of which pass through the bottom fairing 222 of the turret. The links thus fall out of the turret to the ground.

At the same time that a new shell is being fed into the firing chamber of one gun 110, the casing of the fired shell is ejected from the bottom of the gun and falls into a chute 230 which also passes through the turret bottom fairing 222. By this path the shell casings also fall from the turret to the ground.

It will be noted also in Figure 6 that a yoke arm 232 encircles and supports the associated recoil unit 212 within which the gun reciprocates during firing operations. Yoke arms 232 are also shown in Figure 4. These yoke arms will be described in more detail later with reference to Figure 16.

The details of the azimuth drive for the turret are shown in Figures 7, 8 and 9. The housing 125 encloses and supports the driving train described in connection with Figure 3. Referring to Figure 9, the motor shaft 134 of azimuth motor 130 drives worm screw 136 which in turn drives worm wheel 138 splined on the drive shaft 140.

The drive from the worm wheel 138 and shaft 140 are shown in a top view in Figure 7. Worm wheel 138 is integrally formed with an internally splined sleeve 137 which is mounted for rotation in casing 125 in bearings 139. Drive shaft 140 has worm screw 142 integrally formed thereon, this screw engaging ring gear 122, which in turn drives the turret. Drive shaft 140 is secured in housing 125 by a two-way thrust bearing 141.

The mechanical drive for the azimuth compensator is also shown in Figure 7. Splined sleeve 137 protrudes beyond the outer end of drive shaft 140. A compensator drive shaft 149 has a splined end 149a which fits the internal splines of sleeve 137, and has an integral worm screw 151. Splined end 149a is inserted in splined sleeve 137, and by this arrangement worm screw 151 drives a compensator worm wheel 604 (Figure 8) which is secured to an azimuth compensator shaft 602. As shown in Figure 7, a trigger cam 498 is mounted on compensator shaft 602, and is used to open and close a switch as will be described later with reference to the trigger circuit. The other end of shaft 602 drives a potentiometer unit 610 comprising four electrical cams, and these and their operation for sight compensation will be described later with reference to the sight compensation electrical circuit. The ratio of reduction between worm screw 142 and ring gear 122 is the same as that between compensator screw 151 and worm wheel 604, so that compensator shaft 602 rotates at the same speed, and in synchronism with, ring gear 122 which drives the turret 102 in azimuth.

Figure 3:
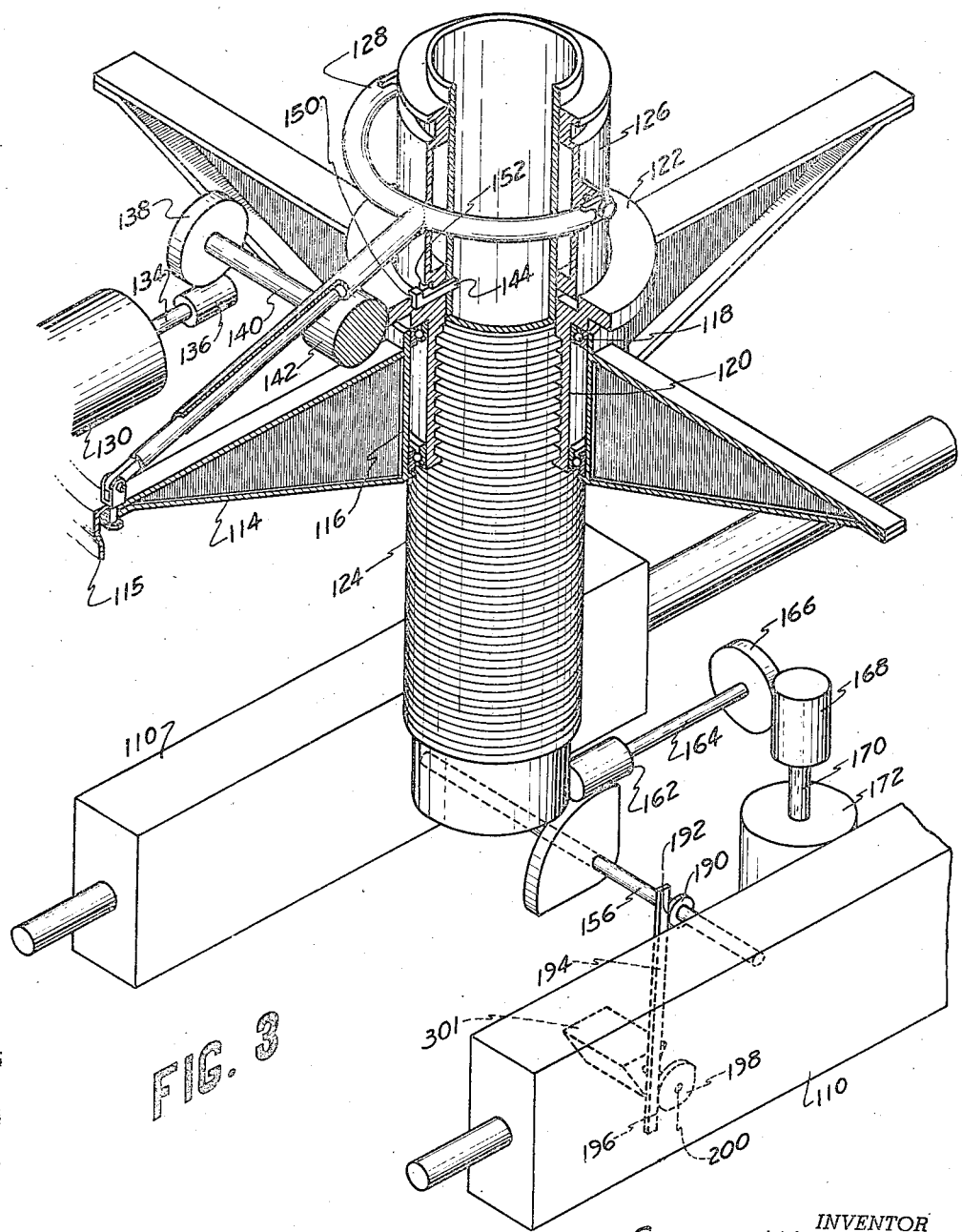
Figure 3 is an isometric, schematic sketch of the turret in an extended position, partly in section and showing the mechanical parts and movements.

The details of the upper end of the central column 124 of the turret are shown in Figures 10, 11, 12, 13, 14 and 15. The parts described with reference to diagrammatic sketch Figure 3 are readily distinguishable in Figure 10. Spider 114 supports central collar 116 within which internally threaded sleeve 120 rotates in bearings 118. Ring gear 122 is bolted to sleeve 120 and drives it. Central column 124 is held in threaded sleeve 120 and in this way supports the lower end of the turret. Housing 125 is mounted on spider 114, and encircles ring gear 122 and retains the driving train including worm screw 142 which drives ring gear 122. Housing 125 is sealed to prevent leakage of lubricant and to keep out dirt by an upper annular seal 143 and a lower annular seal 145, both of which are held in casing 125 and wipe a portion of sleeve 120 on either side of ring gear 122.

Figure 10 also shows the mechanism for selectively connecting column 124 to non-rotatable head 126 or to threaded sleeve 120. A recess in the inner side of sleeve 120 near the top forms the notch 150 referred to in Figure 3. An annular end plate 153 having a downwardly projecting flange 153a is screwed to the bottom of non-rotatable head 126. A notch cut in the flange acts as the notch 152 described with reference to Figure 3. A spring pressed button 154 is held in a recess in the bottom edge of head 126 by end plate 153. However, end plate 153 has an opening allowing a reduced head of button 154 to protrude therethrough at times. The L-shaped key 144 is fitted into an aperture 155 in column 124. By moving key 144 into sleeve notch 150 or into contact with head notch 152, the column may selectively be rotated, or retracted and/or extended respectively.

The mechanism for moving key 144 is attached to the inside of column 124. At the upper end of column 124a retract lever 146 is mounted on a pivot 147 welded to the inside of column 124. Lever 146 is shown in profile in Figure 11, where it is shown to be a bent lever pivoted at the bend. The top part of lever 146 projects beyond the top of column 124 where the gunner can manipulate it as desired. The bent end of lever 146 is connected by a link 157 to one end of a bell crank 158 pivoted on an ear 159 welded to column 124. The other end of bell crank 158 is fitted in a slot in connector key 144 and acts against a compression spring 144a to pull the key 144 inward to contact notch 152 in head 126.

Figure 1:
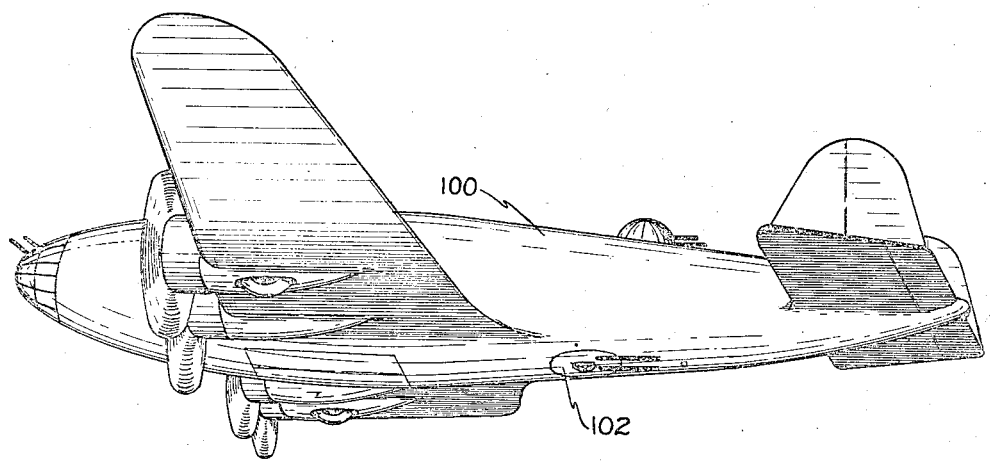
Figure 1 is a side view of an airplane having a bottom turret in a retracted position made according to the present invention.

In normal operation, spring 144a causes key 144 to engage notch 150 in sleeve 120, connecting column 124 to sleeve 120. Column 124 (and also the turret) will rotate according to the rotation of sleeve 122. If the gunner should now desire to retract the turret, he rotates the guns to point toward the rear, bringing the retracting lever 146 on the forward or gunner side of periscope tube 306, into a position as shown in Figure 5. While slowly rotating the guns in azimuth toward the rear position, the gunner presses on the lever 146 tending to move key 144 out of sleeve notch 150 and into head notch 152. When key 144 rotates with column 124 to a position opposite notch 152 the key 144 will be able to move into it, stopping the turret from further rotation. Sleeve 122 will continue to rotate, however, and will screw column 124 up into airplane 100 as shown in Figure 1.

When column 124 has been retracted a small amount, the head of button 154 will project below end plate 153. If retract lever 146 should now be released, spring 144a would move key 144 outward until it contacted button 154. In this way button 154 acts as a stop for key 144 while the turret is retracted.

If, when the turret is retracted, the gunner wishes to extend it he merely reverses the direction of rotation of azimuth motor 130 from that required to retract the turret, and sleeve 120 will then screw the turret down. As the turret approaches the lower limit of extension, the outer end of key 144 will slide past the upper edge of sleeve 120 because button 154 keeps key 144 within that dimensional limit. At the same time button 154 will contact the top of sleeve 120 and be forced upwardly into its recess. At the lower limit of extension key 144 comes into alignment with notch 150 in sleeve 120 and is snapped into it by the action of spring 144a. Column 124 will then be at its lower limit of extension and will immediately start to rotate and the turret is ready for use.

The periscope 300 of the turret shown generally in Figure 4 has a tube 306 shown in Figure 10. The tube 306 passes through central column 124.

ent periscope. The shaft about which the prism rotates must be placed so that when the prism rotates the prism will be as close as possible to the lens 330. This placement of the axis of rotation is very important as otherwise the prism cannot transmit the necessary field to the lens. The placement of the pivot shaft for the prism with regard to synchronism with the guns is unimportant as long as the prism rotates near lens 330. All that is required, once a given position of the prism is found to include a field into the center of which the guns will fire, is that the prism will rotate only one-half as much as the guns rotate in elevation above or below such a position. This limitation to one-half the rotation of the guns is due to the mirror function of the prism, wherein the included angle of reflection of a fixed ray of light will increase or decrease twice as much as the angle the mirror surface itself is rotated.

The sight box 302 also retains two movable cross hairs for sighting purposes, the details of which will be described later. Both cross hairs are in the image plane I—I, so that they will appear to be a part of the image viewed by the gunner, and will not appear to move if the gunner should move his head about on the cushion 304. One cross hair appears to be vertical in an upright field, and the other appears to be horizontal in an upright field. They are both movable laterally to their axes by automatic electrical means for ballistic corrections, and thus move about on the round image field viewed by the gunners.

The plate glass member 320 has a dot DC impressed in its center for orienting the initial position of the cross hairs relative to the field. There is also a dot DT impressed on plate glass 320 which would appear to be on the upper part of the vertical hair when the hair is in a normal position and the field is toward the rear of the plane. This dot is to relate the turret to the cross hairs so that the gunner will know which way to move the turret to train the cross hairs on the target.

It will be noted that a passage 341 in the upper part of sight box 302 communicates the right hand part of the sight box with the periscope tube 306, and that a passage 342 communicating said right hand part of the sight box with the left part of the sight box. These passages and the holes formed through perforated housing 326 allow the communication of air between the sight box 302 and the tube 306. By providing a water absorbing cell or unit in the sight box, which cell will be described later, the major part of the periscope can be dehydrated to prevent the condensation of moisture on the optical pieces as they become chilled due to climatic or altitudinal changes in temperature. Elimination of condensation is very important and the means just described to eliminate condensation forms a feature of the invention.

The view of an object as seen by the gunner through the periscope is shown in Figure 21. The gunner 104 is shown in a top view looking down the periscope as he crouches facing toward the rear of the plane. Target airplanes 344 flying in the horizontal plane including the sight box of the periscope in the middle thereof, are shown in four positions, to the rear (to the right in Figure 21); to the side toward the gunner's left (top in Figure 21); to the front of the plane (left in Figure 21); and to the side toward the gunner's right (bottom in Figure 21). The view the gunner would see if the periscope were properly orientated in each case is opposite each of the target airplanes 344, and is a round field having a side view of the airplanes 344 therein. The cross hairs are in the middle of the field, and the orientation dot DT appears to be on the vertical cross hair in every case.

It will be noted that the only upright or exact image relative to the gunner himself is at the rear of the airplane. As he looks at the airplane to his left the target airplane 344 appears to stand on its nose. Likewise, the target airplane to the front of the plane appears to be upside down relative to the gunner, and the airplane to his right appears to be standing on its tail. In every view, however, the orientation dot DT indicates to the gunner the true position and direction of flight of the target airplane relative to the cross hairs and the field. From this it is apparent that the gunner must not aim and fire the gun relative to himself as he would be hopelessly confused by the various positions and directions that a target plane would assume for a given "cross hair" position of the target on the field. The gunner must completely detach himself from consideration, and follow the target and aim the guns by association of the target with dot DT in the field. The gunner will train himself to a given muscular reaction for a given position and direction of the target in the field, regardless of the direction in which the guns are pointed with relation to the airplane in which they are mounted. The erector lenses are provided chiefly for conventional reasons and also because the most important job which this gunner has is to protect against an attack from the rear.

The details of construction of the sight box 302 are shown in Figures 22, 23, 24 and 25. The sight box itself is divided into two main parts, a hood 350 for the prism 301, and an image box 352. These two parts are separated by a wall 351, which wall also supports the objective lens 330 and has the de-hydrating hole 342. The prism 301 is mounted on shaft 200, as is shown generally in Figure 3 but specifically as is shown in more detail in Figures 23 and 25. In Figures 23 and 25 it will be noted that shaft 200 supports prism 301 by means of a housing 354 which covers the top and the sides of prism 301. The prism 301 is held in the housing 354 by a clamp bar 356 which presses a notched rubber cushion 358 against the apex of the prism 301 (Figure 22). Shoulders 355 (Figure 25) contact the upper edges of prism 301 and thereby hold the prism without danger of scratching the central part of the upper surface which is the reflector surface AC of the prism. Shaft 200, as shown in Figure 23, is essentially two stubs screwed into housing 354 and journalled in hood 350.

The details of construction of the gear sector 198 which rotates prism shaft 200 are also shown in detail in Figures 23 and 25. As already explained, the prism 301 needs to rotate only one-half as much as the guns 110 are elevated or depressed to be in synchronism with them, because of the mirror function of the prism. As shown in Figure 5, the gear sector is of twice the radius (and consequently sector circumference) as the driving gear 190 on gun shaft 256, thus providing a 2 to 1 reduction in rotation. Referring to Figure 25, it is pointed out that gear sector 198 is mounted freely on shaft 200, but drives it through an adjustment member 199 secured to shaft 200 and having adjustment screws 201 bearing on sector 198. This arrangement of parts allows for the very minute adjustments necessary to synchronize the prism 301 with the guns 110.

A piece of flexible opaque sheeting 360 (Figure 22) of leather or rubber is attached to housing 350 by clamping against cushion 358 by clamp bar 356. The other end is fastened by screws to partition 351. Sheeting 360 prevents light from directly entering lens 330 or the face BC of prism 301.

Hood 350 is closed by a window of glass 362 clamped against a gasket 364 by a rim 366 screwed to hood 350. All rays of light entering the periscope must pass through this window, and for this purpose it must be long enough to pass a full field to the prism 301 for all positions of rotation.

The details of construction of the cross hairs are shown best in Figure 24. Two permanent magnets 370 of "horseshoe" shape, each having a rotor 372 of any well known construction such as are used in galvanometers. Each rotor is attached to a U-shaped member 374 having a fine metal cross hair wire 376 across the upper ends. The U-members 374 with rotor attached are suitably journalled on each end by hardened, pointed tips 378 fitting in a recess in hardened heads 380 held in image box 352. Electric current is supplied to the galvanometer units by wires leading from socket 277 (Figure 22) which wires are connected as shown in Figure 24 to hair springs 382 (only two of which are seen) at the journals for both U-members 374. Current flows into one hair spring, goes through the associated rotor 372 and through the bottom leg of U-member 374 to the other hair spring where the current leaves the member. Hair springs 382 help to center the U-members 374 as well as pass current through the rotors 372. The journals and hair springs at the rotor end of the U-members are not shown, but they are of the same construction as those shown. It will be noted that one leg of one U-member is curved over part of its length to accommodate the casing of objective lens 330. Counterweights 384 help to balance the U-members.

Referring still to Figure 22 it may be seen that the mirror 332 is mounted on a standard 334 attached to the bottom of image box 352. The mirror reflects the light rays so that an image is formed in plane I—I just above it. It will be noted that the cross hairs 376 are very near this plane so that they appear to be a part of the image viewed by the gunner.

The cross hairs are placed at right angles to each other, and can move either side of dead center, depending upon the direction of the current going through rotors 372. The magnitude of the movement depends upon the voltage across rotors 372. These two factors, magnitude and direction of the current, cause the cross hairs to move independently and to move relative to the field of the periscope, in correcting for ballistics deflection and lead. The gunner has merely to move the turret and guns so that the cross hairs intersect at the point on the target at which he desires to hit it. The electrical circuit and its parts for moving these cross hairs will be later described.

As shown in Figures 22 and 23, a tubular cell of screen or perforated metal 386 is screwed into the bottom of image box 350. This cell is filled with silica jell, calcium chloride, or other moisture absorbent material and is used to de-hydrate the periscope. Water vapor can pass through perforated housing 326 (Figure 18) to cell 386. In this manner the major part of the periscope can be rid of water vapor and thus freedom from condensation on optical parts is assured.

Hydraulic system

The hydraulic circuit for the turret is shown in diagrammatic form in Figure 26. A metal support 288 is riveted to spider 114 and charger valve 216 is secured thereto. An exhaust conduit 289 and a pressure conduit 290 lead to charger valve 216, and a single operation conduit 291 leads from charger valve 216 to elbow 242 in head 126. Fluid flowing through gland 238 can flow through hole 241 into fitting 246 and down tube 244 inside column 124. A hose section 293 is connected to the bottom of tube 244 and to a T-fitting 292 which divides the fluid flow into two branches 294, one for each charger 214. The branches 294 are long so that there is the necessary play to accommodate depression and elevation of the guns 110.

In operation the charger valve 216 normally connects the charger cylinders 214 with exhaust line 289. If one or both of the guns 110 become jammed the gunner will operate valve 216 to connect the chargers 214 to pressure, and chargers 214 will then operate to charge guns 110. When the charging stroke is completed the hydraulic pressure build-up in the chargers automatically causes valve 216 to cut off the pressure supply and connect the chargers 214 to exhaust line 289. The chargers will then return to their starting position and the guns 110 are again ready to fire.

Control box

The control box 500 for the direct current electrical circuits is shown in Figure 27. It has been found that the control of two related movements, such as rotation of the turret in azimuth and elevation of the guns, can best be accomplished when a single control member regulates both movements. The reflexes of the operator or gunner are more accurate when all movement is with one limb, rather than with the independent action of several limbs. The construction of the control box 500 is based on this principle, and movement of the handle 504 alone controls rotation in azimuth and elevation and depression of the guns.

The control box 500 varies the direction of rotation of the azimuth and elevation motors as well as the speed in either direction. The direction of rotation is changed by changing the polarity of the motor fields. The speed is varied by changing the size of the armature current while maintaining the field currents constant. In the past it has been customary to use rheostats to get a variable potential and thus to obtain a variable armature current to vary speeds of motors. This type of regulation is inherently wasteful as any flow of current through a resistance creates heat, which is a waste of current. This is a serious consideration on aircraft where electrical energy may be supplied by batteries which are heavy and therefore must be reduced to a minimum. Another drawback of rheostat control of motors is that of poor performance under varying loads. As the load increases on a motor for a given field and armature current, such as happens when the guns are swung into the wind stream, the current in the armature tends to become greater, due to reduced speed, but this increases the IR drop across the rheostat giving lower voltage across the armature. Thus when the need for current is the greatest the supply is the smallest.

The present control supplies intermittent shots of current under full voltage to the motor armatures to regulate motor speed. Thus the speed can be altered by changing the frequency and/or the duration of the shots, but I prefer in the present control to have the frequency remain constant and have the duration of the shots varied. Ordinary breaker points are unsuited for this type of control as the almost continuous arc developed under some conditions in using breaker points rapidly melts them. The present control avoids such a drawback and will now be described.

Referring to Figure 28, current from a suitable source is supplied to one end of a rotatable drum 512 by a brush 514. The drum has conductor segments 516 on its cylindrical face which are in the form of a truncated triangle. These segments are placed diametrically opposite each other on opposite ends of the cylinder 512. A part of the base of conductor segments 516 extends clear around the drum so as to form a continuous contact surface on each end of drum 512. The surface of cylinder 512 between conductor segments is formed of a heat resisting insulator material 518 such as ceramic. The conductor segments 516 are electrically connected inside the drum by means (not shown) so that the current applied to one conductor segment 516 by brush 514 is equally effective at the other conductor segment.

The drum 512 is mounted within control box 500 as shown in Figure 27. A spindle 513 passes through drum 512 and supports drum 512 for rotation in a pair of frame plates one of which is shown at 520. The frame plates are formed of insulator material and are bolted to frame 522. A pulley wheel 515 is secured to one end of shaft 513 and is driven by a V-belt 524 driven by a small pulley 526 secured to and driven by a constant speed motor 528. The pulley end of motor 528 is suspended on a lever 529 which can be moved to tighten or loosen V-belt 524 by an adjustment screw 530 held in frame 522.

The azimuth take-off at the drum for current for the azimuth motor 130 is a brush 532 held in a slider 533 which rides two rods 534 screwed to frame plates 520 longitudinally to the axis of drum 512. Brush 532 is held to drum 512 by a spring 535 held in a recess in slider 533. The take-off brush 536 for the elevation motor 172 is identical in construction to the azimuth brush. Detailed showing of brush 536 in frame 27 has been omitted for simplicity and it will not be described further than to say that while brush 532 contacts drum 512 from above the elevation brush 536 as may be seen contacts said drum 512 from the side.

The azimuth brush 532 and the elevation brush 536 are moved over drum 512 by control handle 504 to get varying amounts of contact with the conductor segments 516. A bushing 538 is secured to the top of control box 500 and a round stem 540 is fitted therein having an annular flange 541. Control handle 504 is rotatably mounted on an ear 542 of stem 140, and has an integral hollow shank 543 on which is secured a spur gear 544 by a nut 545. Control handle 504 has a thumb button 503 which shunts out a resistance to give more current. It also has a hump 505 of flexible material covering a deadman's switch which cuts off all power to the system when the gunner's grip is relaxed on handle 504. A flexible conduit 546 passing through hollow shank 543 contains the wires for the shunt switch and the deadman's switch.

Clamped to the bottom end of vertical stem 540 is a yoke arm 548. Its outer or yoke end (shown dotted) embraces a projection of slider 533. Thus swinging of handle 504 moves slider 533 along the length of the drum according to the swinging movement of handle 504. A wire 5 connected to brush 532 comes out the top of slider 533 and extends along transverse arm 548 to a convenient point where it can be led out of the control box 500 to azimuth motor 130 as shown in Figure 5. A switch (not shown but later described) is actuated by the yoke arm 548 as it passes center to reverse the direction of the field of azimuth motor 130. This switch causes rotation of the azimuth motor in one direction for one end of drum 512, and rotation in the other direction for the other end of drum 512.

Sliding elevation brush 536 along drum 512, is accomplished by rotation of handle 504 about its axis as contrasted to swinging about stem 540 for control of the azimuth brush 532. For this purpose a square bar 550 having a rack 552 on one end is inserted in a square longitudinal hole formed in stem 540. Rack 552 meshes with gear 544 on handle 504. Bar 550 extends below the bottom of stem 540 where, through a swivel connection 554, it supports a lower bar 546 guided in a frame 522 and having a rack 558. Rack 558 meshes with a gear 560 secured to a shaft 562 arranged transversely to bar 558 and journalled in frame 522. A yoke arm 564 is secured to the end of shaft 562 opposite to the gear 560. The arm 564 moves the slider for elevation brush 536 in a manner identical with that in which the azimuth brush 532 is moved. A wire 4 leads from elevation brush 536 out the top of its slider and down yoke arm 562 to a point where it can be led out of box 500 and down column 124 to the elevation motor 172. A switch (not shown but later described) is actuated by yoke arm 564 every time it passes dead center and this switch reverses the field of elevation motor 172 to reverse its rotation.

The operation of the control box with respect to the turret is as follows. Assuming that the turret is extended ready for combat, the gunner will grasp handle 504 pressing hump 505 and thus passing power to the entire turret and to the control box including brush 514 (Figure 28) contacting drum 512. The motor 528 will be energized and cause drum 512 to rotate. If the gunner desires to rotate the turret to the right, for example to train the cross hairs in the periscope on a target airplane, he pushes the handle 504 causing it to rotate clockwise on stem 540. This movement causes arm 548 to move clockwise also so that brush 532 contacts the right conductor segment 516 (Figure 28), contacting first the inner narrow end of the segment.

While touching just the narrow inner end of conductor segment 516, an intermittent current is sent to azimuth motor 130 which is composed of short shots of current and relatively long intervals in between. Under these conditions the motor 130 will move very slowly and the turret will rotate at an almost imperceptible rate. If the gunner desires more speed he pushes the handle 504 further so that brush 532 will contact a wider portion of conductor segment 516. The intermittent current will then have longer shots of current and correspondingly decreased intervals between, and under these conditions the motor 130 will rotate at a moderate speed. If still further speed is desired the handle 504 is pushed as far as it will go so that brush 532 contacts the continuous conductor band at the end of drum 512, resulting in a continuous flow of current to azimuth motor 130. If still further speed is required the gunner presses button 503 on handle 504 and this shunts out a resistance in series giving the drum 512 the full available voltage and current.

To rotate the turret to the left the gunner pulls handle 504 toward him, causing it to swing counterclockwise about stem 540. As yoke arm 548 passes the midpoint on drum 512 it actuates a switch which reverses the field of azimuth motor 130 reversing the direction of rotation. The brush 532 may then be moved to any point on the left end of drum 512 that gives the desired speed at the particular time.

To depress the guns 110, at any time, whether the turret is rotating or not, the gunner twists the handle 504 "over," rotating it clockwise as viewed from the right in Figure 27. This movement causes brush 536 to transverse the right hand part of drum 512, and the speed regulation is the same as that described for the azimuth brush 532. To elevate the guns the handle 504 is twisted "under," rotating in counterclockwise as viewed from the right. As yoke arm 564 passes the centerpoint of drum 512 it actuates a switch which reverses the field of elevation motor 172 reversing its direction of rotation. Thereafter current taken off by brush 536 causes the guns to be elevated.

If the turret is extended and it is desired to retract it, the guns 110 are elevated by twisting handle 504, until the guns are horizontal. The turret is then rotated to the right until the guns approach the rear of the airplane, by pushing handle 504 forward about stem 540. As the guns rotate toward the rear the gunner operates the retract lever 146 (Figure 10) and when the guns reach the rear the connector key 144 (Figure 10) will connect the column 124 to non-rotatable head 126. Further rotation of azimuth motor 130 will cause sleeve 120 to rotate and screw the turret up into the airship in which it is mounted. To extend a retracted turret the gunner pulls handle 504 toward him causing azimuth motor 130 to rotate sleeve 120 and in opposite direction and screw the turret down. At the lower limit of extension the key 144 connects column 124 to sleeve 120 and the turret starts to rotate and is ready for combat.

The control box 500 gives reliable and accurate performance. Any arcs are extinguished on drum 512 as the brush moves from conductor 516 across the insulator 518. Further, when traveling from conductor to insulator there is a gradually reducing current through the brush so that the final break is only of a relatively small current thus reducing arcing as compared to ordinary breaker points. Any desired type of speed increase curve is possible by merely shaping the conductor segments 516 as desired.

*Power system*

Figure 29:
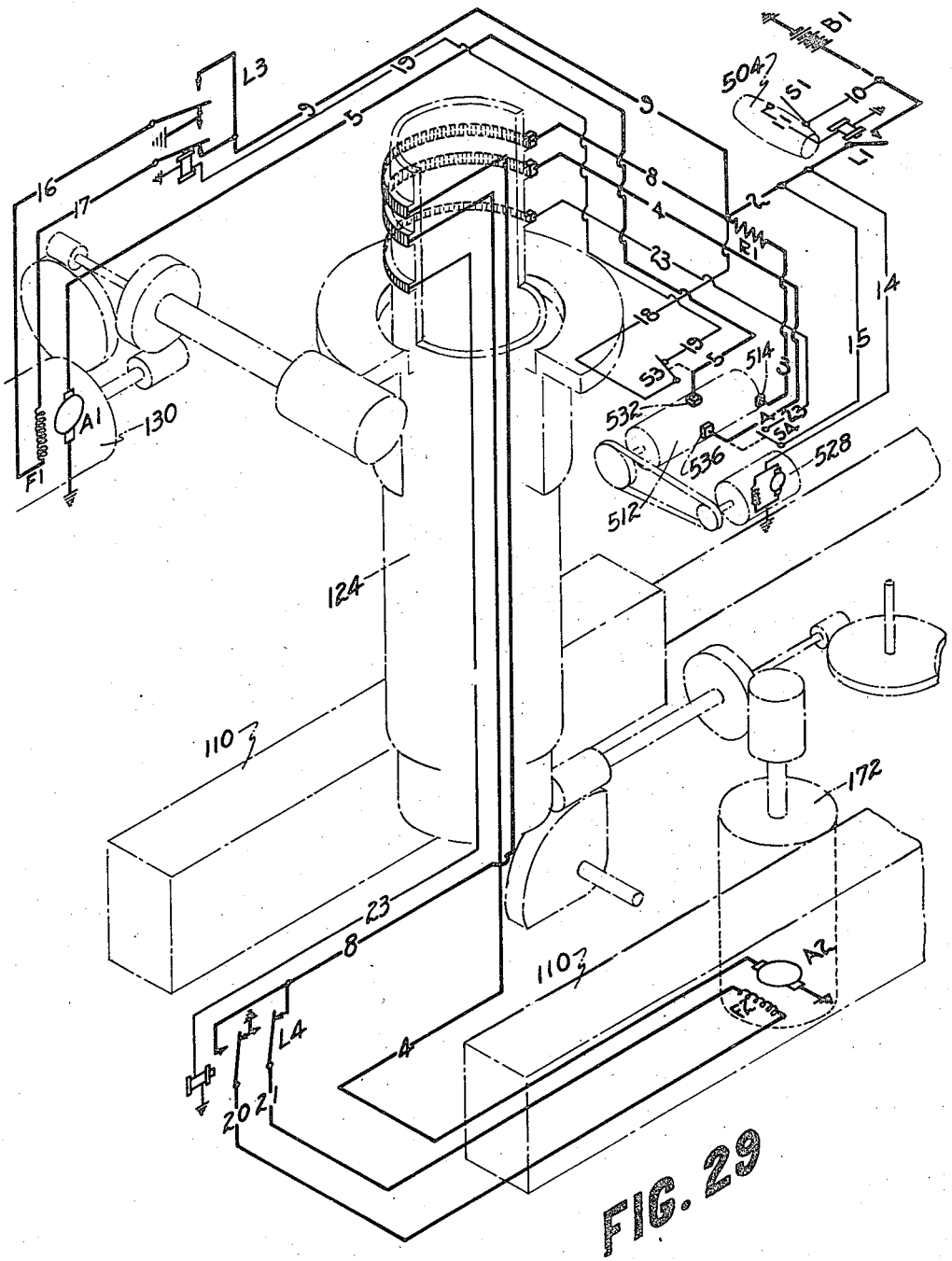

The power circuit for the turret is shown in simplified form in Figure 29. Since Figure 29 is a simplified drawing parts are omitted in certain cases for simplicity, but the basic wiring system may be traced also on Figure 30 which shows the complete power circuit, and on Figure 40 where the whole electrical system is shown in one plane. Parts of the control box 500 can be identified in Figure 29. The rotating drum 512 and its driving motor 528 are shown in dotted outline, as well as the control box handle 504 near the top of the drawing.

Current is supplied to the turret by a battery or storage cell B1 giving about 24 volts, although a DC generator could just as well be used. Battery B1 is grounded at one terminal to the frame of the turret, and the other terminal is attached to a wire 1 which leads to a relay L1. A wire 2 leads from relay L1 to series resistance R1, the function of which will be described later. A wire 3 leads from resistance R1 to brush 514 contacting drum 512 where the current is distributed to azimuth brush 532 and elevation brush 536 as explained with reference to Figure 26. Wire 2 supplies current also to a wire 14 leading to motor 528 which causes drum 512 to rotate.

Leading from azimuth brush 532 is a wire 5 connected to the armature A1 of the azimuth motor 130. Elevation brush 536 delivers current to a wire 4 which passes down the central column to conduct current to the armature A2 of elevation motor 172. Through the circuits described, controlled current may pass from battery B1 to the armatures A1 and A2 respectively of the azimuth and elevation motors.

Also shown in Figure 29 branching from wire 1 is a wire 10 which leads to a switch S1 in the control handle 504. The other side of switch S1 is connected to a wire 11 which leads to relay L1 which is normally open. When the gunner grasps the control handle 504 he closes switch S1 which energizes relay L1, connecting wire 1 to wire 2 and passing current to the whole turret. Thus no current can pass to the turret until the operator grasps control handle 504. The same circuit causes current to be cut off from the whole turret if the gunner relaxes his grip, thus providing a deadman control. If the gunner is shot while operating his turret, he will relax his grip opening relay L, and the turret will cease operation, preventing waste of current and possible injury to the turret or the airplane in which it is mounted.

Connected to wire 2 are wires 9 and 8 by which current is supplied to the fields of the azimuth and elevation motors respectively. Wire 9 leads to a two-finger, four-contact relay L3 having the two middle contacts grounded. One finger of relay L3 is connected to a wire 16 leading to one end of the azimuth motor field F1. The other finger of relay L3 is connected to a wire 17 which is connected to the other end of field F1. When relay L3 is energized it reverses the normal direction of current flow through field F1, reversing the field F1 and thus reversing the motor 130.

Relay L3 is energized by the movement of azimuth brush 532 over drum 512 in the control box. Leading from wire 2 is a wire 18 which leads to a switch S3 in the control box which switch is mechanically actuated by azimuth brush 532 when it passes the center of drum 512 while being moved to the left. The other side of switch S3 is connected to wire 19 which leads to relay L3 to energize relay L3. Thus for all positions of azimuth brush 532 to the right of center, switch S3 will be closed and relay L3 will be energized to cause current to flow through field F1 as indicated in Figure 29. For all positions left of the center of the drum the switch S3 will be open, allowing relay L3 to assume a normal position which causes current to flow through field F1 in the opposite direction, thus reversing the direction of rotation of azimuth motor 130.

The circuits for supplying current to the field of the elevation motor 172 are similar to those for azimuth motor 132. Wire 8 passes down the central column and connects to a two-finger, four-contact relay L4. Connected to one finger of relay L4 is a wire 20 leading to one side of the field F2 of elevation motor 172. A wire 21 leads from the other finger to the other side of field F2. Wires 20 and 21 are normally connected as shown in Figure 29 but when relay L4 is energized it causes current flow in the reverse direction, reversing the direction of rotation of elevation motor 172.

Relay L4 is energized by the movement of elevation brush 536 over drum 512. Leading from wire 2 is a wire 15 which passes current to a switch S4. Switch S4 is normally open as shown in Figure 29, but when brush 536 passes the center of drum moving right brush 536 closes switch S4, and when brush 536 is moving left the switch S4 is opened. Switch S4 passes current to a wire 23 which passes down the central column 124 to actuate relay L4. When relay L4 is energized, the field F2 is reversed, reversing elevation motor 172.

In summary, with relation to Figure 29, the operation is as follows. The gunner grasps control handle 504 which closes switch S1, operating relay L1 to pass current to wire 2, through resistance R1, and to brush 514. At the same time current passes through wire 14 to motor 528 and it causes drum 512 to rotate. Current flows from brush 532 to armature A1 of the azimuth motor 130 and flows from brush 536 down the central column to armature A2 of the elevation motor. The fields F1 and F2 of the motors are reversed every time their respective armature brushes 532 and 536 pass the center of the drum 512. When azimuth brush 532 passes center from right to left it opens switch S3, de-energizing relay L3 which then passes current to field F1 in a direction opposite to that shown in Figure 29. When elevation brush 536 passes center from left to right it closes switch S4, energizing relay L4 and passing current to field F2 in a direction opposite from that shown. When the brushes move past center in the other direction their respective fields are reversed and are connected as shown at relays L3 and L4 in Figure 29.

Figure 30:
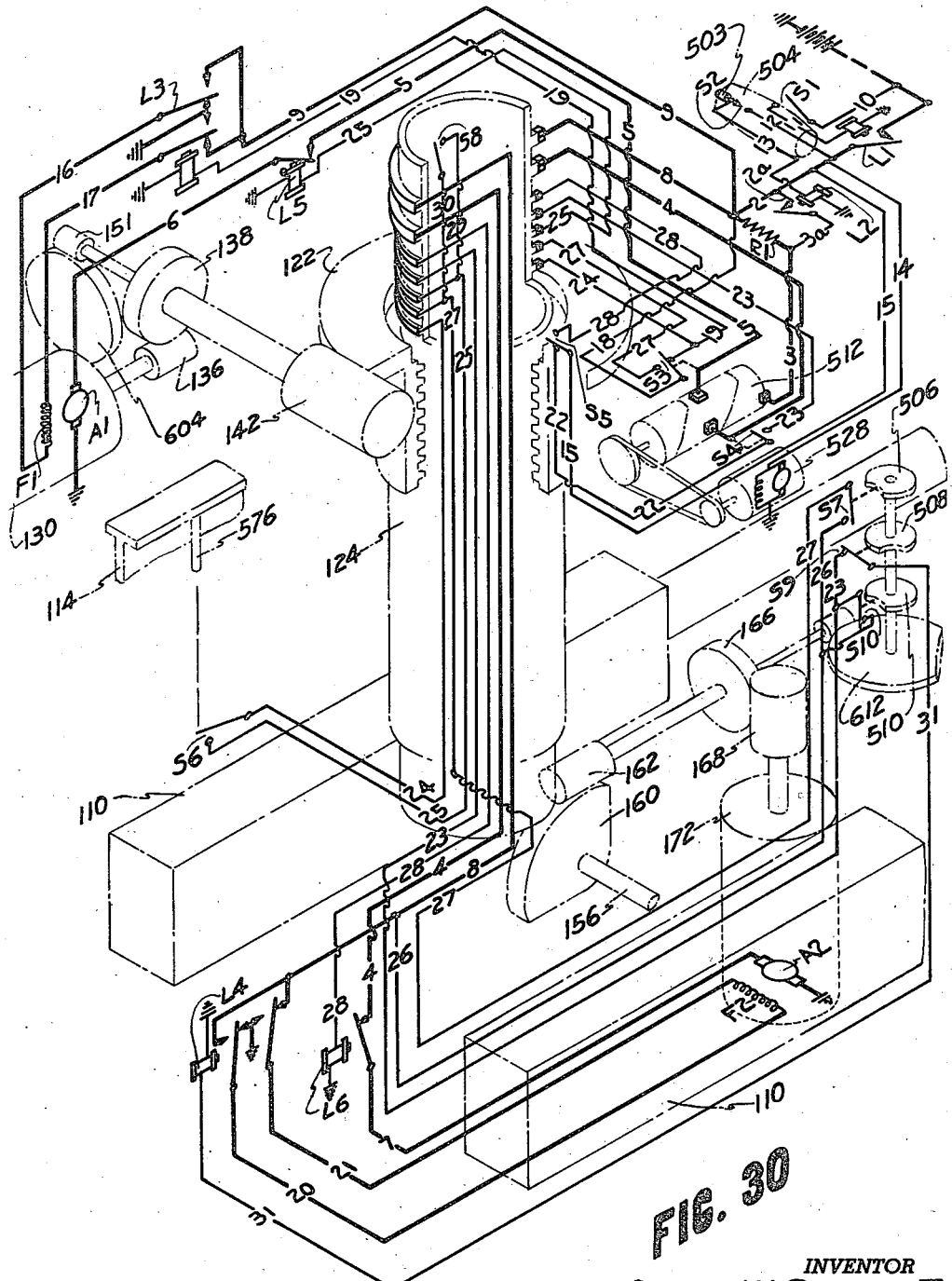

The complete power circuit for the turret is shown in Figure 30. The basic functions illustrated in Figure 29 are included in Figure 30, but with the addition of more elaborate controls. Also Figure 29 is a simplified power circuit and therefore incomplete in some respects. The circuits which will now be described with relation to Figure 30, can also be traced on the master wiring diagram Figure 40.

One addition in Figure 30 over Figure 29 is the provision of a speed change switch in the control handle 504. Branching from wire 2 is a wire 12 leading into control handle 504 to a switch S2 actuated by push button 503. A wire 13 leads from switch S2 to a relay L2 closing a shunt circuit around resistance R1. This shunt circuit is formed by a wire 2a leading from wire 2 to relay L2 and by a wire 3a leading from relay L2 to wire 3. Thus by closing switch S2, relay L2 is actuated to complete a shunt around resistance R1. Shunting out resistance R1 gives a greater effective voltage for the drum 512, thus giving a two-speed electrical range by closing or failing to close switch S2.

Another part of the complete power control relates to means to render the azimuth motor 130 inoperative in a retracting direction if the turret is already retracted or when the turret reaches the top of a retraction movement. Wire 19, which is the wire energizing field relay L3 of the azimuth motor when the brush 532 passes the center of drum 512 moving to the right, the retract position has a branch wire 24. Wire 24 passes down the central column and emerges at the bottom to connect to a retract limit switch S6 which is closed by an actuating pin 576 on spider 114 when the turret is retracted. Switch S6 in turn passes current to a wire 25 connected to it, which leads up the central column to a relay L5 interposed between wires 5 and 6, the relay serving to break the azimuth armature current. Thus when switch S6 is closed, by the retraction movement or after the retraction is finished, no current can pass to azimuth armature A1 when the brush 532 is pushed to the retract position, or to the right on drum 512. When brush 532 is moved to the extended position current may be supplied to armature A1 because wire 24 is not then energized and no current can flow to relay wire 25 and relay L5.

Another part of the complete power control, shown in Figure 30, relates to means to render the elevation motor inoperative when the turret is retracted. Accidental movement of the control handle while the turret is retracted would result in injury to the turret and the airplane if this provision were not made. Branching from wire 2 is a wire 15 leading to the switch member of a switch S5. This switch has two contacts, one connected to wire 22 which leads to switch S4, the other connected to wire 28 which passes down the central column to relay L6.

Switch S5, normally tends to connect wire 15 and wire 28 which actuates relay L6 to render the elevation motor 172 inoperative. When the turret is fully extended, however, non-rotatable head 126 (not shown) at the top of the central column 124 descends upon switch S5 as the turret is extended and causes switch S5 to disconnect wire 28 from wire 15 and to connect wire 22 with wire 15. This de-energizes relay L6 allowing current to flow to armature A2, and allowing current to flow to switch S4 to reverse selectively the elevation field F2. At the slightest retraction movement the head 126 rises and allows switch S5 again to connect wires 15 and 28 causing relay L6 to break the connection to armature A2, insuring that the guns will remain horizontal at all times during and after retraction and while extending the turret.

Before the turret can be retracted the guns must be elevated to a horizontal position so that their inner ends will not strike parts of the turret when retracted. The retracting circuit is accordingly rendered inoperative by the retract index cam 506 which is synchronized in elevation with the guns 110 of the turret. A branch from wire 8 at the lower end of the turret, wire 26 conducts current to a switch S7 which is actuated by retract index cam 506 in the elevation compensator 176. Index cam 506 keeps switch S7 normally closed and opens it only when the guns are horizontal, at which position the cut-away portion allows the switch S7 to open. The other side of switch S7 is connected to wire 27 which leads up the central column to switch S3 at the control box.

It will be noted that inside the central column and at the top there is a wire 29 branching from wire 26 and leading to a switch S8. A wire 30 leading from wire 27 is connected to the other side of switch S8. Switch S8 is the retract lever switch, and is closed every time retract lever 146

(Figure 10) is actuated to retract the turret. If the turret is extended and the gunner tries to retract it while the guns are other than horizontal, current will flow from wire 2 to 8 down the column to wire 26, through switch S7 to wire 27, up wire 27 to 30, through switch S8 to wire 29, into wire 25 to relay L5, where the current breaks the contact between wires 5 and 6 and no current flows to azimuth armature A1 and the turret will not retract. If the guns are horizontal and the gunner operates retract lever 146, switch S7 will be open and no current will flow across switch S8 to energize relay L5, and retraction will take place when current flows to armature A1.

Switch S8 also serves another function: that of insuring that the azimuth motor will not turn in a direction to extend when it is desired to retract the turret. If this provision were not made, the central column would be jammed against the rotatable threaded sleeve 120 which retracts and extends the turret. It will be remembered that when the turret is ready for retraction the gunner will close switch S8 and the guns will be horizontal thus opening switch S7 and preventing flow of current to wire 27 at that point. This safety function is accomplished by a circuit through the upper end of wire 27 which is connected to switch S3. When the azimuth brush 532 moves to the left part of the drum (extend and rotation-to-the-left) switch S3 is actuated to cause current to flow from wire 18 to wire 27. Current will then flow into wire 27 at switch S3, into wire 30, through switch S8, down wire 29 to wire 25 and through wire 25 to relay L5, which breaks the current to armature A1 of the azimuth motor 130 preventing extension of the turret. Thus the circuit just described provides a safety cut-out of the retracting motor 130 if the gunner should inadvertently move the azimuth brush 532 in the wrong direction for retraction.

The circuit just described also insures that the gunner will not have his fingers injured by the rotating turret when he is manipulating the retract lever 146. As shown in Figure 10, the gunner presses on the right side of retract lever 146 to move it to the left for retraction. If the turret, instead of rotating to the right as it must to retract, should rotate to the left, his finger would be wedged between the stationary head rest support 305 and the retract lever 146 (Figure 5), as the lever rotates counterclockwise with the turret. The safety circuit described in the foregoing paragraph prevents this from happening and insures that the turret will always rotate to the right or clockwise for retraction, which movement would lift the gunner's finger off the lever 146 if the turret did not lock at the "straight back" or rear position at the time of actuation of the retract lever.

When the turret is retracted and the gunner desires to extend it, he does not actuate the retract lever 146, but merely moves azimuth brush 532 to the left part of drum 512. This causes azimuth motor 130 to rotate sleeve 120 to the left or counterclockwise screwing the turret downward. The safety circuit, effective in retraction to prevent the azimuth motor from rotating sleeve 120 to the left, is not effective during extension because the retract lever 146 is not actuated and the retract switch S8 is open. When the turret is fully extended the connector key 144 (Figures 3 and 10) slips into notch 150 in sleeve 120 and the turret rotates to the left, ceases extending, and is ready for use.

The remaining controls and circuits of Figure 30, (traceable also on Figure 38) relate to the upper and lower limit stops for the guns 110 of the turret in elevation and depression. This function is likewise accomplished by cams synchronized with the movement of the guns. Lower limit cam 508 in the elevation compensator 176 has a notch cut in a position with relation to an actuated switch S9, corresponding to the straight-down position of the guns which is the lower limit of depression. Upper limit cam 510 also in the elevation compensator box, has a notch cut in a position with relation to an actuated switch S10, corresponding to a horizontal position of the guns 110, which is the upper limit of elevation.

The lower limit switch S9, actuated by the lower limit cam 508 is connected on one side to wire 23, which is the wire energized at the control box whenever elevation brush 536 is moved to the right or to a depression position on drum 512. Therefore, while the guns are being depressed, wire 23 will be energized passing current to switch S9. The other side of switch S9 is connected to a wire 31 which leads to field control relay L4, energizing it to reverse the current to field F2. At all points on the elevation arc, except for the straight-down or lower-limit position, the lower-limit cam 508 will keep switch S9 closed, energizing field control relay L4 when energy is passing into wire 23. As shown in Figures 30 and 38, the elevation brush 536 is in an elevation position and current does not flow into wire 23, and relay L4 is inactive even though switch S9 is closed.

The lower limit stop comes into operation when the gunner twists the control handle 504 "over," causing the elevation brush 536 to contact the right hand side of drum 512. This movement passes current into elevation armature wire 4 as well as passing current into wire 23. At lower limit switch S9, current passes into wire 31 from wire 23 and energizes relay L4 which passes current through the field F2 in a direction to cause motor 172 to depress the guns when current flows through the armature A2. If the depression of the guns continues they will soon be pointing straight down, the lower limit of their elevation arc. At this point cam 508 rotates so that the notch is opposite switch S9 which then opens, de-energizing the relay L4 and causing motor 172 to reverse its direction and elevate the guns. If the gunner persists in having the controls in a depressed position, the guns will elevate only until cam 508 closes switch S9 again and reverses the field. Thus the guns will continue to alternate between elevation and depression at the lower limit if the controls are kept in a position to depress the guns.

The circuit for stopping the guns at the upper limit of their arc is actuated by upper limit cam 510. It will be noted that the notch in upper limit cam 510 has the same relative position as the notch in cam 508, and this is because the upper limit of the guns happens to be at the horizontal position which is the position of the guns when the turret is retracted. As stated earlier in this description, the guns could be elevated above horizontal if it were desired, and in this case the notch of upper limit cam 510 would be placed at a more advanced point.

Upper limit cam 510 actuates switch S10 which connects wires 23 and 26. Wire 26 is continuously energized because it is a branch of wire 8. When wire 23 is energized it can pass current through switch S9 to actuate relay L4. As explained above, lower limit cam 508 keeps switch S9 closed at all points on the elevation arc except the bottom point, and for this reason switch S9 is closed at all times whenever it is desired that the upper limit stop circuit be effective. Switch S10, which passes current from wire 26 to wire 23, is normally open, and is closed only when the guns are horizontal at which position the notch in upper limit cam 510 allows the switch S10 to close.

While the guns are being elevated brush 536 will be on the left part of drum 512 and switch S4 will be open so that no current passes to wire 23. At the lower end of the turret, switch S10 will normally be open so that no energy passes to wire 23 at that point. In such case, although switch S9 is closed, no current flows to relay L4 and it connects the field F2 as shown. As the guns are elevated by the armature current flowing through brush 536 and wire 4, they approach the horizontal and at that position upper limit cam 510 allows switch S10 to close. Current now flows from wire 26 through switch S10 to wire 23, through switch S9, and through wire 31 to energize relay L4 which will reverse the field F2, causing the guns to change direction and depress rather than elevate. When the guns have been moved in a depression a short distance, upper limit cam 510 moves accordingly until its notch opens switch S10. This breaks the circuit to relay L4 and the field F2 is again reversed, and the guns once more start to elevate. Thus if the gunner keeps brush 536 on the elevation end of drum 512 the guns reach the upper limit position, which is horizontal, and alternate up and down in a limited arc governed by the amount of rotation of cam 510 necessary to open and close switch S10.

*Trigger system*

The trigger circuit for the turret is shown in Figure 31 as applied to the turret and is shown in diagrammatic form in inset Figure 32. Provision must be made for a cut-out mechanism to prevent the guns from shooting at various parts of the airplane. When the guns are horizontal and pointing forward (Figure 1) they might shoot bullets into the propellers as they spin in their arcs or discs and they might shoot the fuselage directly in front of the turret. Also, when the turret is designed to shoot above horizontal at the rear, the guns might shoot the tail wheel. Thus the circuits and mechanism which will now be described provide cut-out means for the trigger fire at these danger points.

As explained above, the trigger cut-out is necessary only when the guns are elevated to a substantially horizontal position, and then only for certain forward positions. The azimuth trigger cam 408 has been previously referred to in connection with Figure 7 and is shown in Figure 31 near the upper part of the figure. As shown in Figure 31 the cam 408 is notched for those forward positions in which the gun should not shoot. The elevation trigger cam 410 has been previously referred to in connection with Figure 16 and is shown in Figure 31 near the lower right corner of Figure 31. As shown in Figure 31 the cam 410 is notched for the horizontal position at which the guns should not shoot. As explained with reference to Figures 7 and 16 the azimuth cam 408 and the elevation cam 410 are geared to move in synchronism with the azimuth and elevation movements of the turret respectively.

Referring to Figure 32, current from battery B1 flows through wires 28 and 32 to a relay L7, which when energized passes current through wires 33 and 34 to two identical firing solenoids FS one for each gun 110. The relay L7 is energized by current flowing through a wire 35 which current is regulated by three switches, a firing switch S11, an azimuth switch S13 and an elevation switch S14. Branching from wire 8 is a wire 36 which leads to azimuth switch S13, which is normally closed by cam 408 and is opened only when one of the notches in the cam 408 come opposite the switch. The other end of switch S13 is connected to a wire 37 which leads to a wire 38 which leads to firing switch S11 referred to above.

The branch wire 26 described with relation to the power system (Figures 29 and 30) leads from wire 8 to elevation switch S14 which is normally closed by elevation cam 410, and is opened only when the notch in the cam is opposite the switch. A wire 39 is connected to the other side of elevation switch S14 and leads to wire 38 also. Wire 38 is connected as stated above to firing switch S11 the other side of which is connected to relay wire 35.

From the above description of Figure 32, it is apparent that the guns can be fired through firing solenoids FS at nearly all times. If the guns are elevated to a horizontal position the switch S14 will be broken but current might nevertheless flow through switch S13 to trigger switch S11. When azimuth switch S13 is open current might likewise flow through elevation switch S14. It is only when both switch S13 and switch S14 are open that the guns cannot be fired. The switches S13 and S14 will both be opened only when the guns are pointed at some part of the ship corresponding to the combination of notches on azimuth cam 408 and elevation cam 410.

This trigger circuit will now be applied to Figure 31, and the corresponding circuit can be traced on Figure 38. Current is derived from battery B1 and flows through wire 1, through relay L1 and through wire 2 to wire 8, as described with relation to the power circuit. The branch 32 from wire 8 leads to the firing relay L7 and supplies current for firing the guns when relay L7 is energized. Another branch from wire 8, wire 26, leads to the elevation compensator box which retains cam 410, and is connected to switch S14. The wire 39 leads from the other side of switch S14 back up the central column to join wire 37 at its junction with wire 38.

The other branch of the parallel circuit to wire 38 is shown at the top of Figure 31. Wire 36 branches from wire 8 to lead to switch S13 which is connected by wire 37 to wire 38. Firing switch S11 is placed in trigger grip 404 (shown also in Figures 4 and 6) and is actuated by trigger button 405 which the gunner presses with his left thumb. A wire 40 leads from firing switch S11 to a safety switch S12, the other end of which is connected to the relay wire 35 leading to relay L7.

The operation of the trigger circuit as shown in Figure 31, and traceable on Figure 40, is as follows. Safety switch S12 is usually open, at which times the guns cannot be fired. After the turret is extended and ready for combat, the gunner will manually close safety switch S12. The gunner will now be gripping the control handle 504 with his right hand, closing switch S1 to energize relay L1 and pass current to the whole turret. When the gunner desires to fire the guns, he places his left hand on the grip trigger 404 and presses button 405 closing switch S11. Current will usually flow from either wire 37 or 39 through wire 38 and switch S11 through wire 40 and safety switch S12 and through wire 35, down the central column to relay L7. When relay L7 is energized current flows to the firing solenoids FS in housings 406 and these in turn cause the guns 110 to fire.

If the guns are pointing forward at an angle in line with the lower parts of the airplane, the azimuth cam 408 will rotate in synchronism and one of its notches will allow switch S13 to open. Current can nevertheless flow to firing switch S11 from wire 39 and the guns can still be fired. If the guns should now be elevated to a position in line with the lower parts of the airplane the elevation cam 410 would rotate in synchronism and its notch would allow switch S14 to open. With both switch S13 and switch S14 open no current will flow to firing switch S11 and the guns cannot be fired. Thus through the means of the two dimensions of elevation and azimuth, danger areas can be definitely plotted, and through the use of cams synchronized with movement in azimuth and elevation, cut-out means for the trigger circuit can be provided for these danger areas.

*Sighting compensation circuit*

The only remaining part of the whole electrical circuit of the turret shown in Figure 40 refers to the sight compensations. As explained with reference to the periscope in Figures 22 and 24, the cross hairs 376 move with relation to the field of the periscope and the point of intersection of the two is the point, which when trained on the target, will permit the bullets from the guns to hit that target. The electrical system for passing current through the rotors 372 (Figure 24) of the galvanometers to move the cross hairs is entirely independent of the power current and circuits and has its own source of power and ground wires.

If a target were stationary and if guns shot their bullets on the exact line of the axis of their barrels, there would be no need for sight correction. In all shooting however, the effect of gravity causes the bullet to drop from the path of the axis of the gun toward the center of the earth. Also if a wind is blowing at an angle to the axis of the gun barrel, the bullet will be blown up or down or sideways depending on the direction of the wind. If the wind is of any appreciable velocity it causes magnus effect, the tendency of the bullet to rise or fall from its normal path depending on the direction of the wind. The magnus phenomenon is caused by the formation of a low pressure area on a part of a spinning object when moving through a transverse wind, causing the object to rise or fall depending on the direction of the wind with relation to the spin of the object. Still another consideration in sighting a gun is lead; i. e. the amount in front of a moving object that a gun must be aimed in order to hit the object considering the time consumed in trigger actuation and flight of the bullet to the target.

The compensation system shown in this application is designed to compensate for all the predictable factors affecting the deviation of a bullet from the axis of the gun from which it is fired. The factors for which there is compensation include lead, magnus effect, gravity effect, and windage deviations.

Since the deviation of a bullet from the axis of its gun usually increases with the distance it travels, the corrections must be determined for a definite range, because corrections effective for all ranges would involve prohibitive complications of the correcting system. Rather, it is more expedient to choose the range at which most of the shooting can be done with relation to the calibre and type of gun used. For a .50 calibre machine gun this range is preferably about 600 yards. If the target is at a point inside this range the over corrections will not cause appreciable inaccuracies, for although there will be error, the target is closer and will intercept a larger angle of fire than a more distant target. For targets at a range greater than that chosen the guns will not be effective. Therefore the gunner will not normally shoot at such ranges and the errors are of little importance.

The deflection of the bullets from the axis of the guns, caused by gravity, magnus effect and windage are herein called ballistic deflection. Such deflection is preferably determined by empirical methods. The deflection data is then formed into curves and broken down into elements of azimuth and elevation measurements to correspond with the mechanical movements of the guns in the turret and the sight compensation system is designed accordingly. In operation electrical currents are sent to the rotors 372 of the galvanometers, depending generally upon the position of the guns in elevation and azimuth, and the cross hairs 372 are moved automatically an amount depending upon the position in elevation and azimuth.

The lead of a gun upon a moving target is a direct function of the speed of the target, and, where trigger actuation may be considered to be practically instantaneous, of the speed of the bullet or projectile. For a given gun the projectile speed is substantially constant and the speed of the target need be the only variable correction. In the present turret an electrical current responsive to the speed of the target is obtained by generators geared to or mounted on the shafts of the elevation and azimuth motors. Inasmuch as the turret must be moved to keep the target in the periscopic field, the rotation of the motors which move the turret and guns will directly reflect speed of the target, and therefore reflect the lead in azimuth and elevation. This lead current is sent to the galvanometer rotors 372 and is superimposed on the correction current for windage, magnus effect and gravity as described above.

The ballistics deflection of the guns of the turret, which deflection is the algebraic summation of the effects of windage, magnus and gravity, can best be broken up into vertical and lateral components with respect to the airplane in which the turret is mounted. The lateral deflections are corrected by advancing or retarding the rotation of the turret in azimuth which advances or retards the axis of the guns with relation to the target. The vertical deflections are corrected by elevating or depressing the guns of the turret with relation to the target.

These lateral and vertical components of ballistics deflection are correlated with the movement of the cross hairs 376 of the periscope. As shown in Figure 21, and as explained with reference thereto, the cross hairs intersect the field of the periscope vertically and horizontally. As best shown in the right hand field diagram of Figure 21, which is at the rear and is an upright image with respect to the gunner, the cross hair which intersects the gunner's image up and down is the vertical cross hair, and the hair that intersects the image from the gunner's left to right is the horizontal cross hair.

These hairs can be correlated with the cross hairs of Figure 20, the cross hair intersecting the upper ray T and the lower B in the image plane I—I being the vertical hair and the other being the horizontal hair. Thus the hair parallel to the axes of the guns is the vertical hair hereafter designated as "V" and the hair transverse to the axes of the guns is the horizontal hair designated hereafter as "H." From the foregoing it is evident that the V hair corrects for lateral ballistics deflections because it moves sideways and that the H hair corrects for vertical ballistics deflection because it moves up and down with regard to the image.

Before describing the lateral and vertical ballistic deflections of the bullets the terminology used herein expressing the correlated azimuth and elevation positions will be explained. Azimuth is expressed in degrees of a full 360° circle, with 0° as straight forward and the angular measurement being clockwise when looking down on the airplane. Thus when the turret is pointing at 0° azimuth it is pointing straight forward, at 90° it is to the right, at 180° to the rear and at 270° to the left. Elevation is expressed in terms of degrees of a half circle with 0° as straight up. Thus if the upper turret of an airplane be at 0° elevation it would be pointing straight up and if pointed at 90° would be horizontal. When the lower turret is pointing at horizontal it is at 90° elevation and when pointing straight down it is at 180° elevation. It will be remembered that the elevation arc of the turret of this application is from 90° to 180° i. e. from horizontal to straight down.

Lateral ballistic corrections

The correction for lateral ballistic deflection of a bullet is shown diagrammatically in Figure 33. The airplane 100 in which the turret is mounted is shown in the center of its range circle C1 which may be taken at 6000 yards, assuming that the turret has .50 calibre machine guns. The 0° mark of the circle C1 in azimuth is straight ahead as explained before.

The airplane can be assumed to be flying straight ahead, for example at 250 miles per hour. A target airplane T1 is assumed to be traveling in the same horizontal plane as airplane 100 and straight ahead at 250 miles per hour to remove considerations of lead from the ballistics compensation. If the guns were pointed straight at the airplane T1 the bullets would not hit it. The 250 miles per hour wind would blow the bullet laterally backwards. (Magnus effect and gravity do not cause lateral deflections at 90° elevation. The vertical error of magnus and gravity does not show in Figure 33 and will be considered later.) To correct for the lateral deflection with regard to plane T1 the turret must be rotated so that the guns point in advance of the target T1 by an angle A1. The wind will blow the bullets backward and they will travel in the dotted path from airplane 100 to airplane T1 and hit airplane T1 squarely.

The size of the angle A1 for each position of the target plane T1 is indicated by the length of the radial lines A1 between the range line C1 and the lighter 90° elevation line or curve C2. The length of these lines, as will be appreciated, are merely a linear measurement of an angular quantity and therefore have no measurement value except relative or as compared to a scale. No scale is given however, as this description is merely qualitative and the data varies for various guns and is elsewhere available. By regarding these radial lines as relative measurements only, it will be noted that the lateral deflection at 90° elevation is greater at 90° azimuth than at 45° azimuth, and that at 0° and 180° in azimuth the deflection is zero because bullets fired at those azimuth angles are not exposed to a side force from the wind.

In order for the cross hairs to reflect this correction angle A1 for the target T1, the V hair would have to move to the right of the true center of the periscopic field. If the turret is now turned so that the V hair intersects the target on the periscopic field, the guns will now lead the target T1 a correct amount so that the wind will "blow" the bullets to hit target T1 squarely. It will be realized that this V hair movement must be very small on a non-magnified field, and that the actual correction angles involved are very minute.

Also shown in Figure 33 is the target airplane T2, to the left of the airplane 100. As with the case of target T1, the guns on the turret must lead plane T2 so that when the wind blows the bullets backward they will strike the plane T2 squarely. In order to reflect this correction in the periscope, the V hair will have to move to the left of the center of the field to enable the guns to lead the plane, rather than move to the right as was the case with target T1. This difference in direction of movement must be indicated and for present purposes we can call the movement to the left of center positive and movement to the right of center negative. The change in sign is expressed by the radial distance from the range line C1 to the 90° elevation line C2. On the 0° to 180° part of the azimuth circle these radial distances are inside the range line C1 or negative, and from 180° to 0° the distances are on the outside of the range line C1 or positive.

If a target airplane were flying on the range circle C1 at 135° elevation instead of 90°, the corrections will vary but slightly. The corrections for 90° and 135° elevation are nearly similar because there is little difference in the angle at which the wind strikes the bullets. The chief difference at 135° elevation is near 0° and 180° azimuth where the spinning bullet is exposed to a side wind causing a magnus effect which diverts the bullet to the left at 0° azimuth with reference to Figure 33, and diverts the bullet to the right at 180° azimuth with reference to Figure 33. The angular correction at any point in azimuth for 135° elevation is the radial distance between the 135° elevation line, C3 and the range line C1.

The 90° elevation line C2 and the 135° elevation line C3 are so close together, that for practical purposes a common line can be drawn between them which will adequately represent both lines. Accordingly a single composite line C4 is drawn to represent both the 90° and the 135° line for all points in azimuth. This line is drawn in most places between the two lines. The greatest divergence of the composite line C4 from the mean of lines C2 and C3 is near 180° azimuth where the composite line C4 follows the 90° line closely. This is to render the firing at the tail area near 90° elevation as nearly accurate as possible because this is a vital area.

The actual correction therefore between 90° elevation and 135° elevation is incorporated in the composite line C4. The corrections at any point in azimuth are indicated by the radial lines between the composite line C4 and the range line C1. The sign of the correction is indicated by the nature of the radial lines. On the left part of Figure 33 between 180° azimuth and 0° azimuth, the positive correction is shown by solid lines on the right part of Figure 33, the negative correction between 0° azimuth and 180° is shown by broken radial lines.

The composite line C4 is not an irregular curve, but rather a curve made up of arcs having the same radius as the range circle C1. One arc is from 0° azimuth to 45° azimuth and is negative, another from 45° to 90°, another from 90° to 118°, another from 118° to 157°, another from 157° to 237°, which crosses the range line C1 from negative to positive, another is from 237° to 270°, still another from 270° to 319°, and finally one from 319° to 0°. If the composite 90° and 135° line C4 were plotted on rectilinear coordinate paper, plotting degrees azimuth against correction angles, the arcs would show up as straight lines as will be described with relation to Figure 35.

The lateral deflections for 180° elevation are shown in Figure 35. In the middle part of the figure are shown the periscopic fields for the various azimuth positions when the guns are pointed at 180° elevation. The central dot DC appears in the middle of the field and marks the position toward which the guns are pointed. Wind will blow the bullets backward however, and magnus effect will cause the bullet to deflect to the left with reference to the dot DC, to hit the target airplane in the periscopic field. This deflection is constant in amount and direction relative to the airplane 100 regardless of rotation of the turret in azimuth, because the bullets are all exposed to the same wind forces when shooting straight down.

The V and H cross hairs at all positions in azimuth must intersect at the point at which the bullets hit when the guns are pointed at 180° elevation. For purposes of illustration a target airplane is shown in this position, and for purposes of illustration its size at 600 yards range is greatly exaggerated with relation to the field, which is a 45° field. The orientation dot DT is shown on field vertically above central dot DC. When the turret is pointed at 0° azimuth, the V hair is to the left of true center (shown by the dot DC) by an amount sufficient to compensate for the magnus effect. Although the H hair will be discussed later, it will be noted that it is below true center by an amount sufficient to compensate for wind blow. The correction of the V hair, which compensates for lateral deflections, is shown on a curve C5 to the left of the field illustrations, wherein the ordinate is degrees azimuth and the abscissa is deflection angles. Since movement of the V hair to the left of center is a positive correction, this movement is marked positive (+) on the curve. Thus for 0° azimuth the abscissa is a small plus quantity.

At 45° azimuth the V hair must move to the right of center, or in a negative direction to intersect the target. This movement is shown on the curve C5 by a large negative deflection. At 90° azimuth the V and H hairs are interchanged as compared to the 0° azimuth positive. In this position the V hair movement reaches its greatest negative correction and this is reflected by a negative high point on the curve C5. At 135° azimuth the V hair is still at a negative correction but of slightly less amount than at 90°.

When the turret is rotated to 180° azimuth, the V hair again assumes a "0° azimuth" position as at 0° azimuth, but of reverse sign. This correction is reflected on the curve as a negative correction of an amount equal to that at 0° azimuth. The correction is negative because it is to the right of center using the orientation dot DT a basis. At 225° azimuth the V hair must move to the left of center to intersect the target, a positive correction. Thus the curve V5 will cross the zero deflection line from negative to positive between 180° and 225° azimuth.

At 270° elevation the V hair reaches its greatest positive deflection, reflecting the full wind blow of the bullet. At 315 the correction is still positive but smaller in amount than at 270° azimuth. From a consideration of the V hair movement as the turret turns in azimuth, with relation to the fixed deflection, it will be apparent that the curve C5 is a sine curve.

For purposes of comparison, the composite curve C4 of Figure 33 may be drawn on the same azimuth-deflection axes as the curve C5 of Figure 35. As explained with reference to Figure 33, the composite curve C4 is not an irregular curve, but a series of regular segments. These show up on Figure 35 as straight line lengths plotted at the azimuth position noted in Figure 33. It can be seen that the composite curve C4 follows the curve C5 so closely that at 180° elevation, the composite adequately represents the true curve of the V hair movements.

From the foregoing it is evident that the composite curve C4 adequately represents V hair movements at 90° elevation, 135° elevation, and at 180° elevation. Further, it can be assumed with reasonable safety, that the curves in intermediate elevation positions correspond closely to the composite curve C4 for any given position in azimuth. This being true, all that remains is to produce a voltage curve corresponding to the curve C4, and impress this voltage on the galvanometer rotor 372 governing the V hair movement.

An electrical cam for producing a composite curve voltage wave is shown in Figure 34. To obtain positive voltages and negative voltages corresponding with the positive and negative correction angles, there is provided a source of positive and a source of negative voltage with reference to a source of zero voltage. This can be obtained by tapping the ends of a battery for the positive and negative voltage and tapping a mid-point in the battery for the zero source as will be described later.

Figure 34 shows a series of bridges for producing a voltage curve corresponding to the azimuth composite curve C4 for the lateral deflection, and will be referred to as the lateral composite or LC cam. For illustration, the voltages of 1.5 volts and of —1.5 volts are taken as the maximum voltage corrections corresponding to the maximum angular corrections, which are practically equal though opposite in sign as at 90° and 270°. Positive voltage is supplied to the LC cam by wire 54 which is connected to a supply wire 57 supplying voltage and current to the various positive cam angles at the ends of arc segments of the composite curve C4 of Figure 33; namely, 237°, 270°, 319° and 0° azimuth. Negative voltage and current is supplied to cam LC by a wire 53 connected to a supply wire 58 supplying the various negative cam angles at the ends of arc segments of the curve C4 of Figure 33; namely, 45°, 90°, 118° and 157° azimuth. A zero voltage wire 52 is connected to a grounding conductor 59 which in turn is connected to resistances at all of the arc segment ending angles, both positive and negative, of the composite curve C4 of Figure 33.

The actual voltage curve is formed on a series of resistances forming a circle 60. The cam LC is stationary in the airplane and voltage is taken off from circle 60 by a take-off arm 61 synchronized with the movement of the turret in azimuth. Thus when the turret is pointed at 0° azimuth the arm 61 is at the zero degree mark on cam LC, and as the turret is rotated the arm 61 moves with it for any given number of rotations. The voltages at the various points are indicated in Figure 34. At zero degrees the .055 v. corresponds to the small positive correction angle at 0° in Figure 33. At 45° the voltage is a negative .943 v. and at 90° is negative 1.5 v. corresponding to the maximum negative correction in Figure 33. Between 157° and 237° the voltage again changes sign from negative to positive and approaches the maximum at 270° again with plus 1.5 v.

The voltage circle 60 is formed by a series of simple bridges, and for purposes of illustration the formation of the voltage points at 270° and 319° will be described. At 319° the voltage drops from plus 1.5 v. in wire 57 to zero at wire 59. All that is necessary is to place a resistance between these two wires, and pick off an intermediate point on the resistance giving plus 1.106 v. A resistance R6 of 52.6 ohms connecting wire 57 and the voltage point gives the correct voltage of 1.106 v. when in series with a resistance R7 of 152 ohms connecting the voltage point and ground wire 59. This can be shown mathematically by multiplying the fraction R7 over the quantity R6 plus R7 by the maximum voltage 1.5 v., which equals 1.106, the desired voltage.

The same considerations obtain at the 270° point. Since the maximum voltage of 1.5 v. is desired at the voltage point a conductor 62 leads from wire 57 to the voltage point. A resistance R9 is connected between the 270° voltage point and ground wire 59 and is approximately equal to the sum of the radial resistances connected at any voltage point or about 200 ohms. A resistance R8 connects the voltage points of 270 and 319 to give a straight line graduation of voltage between the two. This resistance R8 is relatively high because the current taken off by arm 61 is very small, as will be explained later. The details of calculation of the correct resistance, for circle 60 between voltage points are dependent upon resistance in the circuits supplied by arm 61, and these calculations are well known in the electrical art and need not be explained here. The single bridge circuit just described is duplicated between all other supply points on the circle 60 and by connecting the whole together the voltage circle 60 is formed. In this manner an accurate voltage wave may be formed for the composite curve LC, and yield voltages at any point in azimuth which are satisfactory for all points in elevation from 90° to 180°.

Vertical ballistics correction

The correction angles for the vertical ballistics deflection of a bullet are shown in Figure 37. The airplane 100, in which the lower turret is mounted is shown in the center of its hemisphere of fire. The range line for 90° elevation is shown as line C6. The correction angles for any point in azimuth on the line C6 is shown on a correction curve C7. The range line for 135 elevation is the line C8, and correction angles for azimuth points on line C8 are measured by a correction curve C9. The corrections for 180° elevation will be explained later with reference to Figure 35.

The amount of correction at an azimuth point on a range circle is shown by the "longitude" lines on the hemisphere between the range line and its respective correction curve. For example at 90° azimuth and 90° elevation the correction angle is much greater than at 270° azimuth and 90° elevation. Magnus effect causes the bullet to "dive" when fired at 90° azimuth, and to "climb" when fired at 270° azimuth, but even at 270° azimuth the effect of gravity is greater than magnus effect and the guns must be aimed above the 90° elevation range line C6 to hit an airplane on that 90° elevation line. The target airplane T3 is shown on the 90° elevation line, and in order for the bullets to hit the target the guns must be elevated an angle A3 above the target to offset magnus dive and gravity effect. In order to point the guns above the target plane T3, the horizontal or H cross hair must move below the center of the field of the periscope. When the target plane T3 is then sighted on the H hair the guns will be elevated above the target. The angular correction, and the corresponding movement of the H hair below center will be referred to as a positive correction.

A target plane T4 is shown to the rear of airplane 100 at 180° azimuth and 135° elevation on the line C8. If the guns were pointed directly at this target plane the wind would blow the bullets relatively upward from the axis of the guns and they would never hit the target. The guns must accordingly be pointed below the target T4 by an angle A4 as determined by the longitudinal correction lines (drawn dotted) below the 135° elevation range line C8 to the correction curve C9. The bullets now fired will be blown upwardly from the axis of the guns in the path shown by the heavier dotted line, and will hit the target airplane T4 squarely.

In order to point the guns below the target plane T4, the H hair must be raised above the center of the periscopic field, and the turret guns then depressed to sight the cross hairs on the target plane T4. It is understood, of course, that in actual operation the cross hairs move automatically and the pilot merely sights on the target. The movement of the H hair above center, being opposite from the movement for target T3, will be called negative, and is indicated by longitudinal lines below the range line. Positive corrections are indicated by longitudinal lines above the range lines.

A target T5 is shown in Figure 37 directly below the airplane 100 at 180° elevation. The guns must be pointed in advance of the target T5 at an angle A5, so that when the bullets are blown backwardly by the wind they will hit the target. This correction is illustrated to bring out the corrections for H hair movement which will be discussed with relation to Figure 35.

The movements of the H hair when the guns are pointing at 180° elevation are shown in Figure 35. The periscopic fields for the various azimuth positions are shown in the central part of the figure. The curve corresponding to the movements of the H hair is a curve C10 shown on the right part of the figure. The abscissa measurements reflect angle of correction, and the ordinate measurements represent degrees in azimuth. As stated before, the deflection for 180° elevation is constant in amount and direction with relation to the airplane in which the turret is mounted. The dot DC marks the center of the field, the direction in which the guns are pointed. The bullets are blown backwardly as described in Figure 37, and magnus effect causes them to deflect to the left so that they hit the airplane in the field squarely. The V and H hairs must move according to azimuth position so as to intersect on the target at all times.

At 0° azimuth the H hair is below the center of the periscopic field as shown by the dot DC. This movement by prior definition has been termed positive, and is accordingly reflected on the curve C10 as a positive quantity. At 45° azimuth the H hair is below center by a less amount and this is reflected on the curve C10 acordingly.

Between 90° azimuth and 135° azimuth the H hair crosses the center of the field so that it is "above" center, (i. e. toward the dot DT). This change is reflected on the curve C10 by a change of sign from positive to negative. At 180° the negative correction is the greatest and gradually diminishes until it again changes sign near 270° azimuth. The positive correction increases at 315° azimuth to connect with the negative peak at 0° azimuth were the curve completed on a circular path as are the curves of Figure 33.

Having now determined the nature of the curves which reflect correction movement of the H hair at 90° elevation, as surve C7; at 135° elevation as curve C9, and at 180° elevation as curve C10, it must now be considered by what means these curves can be duplicated electrically to move the H hair in a path corresponding with the curves. In the case of lateral deflection, the curve at 90° elevation, curve C2, at 135° elevation, curve C3, and at 180° elevation, curve C5, were so similar that one composite curve C4 could adequately represent all three curves. In the case of vertical deflection however the curves are all radially different. In Figure 37 it can be seen that curve C7 for 90° elevation is always positive and that curve C9 for 135° has positive and negative positions. By comparing Figure 35 with Figure 37 it can be seen that the curve C10 for 180° crosses the zero line at different points from the 135° curve C9. Manifestly no one curve can adequately represent all three curves in vertical deflection.

The three curves C7, C9 and C10 must therefore all be duplicated electrically and connected with the position of the guns in elevation to make the curve nearest the elevation position of the guns most effective at that instant. The three curves are accordingly duplicated by electrical cams and connected together in elevation, so that a take-off member following the guns in elevation can pick off the curve nearest the elevation position of the guns.

The 180° elevation curve C10 for the H hair is duplicated electrically by the electrical cam shown in Figure 36. Since this cam reflects movements of the H hair at 180° elevation, which hair corrects for vertical deflections, this cam will be referred to as the V180 cam. The construction of the V180 cam is based on the same principles as the LC cam shown in Figure 34, the construction of which has been explained. The wire 54 supplies positive voltage to the positive points of the curve, 315°, 0°, 45° and 90° azimuth. The wire 53 supplies negative voltage to the negative points on the curve, 135°, 180°, 225° and 270° azimuth. The wire 52 supplies zero voltage to the cam. A take-off arm 65 traverses the circle of the cam, rotating as the turret rotates in azimuth. Take-off arm 65 delivers current to a wire 55 which is connected to a cam VE which will be explained later. The actual electrical curve created by cam V180 is shown in dotted lines on Figure 35 as the curve V180. It will be noted that the electrical curve V180 follows the theoretical curve C10 very closely.

The correction curves for vertical deflection curves C7 for 90° elevation and curve C9 for 135° elevation are duplicated by voltage curves at any point on the hemisphere of fire, by the cams shown in Figure 38. In Figure 38 is shown an azimuth cam V90 for the 90° curve C7, and an azimuth cam V135 for the 135° curve C9, and an elevation cam VE for correlating the azimuth curves to the elevation position of the guns. It can safely be assumed that the corrections in elevation between the curves vary in a straight line relation for any given azimuth position, that is, between curves C7 and C9 for 90° elevation and 135° elevation, and between curves C9 and C10 for 135° elevation and 180° elevation.

The actual construction of the 90 degree cam V90 and the 135 degree cam V135 is similar in principle to the lateral deflection composite cam LC of Figure 34. The correction curves are electrically formed by a series of "straight line" electrical segments which follow the actual curves very closely. Wire 54 is a source of positive voltage for cam V90, and since there are no negative portions on the correction curve C7 for 90° elevation the only other supply wire is the ground or zero potential wire 52. The 0° azimuth mark on cam V90 corresponds with the 0° azimuth position of the turret with relation to a wiper arm 67 which rotates in synchronism with the azimuth rotation of the turret. The resistances used give the proper voltages to correspond to the correction angle curve C7 of Figure 37. The voltage at 0° is small, is greatest at 120° and smallest at 255°.

The cam V135 has a positive and a negative portion to correspond with the correction curve C9 of Figure 37. Wire 54 supplies the positive voltage, wire 53 supplies the negative voltage, and wire 52 the zero voltage. The cam V135 is greatest in positive voltage near 0° azimuth and greatest in negative voltage near 205° azimuth. A wiper arm 68 takes current off of the circle of cam V135, the arm 68 moving in synchronism with the turret in azimuth.

A wire 69 receiving the current from wiper 67 of cam V90 leads to the 90° elevation point of a resistance R11 forming a part of cam VE and curved to form a 90° to 135° elevation arc. A wire 70 receiving the current from wiper 68 of cam V135 leads to the 135° end of resistance R11 at which point another resistance R12 forming another part of the cam VE is attached to form a 135° to 180° arc of the elevation arc. The 180° end of resistance R12 is connected to wire 55 which receives current from cam V180 as shown on Figure 36.

Both resistances R11 and R12 are of several thousand ohms. A wiper arm 71 forming another part of cam VE is synchronized with the guns of the turret in elevation, and wipes the resistances R11 and R12, passing the azimuth voltage from cams V90, V135 and V180, as modified by resistances R11 and R12, to a wire 72 leading to the H hair circuit.

The operation of the circuit of Figure 36 depends entirely on the movements of the turret. Cams V90, V135 and V180 are in the azimuth compensator 148 (Figure 7) and the wiper arms 67, 68 and 65 are secured to compensator shaft 602, making one complete rotation every time the turret rotates. The cam VE including the resistances R11 and R12 and the wiper arm 71 is in the elevation compensator 176 (Figure 17) and arm 71 is fastened to elevation compensator shaft 614. The combination of the azimuth and elevation movements covers every point in the hemisphere of fire of the turret, correcting for vertical deflection through movement of the H hair. The position of the turret in Figures 34, 36 and 38 is indicated by the position of the arms 61, 65, 67, 68 and 71 to be about 40° in azimuth and 115° in elevation. Cam V90 is producing a voltage intermediate .28 v. and .49 v. and supplying this voltage to the top of resistance R11. Cam V135 is producing a voltage intermediate 1.2 v. and 1.07 v. and supplying this voltage to the bottom end of R11. Since wiper 71 is about half way between 90° and 135°, the effective voltage will be about half the sum of that at 90° and that at 135° elevation.

*Complete compensation electrical circuit*

The compensation circuit as a whole is applied to the turret in Figure 39 and can also be traced on Figure 40. The source of current for the lateral and vertical correction cams is obtained from a battery B2. A two-throw switch S15 controls power flow from the battery B2 at each end. A wire 50 is attached to switch S15 at the positive end of battery B2 and leads to a resistance R2 of a manual rheostat 625. A wire 51 is attached to switch S15 at the negative end of the battery and leads to rheostat resistance R3. Wire 52 taps a mid point in the battery B2 to give a point of zero voltage with respect to the ends of the battery. An arm 53a of rheostat 625 connected to wire 53 takes current from negative resistance R3, and an arm 54a connected to wire 54 takes current from positive resistance R2. The rheostat 625 is manually controlled in response to air speed, because the ballistics deflections described vary substantially in accordance with air speed.

The wires 52, 53 and 54 supply current to the azimuth cams LC, V90, V135 and V180 as described with relation to Figures 34, 36 and 38. The respective take-off arms of these cams are attached to the azimuth compensator shaft 602 which rotates once for every rotation of the turret in azimuth. It will be noted that the take-off arms for the cams are all pointing in the same direction, approximately 180° azimuth, and from a comparison of the respective azimuth and elevation drive parts the turret can be seen to be pointing toward the rear of the airplane 100 or near 180° azimuth in which it is mounted.

The azimuth cam take-off wires 69, 70 and 55 for the vertical deflection cams lead down the central column to the elevation compensator box 176 containing resistances R11 and R12. Wire 69 from cam V90 leads to the 90° end of resistance R11, and wire 70 from cam V135 leads to resistance R12 at the 135° elevation point. The take-off arm 71 secured to elevation compensator shaft 614 is synchronized with the movement of the guns in elevation, but it will be recalled that the rotation of the elevation compensator shaft 614 is multiplied about three times over the movement of the guns in elevation, to increase sensitivity. Thus the representation in Figure 38 of the 60° arc traveled by the elevation arms 71 is reduced and was used merely for purposes of illustration.

The take-off wire 63 from the LC cam in the azimuth compensator leads down the central column to a balanced square bridge circuit for the vertical cross hair or V hair and this bridge will be referred to as bridge VB. The V hair, as stated above, corrects for lateral deflections. The opposite corner of square bridge VB is connected to wire 52 which is the ground or zero voltage wire. The bridge VB has the V hair rotor 372 in one leg, and both branches of the bridge are balanced including the resistance of the V hair rotor 372. The resistances of the bridge VB are of the order of several hundred thousand ohms, and the V hair galvanometer is consequently fully affected by several milliamperes. The V hair will move to the right or to the left in the periscopic field depending upon whether the voltage is negative or positive through the bridge VB.

The resultant current from take-off arm 71, which is the current from the V90 cam (wire 69) the V135 cam (wire 70) and V180 cam (wire 55), all relating to vertical deflections, passes to wire 72 which leads to a square balanced bridge HB. The H hair rotor 372 is inserted in one leg of the bridge HB and current flowing through the bridge causes the H hair rotor to move in accordance therewith. The resistances in the H bridge are of several hundred thousand ohms, and consequently a small current actuates the H hair rotor 372. The opposite corner of bridge HB is connected to wire 52 which is the zero voltage or ground wire. The H hair will move above or below the enter of the periscopic field depending upon whether the voltage is negative or positive.

The compensation for lead is accomplished by generators built into the azimuth and elevation motors 130 and 172 respectively. A generator G1 in the azimuth motor causes current to flow in wires 73 and 74, the direction depending upon the direction of rotation of the azimuth motor 130. Since azimuth lead is controlled by movement of the vertical cross hair V, the wires 73 and 74 lead to the bridge VB being attached to opposite corners. Depending upon the direction of the rotation of the turret, the V hair will move to the right or to the left in lead compensation. The lead current is superimposed upon the ballistics correction current through the bridge VB and the V hair moves in response to the algebraic sum of the two currents at any one time. In general, the lead current is several times as large as the ballistics correction current through the bridge.

Lead in elevation is accomplished by a generator 62 built into elevation motor 172. This causes current to flow through wires 75 and 76, the direction depending upon the direction of rotation of elevation motor 172. Since lead in elevation is accomplished by movement of the H hair the wires 75 and 76 lead to opposite corners of the bridge HB. The effective current on the H hair rotor 372 is the algebraic sum of the ballistic correction current and the lead current.

In operation, with relation to Figure 39, the gunner learns from the pilot of the airplane through the intra-plane phone or otherwise, the speed of the airplane and sets the rheostat 625 to correspond thereto. He then closes switch S15 and positive, negative and zero current then flow to the azimuth cams which regulate ballistic corrections. Lateral deflections in azimuth between 90 and 180° in elevation are corrected by cam LC having the take-off wire 63 leading down the central column to bridge VB. The cam V90 corrects for vertical deflection at 90° elevation. The cam V135 corrects for vertical deflections at 135° elevation. The cam V180 corrects for V hair movements at 180° elevation. The respective take-off currents flow through wires 69, 70 and 55 to elevation cam VE in the elevation compensator, to be modified by the position of the guns in elevation. Lead correction is accomplished through generators G1 and G2 built into the azimuth motor 132 and the elevation motor 172. The direction of flow from these generators is dependent upon the direction of rotation of the respective motors. Lead in azimuth is corrected on the V hair and wires 73, 74 from generator G1 consequently lead to bridge VB controlling the V hair. Lead in elevation is controlled by the H hair and wires 75 and 76 from generator G2 consequently lead to bridge HB controlling the H hair. The lead currents are superimposed on the ballistics correction currents at the respective bridges, and the V and H hairs move in response to the algebraic sum of the two currents.

It has been assumed that lead is directly dependent upon rate of movement of the target, which is reflected by the rate of movement of the turret in keeping the target in the periscopic field. Actually, however, lead varies according to the position of the target airplane in azimuth and elevation and varies somewhat in the same manner as ballistic correction according to gun position. This lead variation is so small as compared to the total lead and as compared to the ballistic corrections, that it can be ignored for practical purposes and for this reason lead correction cams are not shown.

It has been stated that ballistics correction varies according to air speed, which is reflected by moving rheostat 625 to the proper position. Actually, however, ballistics correction varies in accordance with air speed and density of the air. The correction obtained by movement of rheostat should reflect air speed and density, as determined by the speed and altitude at which the airplane is flying. This dual correction can be made automatically by having a wind driven generator as the source of current rather than a battery. Air speed and density then determine total voltage, although a wind driven generator adds weight and air resistance compared to a battery.

If ballistics and lead correction according to range were desired, this could be accomplished by automatically or manually varying resistances in the wires before the voltage or current reaches the bridges VB and HB. Automatic correction could be obtained by connecting such a resistance unit with a periscopic focusing device. Manual correction could be responsive to the gunner's visual determination of the range of the target and by having a rotatable trigger grip, rather than a stationary one, he could easily make the correction before firing.

Operation

Assuming that the plane is flying and the turret is in its retracted position when an enemy plane is sighted or suspected, the gunner will first wish to extend the turret. Thereupon, he grasps handle 504 closing switch S1 and passing current to the turret, and swings handle 504 toward himself causing brush 532 to move to the left part of the drum 512. This movement causes switch S3 to disconnect wires 18 and 19 and current is no longer supplied from wire 19 to branch wire 24. Thus current can no longer flow from wire 24 through switch S6 to wire 25 into relay L5. Current passes to armature A1 and wire 19 no longer passes current to field relay L3 and the relay is deenergized to connect field F1 in an "extend" direction.

Azimuth motor 130 now causes sleeve 120 to rotate to the left or counterclockwise and turret 102 is extended. The speed with which the turret is extended depends upon, first, the distance which control handle 504 is swung and the consequent distance that brush 532 is moved away from the center of the drum 512 as explained in connection with Figure 28; and second, by operation of the button 503 on handle 504 giving to the drum 512 the full available voltage and current. As the turret nears the bottom of the extension stroke, connector key 144 slides vertically past the top of sleeve 120 because it is held within that limit by pin 154. Further extension causes pin 154 (Figure 10) to strike the top of sleeve 120 and the pin is pushed up into its recess. As the turret reaches the final limit of extension notch 150 in sleeve 120 is rotated opposite key 144 and spring 144a pushes key 144 into that notch. The turret now starts to rotate and the gunner is ready for combat.

The final extension of the turret causes head 126 (Figure 3) to contact switch S5, causing it to disconnect wire 28 from wire 15 and to connect wire 22 to wire 15. Wire 28 being no longer energized allows relay L6 to be deenergized and the current may now flow to elevation armature A1. Wire 22 passes energy to switch S4 allowing that switch to actuate to field relay through wire 23, switches S9 and S10 and wire 31.

The gunner taking the position shown in Figure 2 looks downwardly through the central column and through the periscope tube 306 as explained in connection with Figures 18 to 25 inclusive and 33 to 38 inclusive. Ballistic and lead corrections are made automatically and the gunner turns the guns by swinging their rotating control handle 504 to cause the target airplane to appear at the intersection of the cross hairs 376. When the target airplane approaches the effective range, which the gunner may determine by the apparent size of the target airplane in the periscope in its relation to known dimensions, the gunner starts firing by closing safety switch S12 and then pressing on firing button 405. As explained in connection with Figures 31 and 32 under the heading "Trigger system", the guns will not fire if they are pointing at parts of the gunner's own plane, but assuming that the gunner has his guns trained on the target airplane, the path of the bullets will almost necessarily be pointing away from the gunner's own airplane and through actuation of the trigger circuit the firing solenoids FS will be energized and the bullets will be fired toward, and will probably strike and disable the enemy plane. Should it happen that one or both of the guns should jam or otherwise become inoperative while firing, the gunner will be able to charge the gun by operation of the recharging mechanism, the operation of which was explained in connection with Figure 26 and which the gunner operates by pressing upon hand-operated charging valve 216 which is as shown in Figure 4 positioned adjacent to the trigger control handle 404. As explained, the target airplane should be maintained at the intersection of the cross hairs and this is accomplished by swinging the handle 504 to rotate in azimuth the entire turret and the guns and the periscope and by turning the handle 504 to elevate or depress the guns and with them proportionately the prism 301 of the periscope.

More specifically and referring particularly to Figures 28 and 30 for the electrical circuit and to Figures 3 and 10 for the mechanical parts and movement there follows a more detailed description of the operation of the turret during combat.

The turret is shown in an extended position ready for combat in Figures 3 and 30. The connector key 144 (Figures 3 and 10) is urged outwardly by spring 144a so that it fits notch 150 in sleeve 120, causing column 124 to rotate with sleeve 120. To operate the turret the gunner grasps control handle 504 (Figure 30) closing switch S1, and thereby closing relay L1 to pass current to the turret from battery B1. If the gunner desires to rotate the turret to the right, or clockwise, he swings handle 504 away from himself causing azimuth brush 532 to move to the right end of drum 512.

This movement of azimuth brush 532 causes current to flow from it through wire 5, through relay L5 and wire 6 to the azimuth motor armature A1. The same movement of brush 53 closes switch S3 which passes current from wire 18 to wire 19 and through wire 19 to field relay L3 which connects the azimuth field F1 in a direction to cause motor 130 to rotate to the right or clockwise. Motor 130 drives its shaft 134 to which worm screw 136 is attached. Worm screw 136 drives worm wheel 138 which is attached to drive shaft 140. Drive shaft 140 drives worm screw 142 attached thereto, which screw meshes with and drives ring gear 122 attached to sleeve 120. Sleeve 120 is thus rotated, and acting through connector key 144 (Figure 3), drives the column 124 in rotation in azimuth.

If the gunner desires to rotate the turret to the left or counterclockwise, he swings the control handle 504 toward himself causing brush 532 to contact the left part of drum 512. In this position current will again pass from brush 532 through wire 5, through relay L5 and wire 6 to armature A1. The movement of brush 532 to the left opens switch S3 so that current no longer flows from wire 18 to wire 19, and the field relay L3 will be deenergized, allowing the field wires 16 and 17 to pass current through field F1 in an opposite direction, reversing the direction of rotation of the motor 130. The motor 130 then acts through the azimuth gear train to rotate the turret to the left or counterclockwise.

If the gunner desires to depress the guns 110, he twists the control handle 504 "over" or rotates it on its axis in a clockwise direction as viewed from the right end. This movement causes elevation brush 536 to move to the right part of drum 512, passing current through wire 4 which passes down the column to relay L6, through relay L6 and through wire 7 to the elevation armature A2. The movement of brush 536 to the right closes switch S4, passing current from wire 22 to wire 23, which leads down the central column to switch S9 in the elevation compensator, through switch S9 and wire 31 to relay L4. Relay L4 when energized connects the field F2 in a direction opposite from that shown, reversing the motor 172. Motor 172 drives its shaft 170 to which is attached worm screw 168. Worm screw drives worm wheel 166 attached to drive shaft 164, which shaft also has worm screw 162 attached to it. Worm screw 162 in turn drives wheel sector 160 attached to gun shaft 156 on which the guns are mounted, depressing the guns as wheel sector 160 rotates.

If the depressing movement of the guns continues the guns will reach the lower limit of the elevation arc, the straight down position. This depressing movement causes worm wheel 166 to drive shaft 177 (Figure 30) which has a worm screw driving compensator worm wheel 612. Worm wheel 612 in turn drives compensator shaft 614 to which are secured cams 506, 508, and 510. When lower limit cam 508 is rotated to a position corresponding to the lower limit or straight down position of the guns, its notch allows switch S9 to open breaking the current through wire 31 to relay L4. Field F1 is then reversed, causing the guns to start to elevate. When the guns have elevated a small amount, cam 508 will rotate in synchronism closing switch S9 and the guns will start to depress. Thus when the controls are kept in the depressed position the guns will alternate at the lower limit between depression and elevation in a small arc governed by the amount of rotation of cam 508 necessary to close switch S9. Oscillating the guns at their limits of swing in the manner just described enables the gunner to keep the guns trained in a desired area without actually stopping the guns by shutting off the power or dynamically braking the drive motors.

If the gunner desires to elevate the guns he twists handle 504 "under," or counterclockwise when viewed from the right end. This movement causes elevation brush 536 to contact the left end of drum 512 and current flows from brush 536 to wire 23. The movement to the left opens switch S4 so that no current can flow to wire 23 down the column to switch S9 and relay L4. Thus relay L4 is not energized at switch S4, the field is reversed from that required for depression, and the motor will act through the elevation gear train to elevate the guns.

When the guns reach the upper limit of the elevation arc, cam 510 will allow switch S10 to close, passing current from wire 26 to wire 23, up wire 26 to switch S9, which is closed when switch S10 is effective, through switch S9, and down wire 31 to field relay L4. When relay L4 is energized it reverses the direction of field F2, and thus motor 172, and the guns begin to depress. Cam 510 rotates accordingly and after a short movement opens switch S10 causing relay L4 to once more be deenergized and the guns will elevate. Thus the guns will alternate between elevation and depression if the controls are kept in the elevating position.

The triangular conductor segments 516 on drum 512 (Figure 28) allow speed control of the elevation and azimuth motors. The control handle 504 can be moved to give movement in azimuth and elevation at the same time and at different speeds. The stops of the upper and lower limit of the elevation arc are automatic. There are no stops in azimuth because the turret is free to rotate for any given number of rotations in either direction.

When the gunner desires to retract the turret he must place the guns in a horizontal position and he twists or rotates control handle 504 "under" to accomplish this. When the guns 110 reach horizontal the gunner should stop them. However, when the guns do reach this position they will oscillate back and forth slightly so that it is not difficult for the gunner to stop them. After the guns are horizontal he presses retract lever 146 (Figure 10) to his left, assuming that the guns are pointed toward the rear so that retract lever is on the inner side of column 124 near him. Pushing retract lever 146 for retraction closes switch S8 at the top of column 124, causing it to connect wire 27 to wire 25 leading to relay L5. At the same time the gunner will rotate the turret to the right, which is the direction of rotation of sleeve 120 necessary to screw the turret up into the airplane to retract it.

As the turret rotates the guns toward the rear, key 144 will come opposite notch 152 (Figures 3 and 10) in nonrotatable head 126. The pressure of the gunner on lever 146 will act through link 157 and bell crank 158 to pull the key 144 into notch 152, locking the column 124 to head 126, preventing it from rotating. As sleeve 120 continues to turn to the right or clockwise it will screw the turret up into the airplane in which it is mounted. When the turret nears the upper limit of its retraction, actuation pin 576 (Figure 30) on spider 114 closes switch S6, passing current from wire 24 to wire 25, which leads up the column to relay L5. This causes the relay L5 to break the current to armature A1 and the sleeve 120 ceases to operate.

As the turret retracts, non-rotatable head 126 rises with it. The slightest upward movement of head 126 allows switch S5 (Figure 30) to connect wire 15 to wire 28, passing current to wire 28 which leads down the column to relay L6. Energizing relay L6 breaks the current to armature A2, preventing movement of the guns in elevation during retraction, after retraction and while extending. This provision insures against injury of the turret if the controls are accidentally moved to elevate the guns while the turret is other than in a fully extended position.

If the guns are not horizontal when the gunner tries to retract the turret by pressing on retract lever 146, which closes switch S8, the turret will not retract. Switch S7 will then be closed, passing current from wire 26 to wire 27, which passes current up the central column to switch S8. Switch S8 passes the current to wire 25 which leads out of the top of the column to actuate relay L5 to break the current to armature A1. Thus if the guns are not horizontal when retraction is attempted the azimuth or retracting motor will be automatically stopped.

Referring to Figure 10, as the turret starts to retract and head 126 lifts off of sleeve 120, the button 154 will project below end plate 159. If the retract lever is now released, the spring 144a can push key 144 out only as far as the inner edge of button 154. In this position the key 144 still contacts head notch 152 and the turret is held from rotating, even though the gunner releases retract lever 146.

If the gunner desires to extend the turret, he does not operate retract lever 146, but merely moves azimuth brush 532 to the left part of drum 512. This movement causes switch S3 to disconnect wires 18 and 19, and branch 24 from wire 19 is no longer supplied with current. Current can no longer flow from wire 24 through switch S6 to wire 25 and thus to relay L5, and relay L5 is deenergized allowing current to pass to armature A1. Wire 19 no longer passes current to field relay L3 and it is deenergized to connect field F1 in an "extend" direction.

Azimuth motor 130 now causes sleeve 120 to rotate to the left or counterclockwise and the turret is extended. As the turret nears the bottom of the extension stroke connector key 144 slides vertically past the top of sleeve 120 because it is held within that limit by pin 154. Further extension causes pin 154 (Figure 10) to strike the top of sleeve 120 and the pin is pushed up into its recess. As the turret reaches the final limit of extension, notch 150 in sleeve 120 is rotated opposite key 144 and spring 144a pushes key 144 into that notch. The turret now starts to rotate and is ready for combat.

The final extension of the turret causes head 126 (Figure 3) to contact switch S5, causing it to disconnect wire 28 from wire 15, and to connect wire 22 to wire 15. Wire 28 being no longer energized allows relay L6 to be deenergized, and current may now flow to elevation armature A1. Wire 22 passes energy to switch S4, allowing that switch to actuate the field relay L4 through wires 23, switches S9 and S10 and wire 31.

Having described my invention fully, I do not intend to limit my invention to the embodiments shown or described, nor do I intend to limit my invention in any other way except by the terms of the following claims.

I claim:

1. In a turret, a support, a rotatable sleeve member carried by said support a column depending from said support and constructed and arranged to be extended or retracted in response to rotation of the sleeve member, a turret carried by said column, a gun mounted for rotation in said turret in a plane at an angle to the plane of rotation of the turret, power means for rotating and operating said gun, and power connections leading to said power means through the column, said column having a swivel connection at the entrance of the power means to the column.

2. In a bottom turret for an airplane, a support, a rotatable sleeve member carried by said support, a column depending from said support and constructed and arranged to be extended or retracted axially in response to rotation of said sleeve member, a turret carried by said column, means to connect the sleeve and column to continuously rotate the turret for 360° rotation in azimuth, a gun mounted in said turret and rotatable in a plane at right angles to the plane of rotation of the turret, and means to rotate said gun in an elevation arc of at least 90°.

3. In a remotely controlled turret, a support, a column mounted on said support and adapted for rotation and axial movement, a gun turret mounted on said column adapted for movement therewith, means for imparting axial displacement to the column, a gun mounted in said turret for rotation in an elevation arc, a periscope in said turret having a movable member synchronized with the movements of the gun to observe the field of fire of the gun, power control means for controlling the movements of the turret remotely placed from the turret at the point of observation in the periscope, whereby a single operator may observe the field of fire of the guns and control the movements of the turret in response thereto.

4. In a gun turret, a rotatable member, a central column constructed and arranged to be extended or retracted in response to rotational movement of said member, a turret mounted thereon, a gun mounted for elevation in said turret, hydraulic control mechanism for said gun, a conduit connected to said mechanism and passing through the central column to an outlet passage on the periphery of said column, and a stationary sleeve having an annular hydraulic gland formed therein surrounding said column at the region of the outlet passage, to pass fluid to, or to receive fluid from, said conduit.

5. In an airplane, a support, a bottom turret depending therefrom being rotatable and axially movable, guns mounted in said turret for rotation in elevation and projecting a substantial amount beyond the outer shell of said turret, means for retracting said turret, gun wells in said airplane at a fixed position with relation to said turret and adapted to retain the guns when they are in a horizontal position when the turret is retracted, power means for operating said retracting means, and power cut-out means rendering said power means inoperative unless the guns are in a horizontal position.

6. In a retractible turret, a support, a rotatable threaded sleeve mounted therein, a threaded column engaging said sleeve, a turret mounted on one end of said column and adapted to be extended or retracted with respect to said support, power means to rotate said sleeve in either direction to cause retraction or extension of said turret, and automatic control means adapted to interrupt the power means to prevent the same from retracting the turret when the turret is in a retracted position or from extending the turret when the turret is in an extended position.

7. In a retractible turret, a support, a turret mounted for rotation and axial movement on said support, means to move said turret axially, guns mounted in said turret for rotation in elevation, power means to rotate said guns, and cut-out means to render said power means inoperative except when the turret is fully extended.

8. A bottom turret for use in the bottom surfaces of an airplane or the like comprising a turret member, a mounting for said member adapted to be carried by said airplane, means for moving said member relative to said mounting under the control of a gunner in the fuselage to cause said turret to protrude below the fuselage or selectively to be withdrawn to a substantial degree within the fuselage to reduce wind resistance, a gun and sighting means therefor carried by the turret member, the sighting means being arranged and constructed for observation by the gunner in the fuselage, means controlled by said gunner for turning the turret member with the gun and sighting means to bring the gun and said sighting means on a target by movement in azimuth, and means controlled by said gunner for raising and lowering the gun and said sighting means angularly relative to the turret to bring them on the turret in elevation.

9. A bottom turret for use in the bottom surfaces of an airplane or the like comprising a turret member, a mounting for said member adapted to be carried by said airplane, means for moving said member relative to said mounting under the control of a gunner in the fuselage to cause said turret to protrude below the fuselage or selectively to be withdrawn to a substantial degree within the fuselage to reduce wind resistance, a gun and sighting means therefor carried by the turret member, the sighting means being arranged and constructed for observation by the gunner in the fuselage, means controlled by said gunner for turning the turret member with the gun and sighting means to bring the gun and said sighting means on a target by movement in azimuth, and means controlled by said gunner for raising and lowering the gun and said sighting means angularly relative to the turret to bring them on the turret in elevation, the turret-moving means and the turret turning means and the gun raising and lowering means all having a common control accessible to said gunner.

10. A bottom turret for use in the bottom surfaces of an airplane or the like comprising a turret member adapted to be carried by said airplane, a gun and sighting means therefor carried by the turret member, the sighting means being arranged and constructed for observation by a gunner in the fuselage outside the turret member, means controlled by said gunner for turning the turret member with the gun and sighting means while observing through the sighting means to bring the gun and said sighting means on a target by movement in azimuth, and means controlled by said gunner for raising and lowering the gun and said sighting means angularly relative to the turret to bring them on the turret in elevation.

11. A bottom turret for use in the bottom surfaces of an airplane or the like comprising a turret member, a mounting for said member adapted to be carried by said airplane, means for moving said member relative to said mounting under the control of a gunner in the fuselage to cause said turret to protrude below the fuselage or selectively to be withdrawn to a substantial degree within the fuselage to reduce wind resistance, a gun and sighting means therefor carried by the turret member, the sighting means being arranged and constructed for observation by the gunner in the fuselage, means controlled by said gunner for turning the turret member with the gun and sighting means to bring the gun and said sighting means on a target by movement in azimuth, and means controlled by said gunner for raising and lowering the gun and said sighting means angularly relative to the turret to bring them on the turret in elevation, the turret turning means and the gun raising and lowering means having a common control accessible to said gunner.

12. An airplane fuselage or the like having a turret depending therefrom and mounting guns, means to be rotated to extend or retract said turret with respect to said fuselage, sighting means for laying the guns on a target, a portion of said sighting mechanism adapted to extend vertically along the turret axis and another portion adapted to extend radially of the turret, means in said fuselage for supporting an operator in a kneeling position and looking downwardly into the axial part of the sighting means, and power means controllable by said operator while so looking into the sighting means and adapted to adjust the position of the turret and the radial portion of the sighting means so as to bring the target in the field of sight as viewed by the operator.

13. In a turret for housing guns for use in connection with airplanes a rotatable mounting for said guns, means for rotating said guns, a well for housing said turret and guns, means for retracting said turret and said guns into said well, means comprising a key and a notch associated with said key for insuring that the guns are in proper rotational position when said turret is retracted, and means for preventing retraction of said turret except when said guns are in a horizontal position.

14. In combination, an airplane, a support depending from said airplane, guns mounted on said support for movement relative thereto in a vertical plane, means including a member to be rotated for extending and retracting said support with respect to said airplane, and locking means for preventing retraction of said support except when the guns are in a predetermined position with respect to said airplane.

15. In combination, an airplane, electrically operated guns, a support for said guns, means including a member to be rotated for extending and retracting said support with respect to said airplane, locking means for preventing retraction of said support except when the guns are in a predetermined position, and means comprising an electrical system having cut-out switches for preventing the operation of said guns whenever the support is being extended or retracted.

16. For use in connection with an airplane, guns, a support for said guns, means for extending and retracting said support with respect to the airplane, means for elevating and depressing said guns, an upper limit for said guns, a lower limit for said guns, and means adjacent to each of said limits for causing said guns to oscillate slightly adjacent to said upper and lower limits.

17. A rotatable turret for an aircraft or the like operable by a gunner occupying a station fixed with respect to the aircraft comprising in combination; an aircraft, a turret member, a mounting for said member constructed and arranged to be carried by said aircraft, means for moving said member relative to the mounting under the control of the gunner to cause said turret to extend beyond the surface of said aircraft or selectively to be withdrawn to a position with respect to the aircraft surfaces to reduce wind resistance, a gun and sighting means therefor carried by the turret member, the sighting means being constructed and arranged for observation by the gunner at the station, means controlled by the gunner for turning the turret member with the gun and sighting means to bring the gun and sighting means on a target by movement in azimuth, and means controlled by the gunner for raising and lowering the gun and said sighting means angularly relative to the turret to bring them on the target in elevation.

18. A rotatable turret for an aircraft or the like operable by a gunner occupying a station fixed with respect to the aircraft comprising in combination: an aircraft, a turret member, a mounting for said member constructed and arranged to be carried by said aircraft, means for moving said member relative to the mounting under the control of the gunner to cause said turret to extend beyond the surface of said aircraft or selectively to be withdrawn to a position with respect to the aircraft surfaces to reduce wind resistance, gun and sighting means therefor carried by the turret member, the sighting means being constructed and arranged for observation by the gunner at the station, means controlled by said gunner for turning the turret member with the gun and sight means to bring the gun and sighting means on a target by movement in azimuth, and means controlled by the gunner for raising and lowering the gun and said sighting means angularly relative to the turret to bring them on the target in elevation, the turret moving means and the turret member turning means and the gun raising and lowering means all having a common control accessible to said gunner.

19. An extendable and retractible lower turret for an aircraft or the like operable by a gunner occupying a station fixed with respect to the aircraft comprising in combination: means for extending or retracting the turret, a gun mounted in said turret for angular movement in elevation, sighting means for the gun mounted for concurrent angular movement in elevation with said gun, the sighting means being constructed and arranged for observation of a target by the gunner disposed at a station fixed with respect to the aircraft, and power means comprising a single handle controlled by said gunner for rotating the gun in azimuth and moving the gun angularly in elevation, while so observing, to bring the gun to bear on a target.

20. An extendable and retractible lower turret for an aircraft or the like operable by a gunner occupying a station fixed with respect to the aircraft comprising in combination: means for extending or retracting the turret, a gun mounted in said turret for angular movement in elevation, sighting means for the gun mounted for concurrent angular movement in elevation with said gun, the sighting means being constructed and arranged for observation of a target by the gunner disposed at a station fixed with respect to the aircraft, and power means comprising a single handle controlled by said gunner for rotating the gun in azimuth and moving the gun angularly in elevation while so observing to bring the gun to bear on a target, and means for changing the position of the sighting means relative to the gun without disturbing the concurrent movement of the sighting means with the gun in elevation and azimuth to thereby make corrections in the laying of the gun.

21. A rotatable turret for an aircraft or the like operable by a gunner occupying a station fixed with respect to the aircraft comprising in combination: a gun mounted in said turret for angular movement in elevation, sighting means for the gun mounted for concurrent angular movement in elevation with said gun, the sighting means being constructed and arranged for observation of a target by the gunner disposed at a station fixed with respect to the aircraft, and power means comprising a single handle remotely controlled by said gunner for rotating the turret and moving the gun angularly in elevation, while so observing, to bring the gun to bear on a target, the sighting means having a part extending along the axis of the turret and through which the gunner may observe regardless of the position of the gun in azimuth and elevation.

22. An extendable and retractible lower turret for an aircraft or the like operable by a gunner occupying a station fixed with respect to the aircraft comprising in combination: means for extending and retracting the turret, a gun mounted in said turret for angular movement in elevation, sighting means for the gun mounted for concurrent angular movement in elevation with said gun, the sighting means being constructed and arranged for observation of a target by the gunner disposed at a station fixed with respect to the aircraft, and power means comprising a single handle controlled by said gunner for rotating the gun in azimuth and moving the gun angularly in elevation, while so observing, to bring the gun to bear on a target, and means automatically preventing the firing of the gun when in positions where firing would be dangerous to the aircraft or the like in which the turret is mounted.

23. A rotatable and retractable turret for an aircraft or the like operable by a gunner occupying a station fixed with respect to the aircraft comprising in combination: a gun mounted in said turret and angularly movable in elevation, power means remotely controlled by the gunner for rotating the turret with the gun and for moving the gun angularly in elevation to bring the gun to bear on a target, and means also controlled by said gunner during rotation of the turret to selectively connect said turret for retracting movement.

24. A rotatable and retractable turret for an aircraft or the like operable by a gunner occupying a station fixed with respect to the aircraft comprising in combination: a gun mounted in said turret and angularly movable in elevation, power means remotely controlled by the gunner for rotating the turret with the gun and for moving the gun angularly in elevation to bring the gun to bear on a target, sighting means through which the gunner may observe the target and which is correlated in its operation with the movement of the gun, and means also controlled by said gunner during rotation of the turret to selectively connect said turret for retracting movement.

25. An extendable and retractible lower turret for an aircraft or the like operable by a gunner occuping a station fixed with respect to the aircraft comprising in combination: means for extending or retracting the turret, a gun having remotely controlled power means for moving it in azimuth and in elevation, sighting means automatically correlated in its movements with the movements of the gun, and remotely controlled means for adjusting said sighting means relative to the gun to make corrections in the laying of the gun on a target to compensate for factors which tend to cause a projectile fired from said gun to deviate from the intended path of the projectile.

26. In a remotely controlled gun turret, a support, a rotatable sleeve carried by said support, a column depending from the support and having a turret mounted thereon, said sleeve being constructed and arranged to engage the column to cause it to move axially relative to the support in response to rotation of said sleeve, a gun mounted in said turret, means for rotating the turret to move the gun in train, means for moving the gun in elevation, and a periscope constructed and arranged to follow the movement of the gun to observe the field of fire.

27. A turret constructed and arranged to depend from the lower surface of an aircraft, means to be rotated to cause said turret to be extended or retracted with respect to the aircraft, means connecting said turret for rotation when extended, a gun carried by the turret and organized for movement in elevation, sighting means carried by the turret, means for moving the sighting means concurrently wtih the movement of the gun, the sighting means being constructed and arranged for observation of a target by a gunner who is outside the turret, and power means remotely controlled by said gunner outside the turret for rotating the turret and moving the gun angularly, while so observing, to bring the gun to bear on a target.

28. A turret constructed and arranged to depend from the lower surface of an aircraft, means to be rotated to cause said turret to be extended or retracted with respect to the aircraft, means connecting said turret for rotation when extended, a gun carried by the turret and organized for movement in elevation, sighting means carried by the turret, means for moving the sighting means concurrently with the movement of the gun, the sighting means being constructed and arranged for observation of a target by a gunner who is outside the turret, power means remotely controlled by said gunner outside the turret for rotating the turret and moving the gun angularly, while so observing, to bring the gun to bear on a target, and electric power means for changing the position of the sighting means relative to the gun without interfering with its movement concurrently with the gun in elevation and with the gun and turret in azimuth in order to make corrections in the laying of the gun.

29. A turret constructed and arranged to depend from the lower surface of an aircraft, means to be rotated to cause said turret to be extended or retracted with respect to the aircraft, means connecting said turret for rotation when extended, a gun carried by the turret and organized for movement in elevation, sighting means carried by the turret, means for moving the sighting means concurrently with the movement of the gun, the sighting means being constructed and arranged for observation of a target by a gunner who is outside the turret, and power means remotely controlled by said gunner outside the turret for rotating the turret and moving the gun angularly, while so observing, to bring the gun to bear on a target, the sighting means having a part extending along the axis of the turret and through which the gunner may observe regardless of the angular position of the turret.

30. In a turret for housing guns for use in connection with airplanes, a rotatable mounting for said guns, means for rotating said guns, a well for housing said turret and guns, means for retracting said turret and said guns into said well, means comprising a key and a notch associated with said key for insuring that guns are in proper position when said turret is retracted, and means for lccking said guns against substantial movement either in a vertical or horizontal plane except when said turret is fully extended.

GEORGE W. PONTIUS, III.

Certificate of Correction

Patent No. 2,414,608.                                          January 21, 1947.

GEORGE W. PONTIUS III

It is hereby certified that errors appear in the printed specification of the above numbered patent requiring correction as follows: Column 9, line 17, for "Patent No. 2,332,297" read *Patent No. 2,269,297*; column 53, line 21, claim 25, for "occuping" read *occupying*; and that the said Letters Patent should be read with these corrections therein that the same may conform to the record of the case in the Patent Office.

Signed and sealed this 2nd day of November, A. D. 1948.

[SEAL]

THOMAS F. MURPHY,
*Assistant Commissioner of Patents.*

Certificate of Correction

Patent No. 2,414,608.  January 21, 1947.

GEORGE W. PONTIUS III

It is hereby certified that errors appear in the printed specification of the above numbered patent requiring correction as follows: Column 9, line 17, for "Patent No. 2,332,297" read *Patent No. 2,269,297*; column 53, line 21, claim 25, for "occuping" read *occupying*; and that the said Letters Patent should be read with these corrections therein that the same may conform to the record of the case in the Patent Office.

Signed and sealed this 2nd day of November, A. D. 1948.

[SEAL]

THOMAS F. MURPHY,
*Assistant Commissioner of Patents.*